(12) United States Patent
Gilgan et al.

(10) Patent No.: US 7,832,087 B2
(45) Date of Patent: Nov. 16, 2010

(54) HOUSING MANUFACTURING SYSTEM

(75) Inventors: Peter Gilgan, Oakville (CA); Jurgen Dirks, Oakville (CA); Peter Vohsemer, Galt (CA); William Meevis, Brantford (CA); Walter Mitchell, Richmond Hill (CA)

(73) Assignee: The Mattamy Corporation, Oakville, Ontario (CA)

( * ) Notice: Subject to any disclaimer, the term of this patent is extended or adjusted under 35 U.S.C. 154(b) by 679 days.

(21) Appl. No.: 11/852,204

(22) Filed: Sep. 7, 2007

(65) Prior Publication Data

US 2008/0086978 A1    Apr. 17, 2008

Related U.S. Application Data

(63) Continuation-in-part of application No. 11/675,938, filed on Feb. 16, 2007.

(30) Foreign Application Priority Data

Oct. 11, 2006    (CA) .................................... 2563187

(51) Int. Cl.
*B23P 21/00* (2006.01)
*B23P 19/04* (2006.01)
*E04H 1/00* (2006.01)
*E04G 21/14* (2006.01)

(52) U.S. Cl. .............................. 29/783; 29/791; 29/822; 29/824; 29/897.3; 29/897.31; 29/897.312; 29/897.32; 52/143; 52/745.19

(58) Field of Classification Search ................ 29/897.3, 29/897.31, 897.312, 897.32, 430, 771, 783, 29/784, 791, 799, 822, 823, 824, 281.4; 52/79.5, 52/79.7, 79.9, 143, 173.2, 745.19
See application file for complete search history.

(56) References Cited

U.S. PATENT DOCUMENTS

| 619,237 | A | 2/1899 | Soule |
| 2,681,233 | A | 6/1954 | Soule |
| 2,752,864 | A | 7/1956 | McDougal et al. |
| 2,940,402 | A | 6/1960 | Hansen et al. |
| 3,156,018 | A | 11/1964 | Slayter |
| 3,168,206 | A | 2/1965 | Washington |
| 3,279,132 | A | 10/1966 | Slayter |
| 3,501,875 | A | 3/1970 | De Mailly |
| 3,537,168 | A | 11/1970 | Carroll |

(Continued)

FOREIGN PATENT DOCUMENTS

CA    903975    8/1968

(Continued)

OTHER PUBLICATIONS

U.S. Appl. No. 08/502,650, filed Jul. 14, 1995, Cohen.

(Continued)

*Primary Examiner*—Jermie E Cozart
(74) *Attorney, Agent, or Firm*—Reising Ethington P.C.

(57) ABSTRACT

A system for manufacturing homes is provided. An embodiment includes a final assembly facility located proximal to a subdivision where a plurality of the custom homes is to be situated. The final assembly facility is for receiving the planar sections from the sub-assembly plant and for constructing the homes from planar portions according to the production schedule.

9 Claims, 63 Drawing Sheets

U.S. PATENT DOCUMENTS

| | | | |
|---|---|---|---|
| 3,574,920 A | 4/1971 | Stirling et al. |
| 3,633,795 A | 1/1972 | Brooks |
| 3,679,177 A | 7/1972 | Scholz |
| 3,707,165 A | 12/1972 | Stahl |
| 3,743,120 A | 7/1973 | Schmidt |
| 3,758,067 A | 9/1973 | Kleiber |
| 3,785,314 A | 1/1974 | Scanlan |
| 3,788,026 A | 1/1974 | Cook |
| 3,800,493 A | 4/1974 | Livingston |
| 3,805,365 A | 4/1974 | Ashby |
| 3,820,216 A | 6/1974 | Van Der Lely |
| 3,893,705 A | 7/1975 | Allen |
| 3,937,329 A | 2/1976 | Hammerel |
| 3,958,320 A | 5/1976 | Van Der Lely |
| 3,958,705 A | 5/1976 | Baxter |
| 3,962,773 A | 6/1976 | Van Der Lely |
| 3,994,060 A | 11/1976 | Van Der Lely |
| 4,003,182 A | 1/1977 | Wokas |
| 4,044,854 A | 8/1977 | Schmitt |
| 4,059,931 A | 11/1977 | Mongan |
| 4,096,675 A | 6/1978 | Howard |
| 4,110,952 A | 9/1978 | Blachura |
| 4,120,133 A | 10/1978 | Rodgers et al. |
| 4,161,145 A | 7/1979 | Patterson et al. |
| 4,187,659 A | 2/1980 | Blachura |
| 4,231,695 A | 11/1980 | Weston |
| 4,273,485 A | 6/1981 | Fischer et al. |
| 4,305,538 A | 12/1981 | Schultz |
| 4,360,298 A | 11/1982 | Fischer et al. |
| 4,450,617 A | 5/1984 | Dillon |
| 4,501,098 A | 2/1985 | Gregory |
| 4,512,120 A | 4/1985 | Lindal |
| 4,513,545 A | 4/1985 | Hopkins, Jr. |
| 4,546,530 A | 10/1985 | Rizk |
| 4,573,302 A | 3/1986 | Caretto |
| 4,599,829 A | 7/1986 | DiMartino, Sr. |
| 4,884,935 A | 12/1989 | Smith et al. |
| 4,894,909 A | 1/1990 | Sakamoto |
| 4,899,497 A | 2/1990 | Madl, Jr. |
| 5,092,504 A | 3/1992 | Hannes et al. |
| 5,174,707 A | 12/1992 | Suekane et al. |
| 5,191,842 A | 3/1993 | Tinkler |
| 5,209,540 A | 5/1993 | Metler |
| 5,353,558 A | 10/1994 | Shea, Sr. et al. |
| 5,402,618 A | 4/1995 | Biffis |
| 5,425,207 A | 6/1995 | Shayman |
| 5,661,930 A | 9/1997 | Porter |
| 5,689,705 A | 11/1997 | Fino |
| 5,706,615 A | 1/1998 | Bridges et al. |
| 5,765,330 A | 6/1998 | Richard |
| 5,771,645 A | 6/1998 | Porter |
| 5,819,498 A | 10/1998 | Geraci |
| 5,890,341 A | 4/1999 | Bridges et al. |
| 5,991,769 A | 11/1999 | Fino |
| 6,000,192 A | 12/1999 | Cohen |
| 6,067,771 A | 5/2000 | Blankenship |
| 6,253,504 B1 | 7/2001 | Cohen |
| 6,308,491 B1 | 10/2001 | Porter |
| 6,539,401 B1 | 3/2003 | Fino |
| 6,540,089 B2 | 4/2003 | Brock et al. |
| 6,571,523 B2 | 6/2003 | Chambers |
| 6,588,605 B1 | 7/2003 | Volkert et al. |
| 6,651,393 B2 | 11/2003 | Don et al. |
| 6,935,668 B1 | 8/2005 | Summers |
| 6,951,079 B2 | 10/2005 | Weiss |
| 6,959,514 B1 | 11/2005 | Pingel |
| 7,025,546 B2 | 4/2006 | Clive-Smith |
| 7,152,449 B2 | 12/2006 | Durney et al. |
| 7,467,469 B2 | 12/2008 | Wall |
| 2002/0007605 A1 | 1/2002 | Cohen |
| 2002/0095888 A1 | 7/2002 | Winskye |
| 2002/0100235 A1 | 8/2002 | Weiss |
| 2002/0170243 A1 | 11/2002 | Don et al. |
| 2002/0174606 A1 | 11/2002 | Hunt |
| 2003/0172006 A1 | 9/2003 | Fino |
| 2004/0103596 A1 | 6/2004 | Don et al. |
| 2005/0257456 A1 | 11/2005 | Biffis |

FOREIGN PATENT DOCUMENTS

| | | |
|---|---|---|
| CA | 994717 | 8/1976 |
| CA | 1163822 | 3/1984 |
| CA | 2139622 | 5/1999 |
| CA | 2182242 | 7/1999 |
| CA | 2398322 | 8/2001 |
| CA | 2226873 | 4/2002 |
| CA | 2226874 | 4/2002 |
| CA | 2437162 | 8/2002 |
| CA | 2 434 365 | 2/2004 |
| CA | 2430637 | 7/2004 |
| CA | 2449159 | 7/2004 |
| CA | 2434365 | 12/2004 |
| CA | 2359062 | 3/2005 |
| DE | 2525434 | 12/1976 |
| DE | 4324612 | 1/1995 |
| WO | WO 97/04187 | 2/1997 |
| WO | WO 97/04188 | 2/1997 |

OTHER PUBLICATIONS

U.S. Appl. No. 08/502,812, filed Jul. 14, 1995, Cohen.

Canadian Examination Report from Canadian Intellectual Property Office dated Sep. 2, 2010 for Canadian Application No. 2,563,187, Title: Housing Manufacturing System and Method, Owner: The Mattamy Corporation, 2 pages.

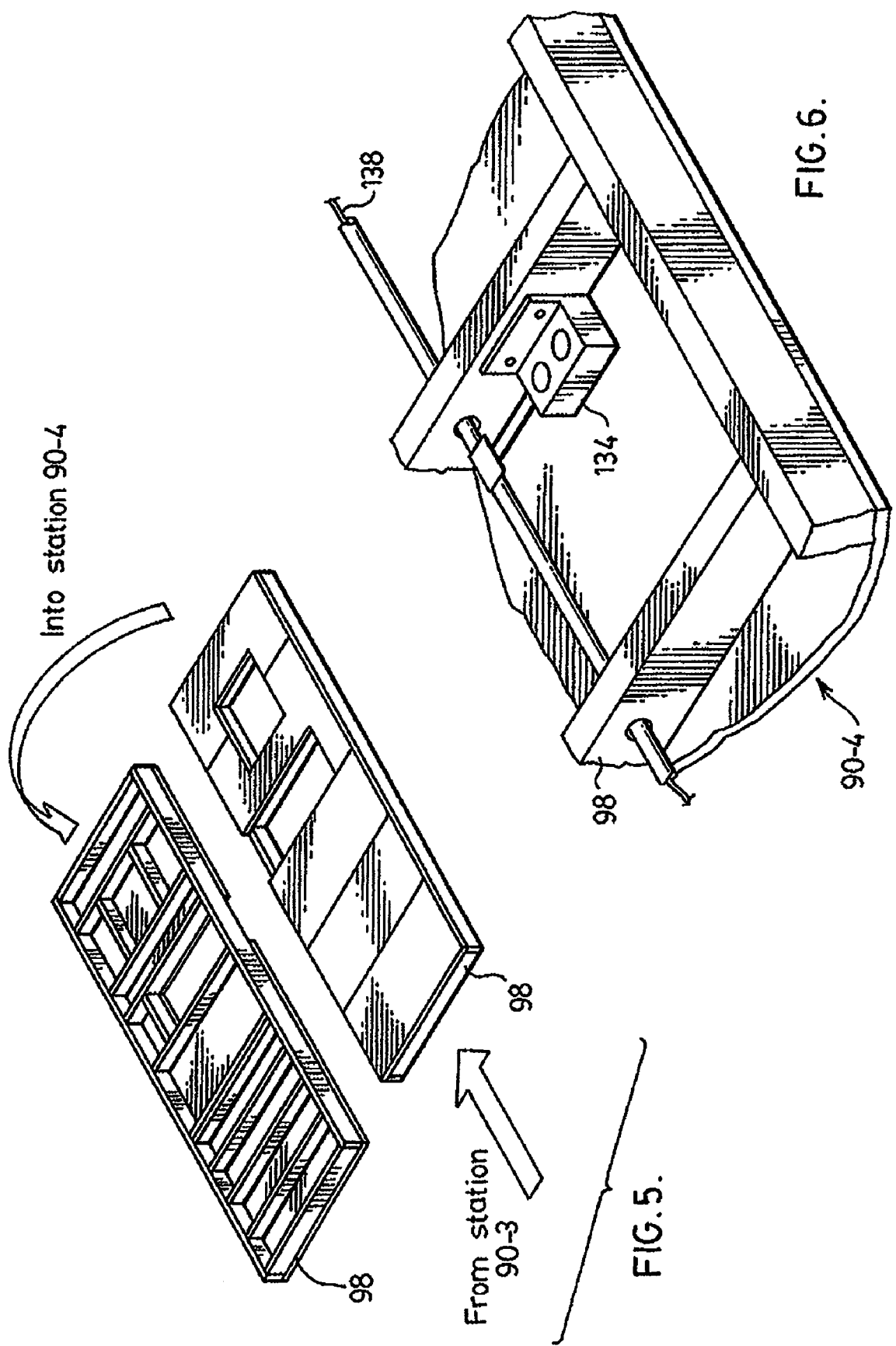

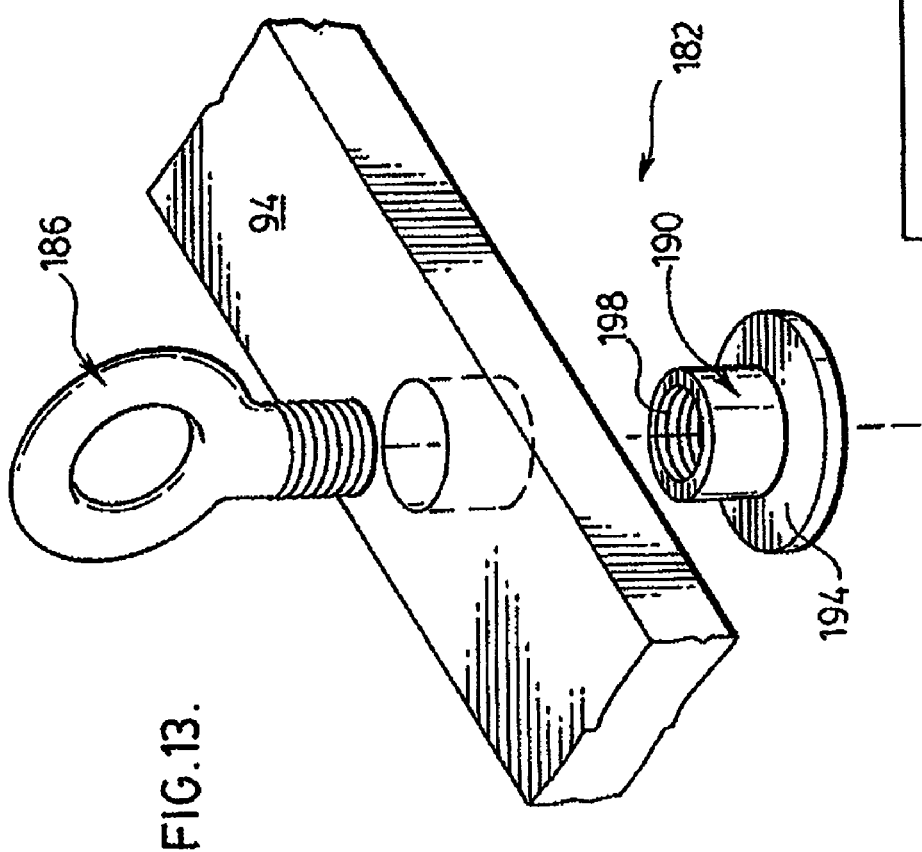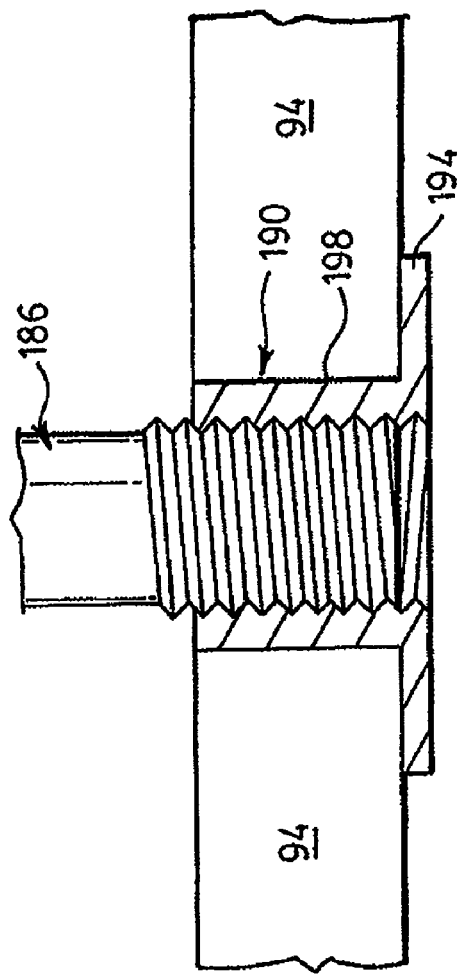

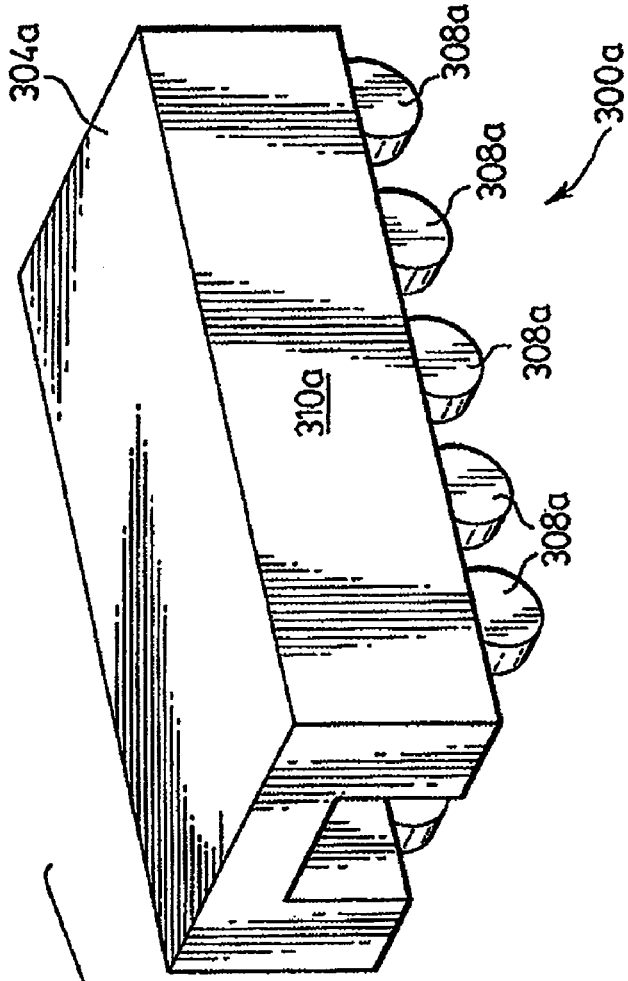
FIG.20.
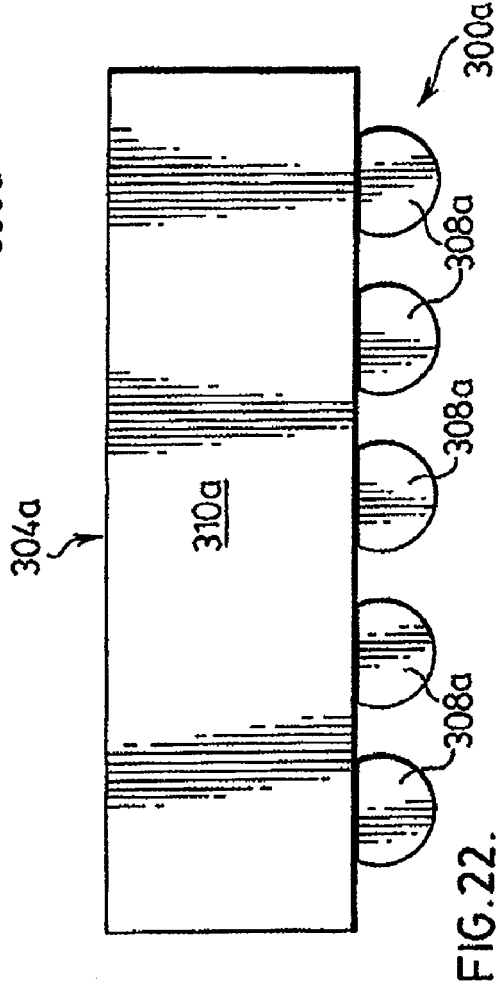
FIG.22.
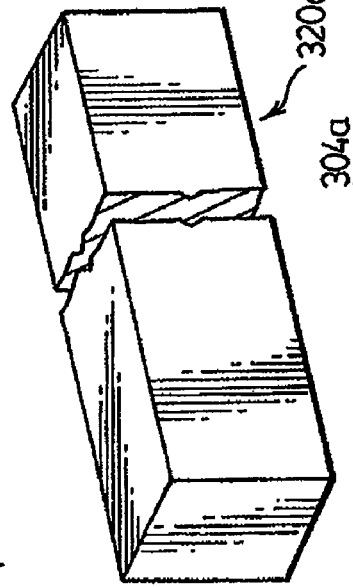
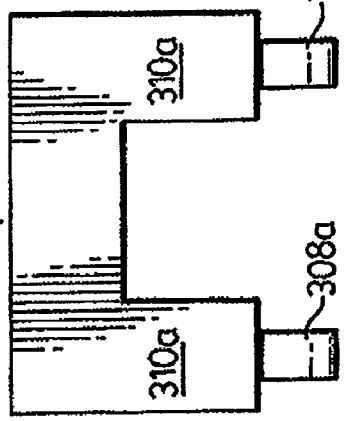
FIG.21.

| ID | (i) | Task Name | Duration |
|---|---|---|---|
| 1 | | STATION 0-A | 13 hrs |
| 2 | | | |
| 3 | | MAIN ROOF ASSEMBLY | 13 hrs |
| 4 | | Set roof fixture and place ceiling drywall | 2 hrs |
| 5 | | Set roof trusses, blocking, bracing | 4 hrs |
| 6 | | Install HVAC for ceiling registers | 1 hr |
| 7 | | Install electrical for ceiling lights | 1 hr |
| 8 | | Insulate ceiling | 4 hrs |
| 9 | | Sheath roof | 4 hrs |
| 10 | | | |
| 11 | | STATION 0-B | 8 hrs |
| 12 | | | |
| 13 | | SHINGLE ROOF | 8 hrs |
| 14 | | Shingle roof | 8 hrs |
| 15 | | Install siding, fascia and soffits | 2 hrs |
| 16 | | Rig and prepare roof for lifting | 1 hr |
| 17 | | | |
| 18 | | STATION 1 | 16 hrs |
| 19 | | | |
| 20 | | | |

FIG.33A

| # | | Task | Duration |
|---|---|---|---|
| 21 | | SUBROOF ASSEMBLY | |
| 22 | ▦ | Prebuild all subroofs | 8 hrs |
| 23 | | HOUSE ASSEMBLY | 8 hrs |
| 24 | ▦ | Assemble first floor panels onto steel | 16 hrs |
| 25 | | HVAC under first floor | 2 hrs |
| 26 | | Wiring under first floor | 1 hr |
| 27 | | Assemble first floor partitions | 1 hr |
| 28 | | Assemble second floor panels | 2 hrs |
| 29 | | Assemble second floor partitions | 2 hrs |
| 30 | | Install remaining doors and windows | 2 hrs |
| 31 | | Lift main roof | 2 hrs |
| 32 | | Install all subroofs, window bumpouts and seats | 1 hr |
| 33 | | Install stairs and stair backframing | 4 hrs |
| 34 | | Pin main and subroofs | 1 hr |
| 35 | | Frame check for plumb and level | 1 hr |
| 36 | | | 1 hr |
| 37 | | STATION 2 | |
| 38 | | | 16 hrs |
| 39 | | SERVICES | |
| 40 | | Exterior trim on boxouts | 16 hrs |
| 41 | | Install HVAC risers | 8 hrs |
| 42 | | Install gas fireplace | 2 hrs |
| 43 | | Complete plumbing roughin | 1 hr |
| 44 | | Backframing (drop ceilings, knee walls, bulkheads, stairwells) | 4 hrs |
| 45 | | Frame check | 4 hrs |
| | | | 1 hr |

FIG.33D

| | | |
|---|---|---|
| 46 | Electrical rough-in and panel | 7 hrs |
| 47 | Rough-in and/or install O&E's | 7 hrs |
| 48 | O&E Check | 1 hr |
| 49 | | |
| 50 | STATION 3 | 13 hrs |
| 51 | | |
| 52 | INSULATION / SIDING / DRYWALL | 13 hrs |
| 53 | Foam insulate second floor rim boards | 1 hr |
| 54 | Foam insulate garage ceiling and overhangs | 3 hrs |
| 55 | Install vinyl siding, trough and shutters | 8 hrs |
| 56 | Plumbing test | 1 hr |
| 57 | Electrical mag test | 1 hr |
| 58 | Drywall to first floor ceiling | 2 hrs |
| 59 | Drywall to interior partitions | 2 hrs |
| 60 | Corner beads | 2 hrs |
| 61 | Frame check | 1 hr |
| 62 | O&E Check | 1 hr |
| 63 | First coat of all un-taped joints | 4 hrs |
| 64 | | |
| 65 | STATION 4 | 16 hrs |
| 66 | | |
| 67 | DRYWALL AND TAPING | 16 hrs |
| 68 | Second coat of tape to walls and ceilings | 4 hrs |
| 69 | Skim coat of tape to walls and ceilings | 4 hrs |
| 70 | Final rough-in plumbing test | 1 hr |
| 71 | Final rouch-in electrical test | 1 hr |

FIG.33G

| # | Task | Time |
|---|---|---|
| 72 | Final drywall sanding and touchup | 2 hrs |
| 73 | Masking tape, spray primer walls and ceilings | 4 hrs |
| 74 | Remove masking tape and cleanup | 2 hrs |
| 75 | | |
| 76 | STATION 5 | 14 hrs |
| 77 | | |
| 78 | CEILINGS / TAPING / RAILINGS | 14 hrs |
| 79 | Masking and texture spray ceilings | 4 hrs |
| 80 | Remove masking and cleanup | 1 hr |
| 81 | Install nosing for railings | 2 hrs |
| 82 | Install railings | 4 hrs |
| 83 | | |
| 84 | STATION 6 | 16 hrs |
| 85 | | |
| 86 | TILE / TRIM / CABINETS | 16 hrs |
| 87 | Ceramic tile to tubs, shower and bathroom floors | 4 hrs |
| 88 | Ceramic tile to foyer, hallway and kitchen | 4 hrs |
| 89 | Grout to all ceramic areas | 4 hrs |
| 90 | Install vanities | 1 hr |
| 91 | Install kitchen | 5 hrs |
| 92 | Plumbing finish to vanities and powder room | 2 hrs |
| 93 | Interior trim to second floor | 4 hrs |
| 94 | Drywall check-out to second floor | 1 hr |
| 95 | Plumbing finish to kitchen | 1 hr |
| 96 | | |

FIG.33J

| | | |
|---|---|---|
| 97 | STATION 7 | 16 hrs |
| 98 | PRIME / PAINT / TRIM | 16 hrs |
| 99 | Sand and prime second floor drywall t-ups | 1 h |
| 100 | Sand all railings, nosings and stairs | 2 hrs |
| 101 | Clean and vacuum second floor and ready for paint | 1 hr |
| 102 | Drywall check-out to first floor | 1 hr |
| 103 | Finish paint to second floor | 3 hrs |
| 104 | Sealer to all railings, nosings and stairs | 1 hr |
| 105 | Interior trim to first floor | 3 hrs |
| 106 | Sand and prime first floor drywall and t-ups | 1 hr |
| 107 | Final sand to railings, nosings and stairs | 1 hr |
| 108 | Clean and vacuum first floor and ready for paint | 1 hr |
| 109 | Finish paint to first floor | 3 hrs |
| 110 | Finish coat to all railings, nosings and stairs | 1 hr |
| 111 | | |
| 112 | | |
| 113 | STATION 8 | 13 hrs |
| 114 | INTERIOR | 13 hrs |
| 115 | Install plugs, switches, fixtures, hoods and fans | 3 hrs |
| 116 | Plumbing finish to vanities and powder room | 1 hr |
| 117 | Install carpet to second floor | 4 hrs |
| 118 | Finish hardware, closet shelving, closets, mirrors to second floor | 4 hrs |
| 119 | HVAC finish to second floor | 1 hr |
| 120 | Plumbing finish to kitchen | 2 hrs |

FIG.33M

| | | |
|---|---|---|
| 122 | Install carpet to first floor | 4 hrs |
| 123 | Final drywall checkout, paint t-up and clean to second floor | 2 hrs |
| 124 | Finish hardware, closet shelving, closet doors, mirrors to first floor | 2 hrs |
| 125 | HVAC finish to first floor, hoods and fans | 2 hrs |
| 126 | | |
| 127 | STATION 9 | 6 hrs |
| 128 | | |
| 129 | INTERIOR AND SHIPPING PREP | 6 hrs |
| 130 | Final drywall checkout, paint t-ups | 2 hrs |
| 131 | Final clean to first floor | 2 hrs |
| 132 | Final paint to exterior doors and wood trim | 4 hrs |
| 133 | Delivery protection | 2 hrs |
| 134 | | |
| 135 | STATION 10 | 8.5 hrs |
| 136 | | |
| 137 | DELIVERY (Does not include Mammoet operators) | 8.5 hrs |
| 138 | Stelumar crew prepare for delivery | 2 hrs |
| 139 | Load transporter and deliver to foundation | 1 hr |
| 140 | Push house onto foundation - return transporter | 1.5 hrs |
| 141 | Jacking down house | 1 hr |
| 142 | Teardown of delivery beams | 1 hr |
| 143 | Preparation of next foundation | 2 hrs |

Project: SAMI 3 Production Schedule
Date: 3:32 PM

Task  ▨  Milestone  ◆
Progress  ▬  Summary

FIG.33P

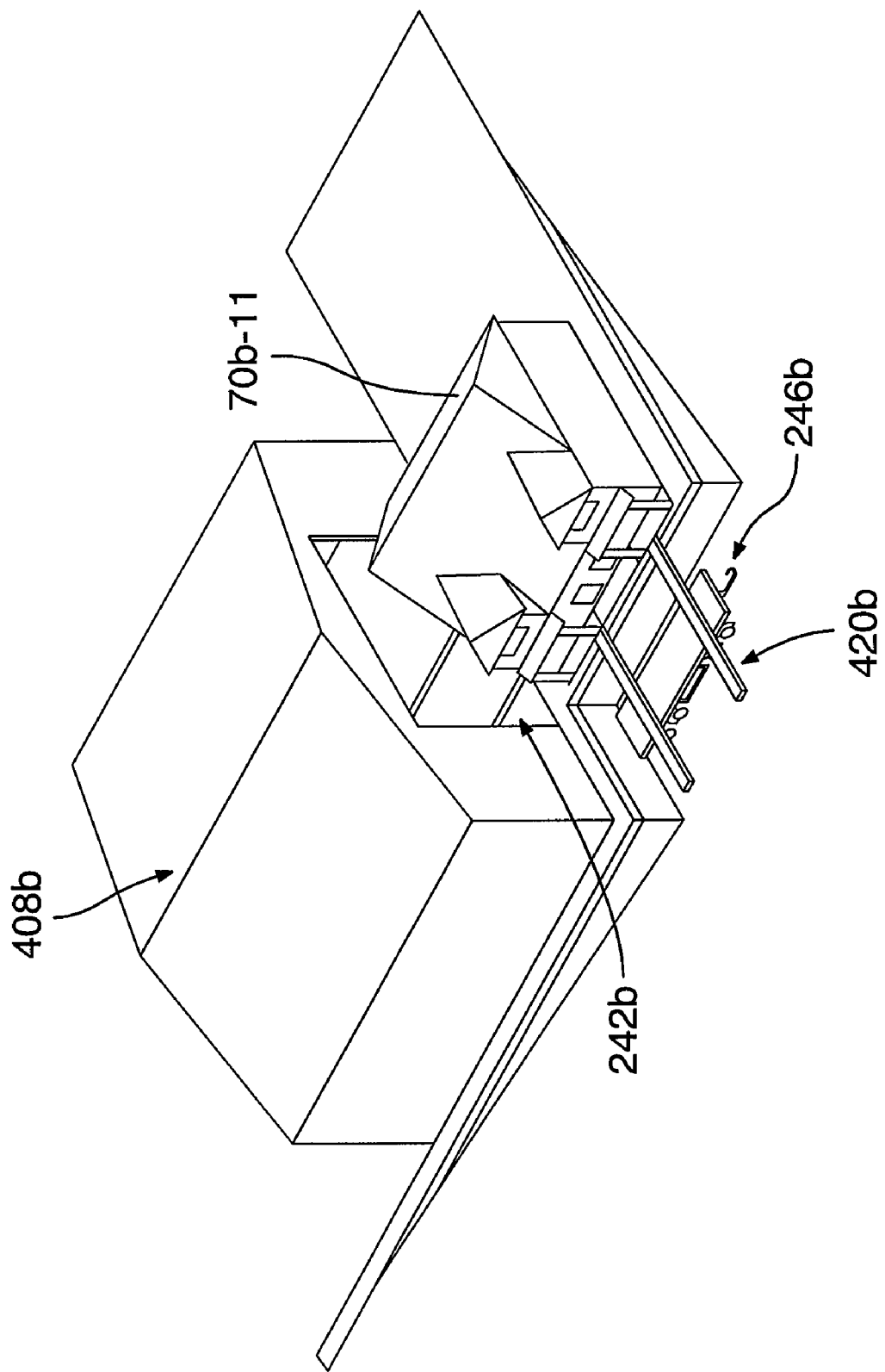

Detail A from Figure 39

Detail C from Figure 44

HOUSING MANUFACTURING SYSTEM

CROSS-REFERENCE TO RELATED APPLICATION(S)

This application is a continuation-in-part of U.S. patent application Ser. No. 11/675,938 filed Feb. 16, 2007 which is still pending. The disclosure of the above application is incorporated herein by reference in its entirety. Applicants claim priority of Canadian Patent Application No. 2,563,187, filed Oct. 11, 2006, which is incorporated herein by reference in its entirety.

FIELD OF THE INVENTION

The present invention relates generally to construction and in particular to a housing manufacturing system and method.

BACKGROUND OF THE INVENTION

Housing is a critical aspect of social living. The construction of houses and other dwellings is therefore a well-known and highly refined art. Construction techniques and esthetic styles are well known for single family dwellings, detached and semi-detached houses, condominiums, apartment buildings, town houses, and the like.

Automation is also broad reaching and used heavily in a broad range of industries and is used to build cars, trucks, planes, electronics, appliances and many other products. Automation techniques are increasingly being applied to the housing industry, and indeed are used heavily in the manufacture of modular and panelized homes. Modular and panelized homes are well suited to automation due to the fact that each unit is substantially identical and therefore an automated assembly facility can be designed to build each unit in substantially the same way using substantially the same components for each unit.

Far more vexing, however, has been the application of automation techniques to conventionally site-built homes. Conventionally site-built homes are typically built on the final construction site. They are often favoured over modular and panelized homes as they can be uniquely designed, both on the exterior and interior, to reflect the individual tastes of the homeowner. Many agree that a community of conventionally site-built homes is also far more aesthetically pleasing than a monotonous matrix of identical modular or panelized homes.

The uniqueness and size of each conventionally site-built homes is anathema to prior art automation techniques. The uniqueness of each home makes it difficult to manage and store stock. The size of each home makes it difficult to transport the home from the manufacturing facility to the site of the dwelling.

The prior art reveals several attempts to automate the construction of conventionally site-built homes. In 1978, U.S. Pat. No. 4,110,952 to Blachura, proposed a technique for constructing individual houses in a factory and delivering them to prepared foundations on a large tract of land. The issue of size was addressed by locating the factory near the final tract of land where the house would be situated, thereby minimizing the traveling distance from the factory to the final site of the dwelling. More recently, U.S. Pat. No. 6,253,504 to Cohen et al. proposed a movable manufacturing facility. The movable manufacturing facility of Cohen intended to bring standard size home building comprehensively within a controlled factory environment. Cohen disclosed that the main structure of the movable manufacturing facility was sufficiently tall to allow assembly and movement of standard size homes within. Cohen proposed multiple independent production lines to each produce portions of the dwelling in the form of subassemblies.

Unfortunately, the prior art has not proposed a practically feasible automation method for conventionally site-built homes. Since the facilities must be located close to the site for each house, the prior art facilities cannot produce enough homes to justify the capital investment required for the associated facility.

SUMMARY OF THE INVENTION

In an aspect of the invention a system for manufacturing homes is provided. The system includes a sub-assembly plant for assembling planar sections of a home, such as walls or floors, according to a production schedule for custom homes. The system also includes at least one final assembly facility located proximal to a subdivision where a plurality of the custom homes are to be situated. The final assembly facility is for receiving the planar sections from the sub-assembly plant and for constructing the homes from planar portions according to the production schedule. Each home in the production schedule can be different.

The sub-assembly plant of the system can include an assembly line for producing at least a portion of the planar sections.

The sub-assembly plant of the system can include at least one of a framing station, a drywall application station, a mechanical services station, an insulation station and a covering station. The insulation station can comprise an injector and a flowable closed cell foam dispenser for injecting the foam into a cavity defined by a frame and a drywall covering of the frame.

The planar sections can comprise wall sections that are provided with a plurality of removable hangers.

The system can include a truck for transporting the wall sections which includes an overhead rail for receiving the hangers. The truck can include a plurality of floor rails, one floor rail corresponding to each overhead rail. The floor rails are complementary to skates, and a plurality of skates can be used to move each wall section.

The final assembly facility of the system can include at least one area for building a roof for each home and an overhead crane for placing the roof on a respective home according to the production schedule.

Another aspect of the invention provides a truck for transporting planar sections of houses including a plurality of substantially parallel overhead rails for receiving hangers disposed within the sections.

The truck can include a plurality of floor rails, with one floor rail corresponding to each overhead rail. The floor rails of the truck are complementary to skates, and a plurality of skates can be used to move each planar section.

Another aspect of the invention provides a sub-assembly plant for assembling planar sections of a home according to a production schedule for custom homes, the sub-assembly plant providing the planar sections to at least one final assembly facility located proximal to a subdivision where a plurality of the custom homes are to be situated. The facility is for receiving the planar sections from the sub-assembly plant and for constructing the homes from the planar sections according to the production schedule. The sub-assembly plant comprises an assembly line for producing at least a portion of the planar sections.

The sub-assembly plant can further comprise at least one of a framing station, a drywall application station, a mechanical services station, an insulation station and a covering station.

The insulation station can comprise an injector and a flowable closed cell foam dispenser for injecting the foam into a cavity defined by a frame and a drywall covering of the frame.

Another aspect of the invention provides a final assembly facility for receiving and assembling planar sections of a home according to a production schedule for custom homes. The planar sections received from a sub-assembly plant that assembles the planar sections. The final assembly facility can be located proximal to a subdivision where a plurality of the custom homes are to be situated. The final assembly facility is for constructing the homes from the planar sections according to the production schedule. The final assembly facility can be movable.

BRIEF DESCRIPTION OF THE DRAWINGS

The invention will now be described, by way of example only, with reference to certain embodiments and the attached Figures in which:

FIG. 5 is a representation of a transfer section in the sub-assembly plant of FIG. 2;

FIG. 6 is a representation of a station in the sub-assembly plant of FIG. 2 that is for installing building mechanical into the frame;

FIG. 13 is an isometric view that shows the hanging system of FIG. 12 in greater detail;

FIG. 14 is a partial sectional view that shows the hanging system of FIG. 12 in greater detail;

FIG. 20 shows a perspective view of a skate and a rail for use in moving wall sections in accordance with another embodiment;

FIG. 21 shows a front view of the skate of FIG. 20;

FIG. 22 shows a side view of the skate of FIG. 20;

FIG. 34 is a perspective view of the loading area of the facility of FIG. 25;

DETAILED DESCRIPTION OF THE EMBODIMENTS

Figure 1:
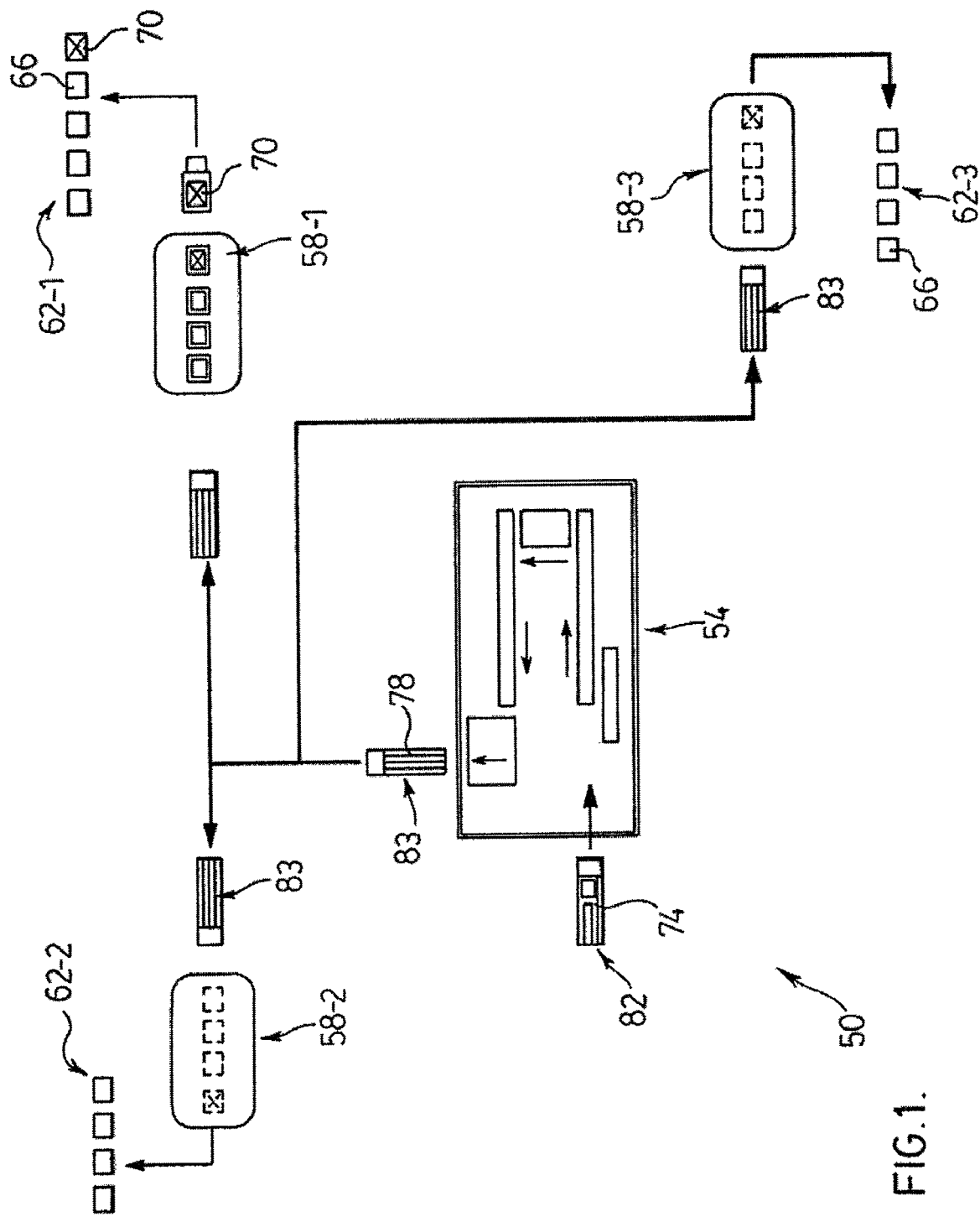
FIG. 1 is a schematic representation of a home manufacturing system and method in accordance with an embodiment of the invention.

Referring now to FIG. 1, a home manufacturing system is indicated generally at 50. System 50 comprises a sub-assembly plant 54 and a plurality of final assembly facilities 58-1, 58-2, 58-3. (Collectively referred to as facilities 58, and generically as facility 58. This nomenclature is used elsewhere herein.).

Sub-assembly plant 54 receives raw building materials 74 via truck 82 and produces fully assembled wall sections 78 of each house 70 which are shipped from plant 54 via truck 83. Also produced in sub-assembly plant 54 are floor sections 80 (not shown in FIG. 1) which are also shipped via truck 83.

Each final assembly facility 58 is located proximal to a subdivision 62 or tract of land consisting of a plurality of adjacent lots 66 where houses 70 manufactured according to system 50 will be located. Lots 66 appear as squares in FIG. 1, while each house 70 appears as an "X" within a square in FIG. 1.

Sub-assembly plant 54 is typically a permanent structure having a location that is chosen in a manner so as to consider efficient access to raw building materials 74 while also considering efficient access to the plurality of subdivisions 62. Other factors influencing the location of plant 54 include more traditional considerations including labour, electricity, gas, and water. As an example, and assuming the other factors are not a significant consideration, plant 54 can be (though need not be) located so as to be substantially equidistant from all subdivisions 62 while still being accessible to raw building materials 74.

In contrast to sub-assembly plant 54, each final assembly facility 58 is typically a temporary facility that is used for assembling wall sections 78 and floor sections 80 and the roof into the house structure. Each final assembly facility 58 is also used to complete final finishes on each house 70 before depositing the finally assembled house 70 onto the foundation of its intended lot 66. Thus, it is contemplated that sub-assembly plant 54 may at any given time serve different sets of final assembly facilities 58. For example, as different subdivisions 62 are filled with houses 70, then the final assembly facility 58 associated with that subdivision 62 will be dismantled, while another final assembly facility 58 is situated near a new, empty subdivision 62. Put in other words, sub-assembly plant 54 need not be supplying each subdivision 62 at the same time, and thus, the location of sub-assembly plant 54 can be chosen to be proximal to each subdivision 62 considering that not all subdivisions are being built at a given time.

Figure 2:
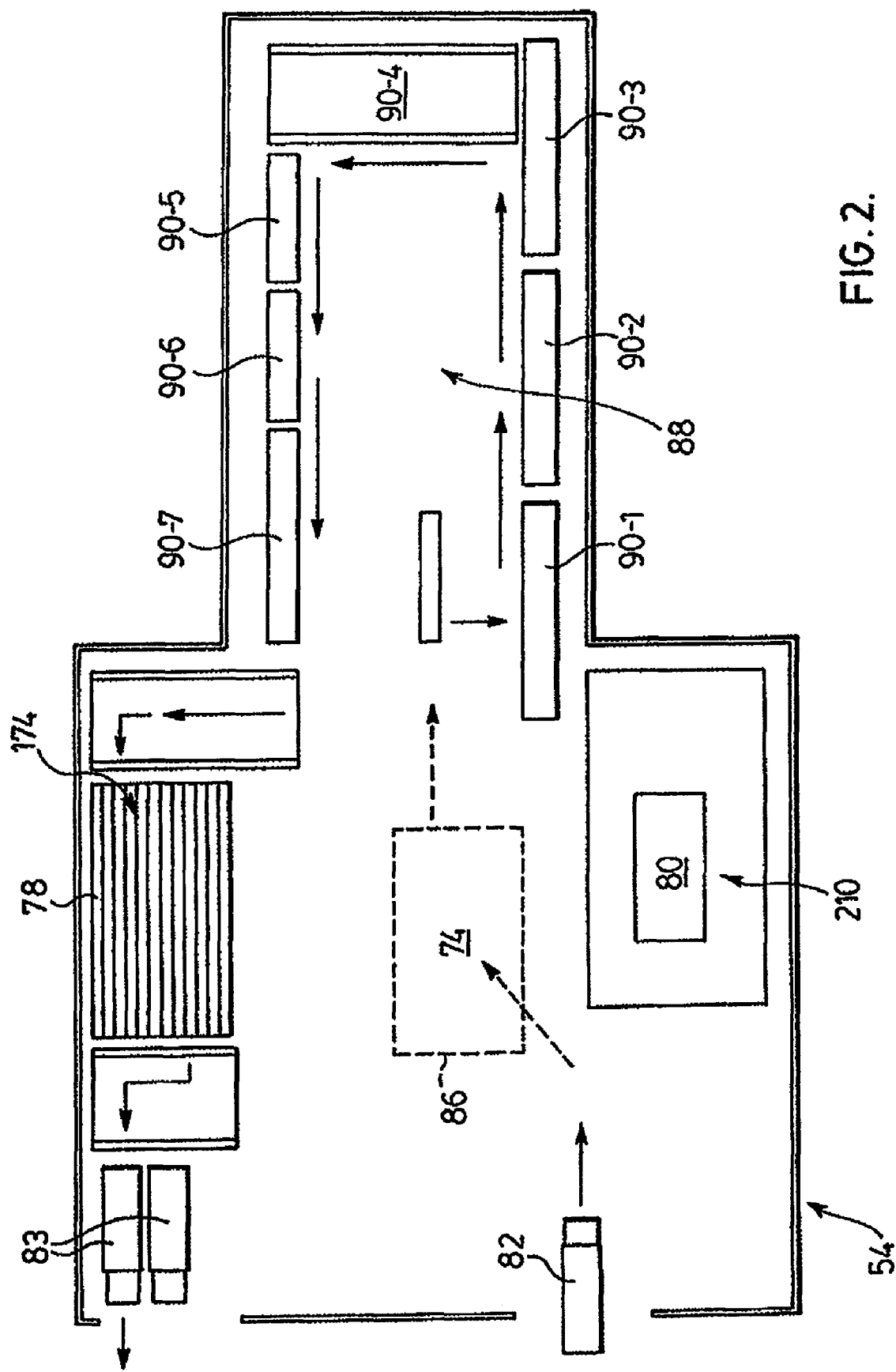
FIG. 2 is a schematic representation of the sub-assembly plant within FIG. 1.

Referring now to FIG. 2, sub-assembly plant 54 is shown in greater detail. Raw materials 74 are received at plant 54 via raw-material truck 82 (or other transport) and placed into a staging area 86. Raw materials include all of the basic building components for creating wall sections 78 and floor sections 80. Such raw materials thus include the materials for framing a house, including wood or metal studs, as well as drywall, windows, insulation, and building mechanical. (As used herein, building mechanical includes all electrical, plumbing, heating ventilation and cooling (HVAC) ducts, central vacuum, telephone, cable, Ethernet, including outlets and junctions therefor, and any other components which are typically run within the interior or exterior walls or floors of a house.)

Plant 54 also includes a wall assembly line 88 that can be automated with robotic equipment or manually implemented and/or a combination of both. In a present embodiment, wall assembly line 88 includes a plurality of stations labeled as 90-1, 90-2, 90-3, 90-4, 90-5, 90-6 and 90-7. Stations 90 progressively build one entire wall section for each house 70.

Figure 3:
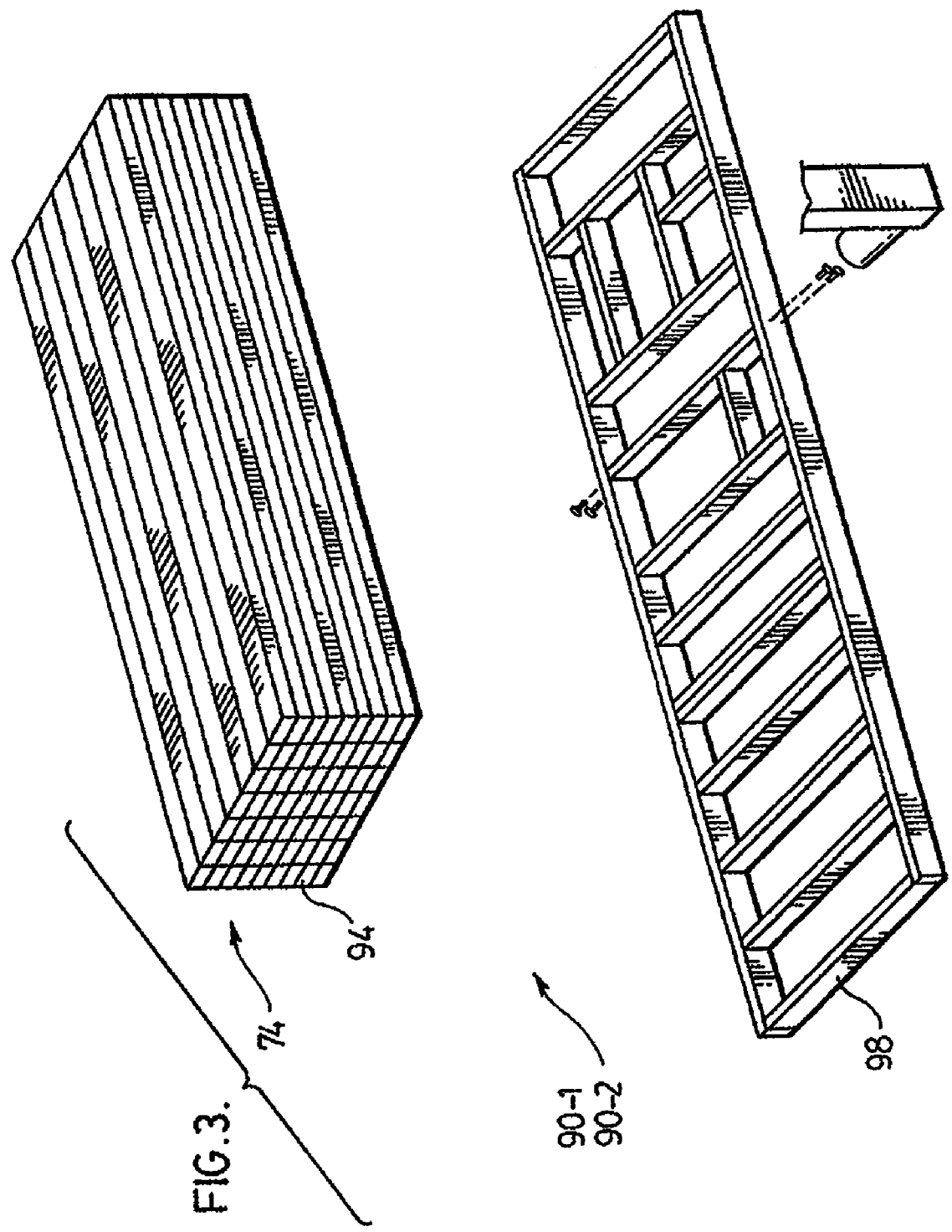
FIG. 3 is representation of certain stations in the sub-assembly plant of FIG. 2 that are for framing wall sections of a house.

Referring now to FIG. 3, stations 90-1 and 90-2 are shown in greater detail, as raw materials 74 in the form of studs 94 are constructed into a frame 98. Stations 90-1 and 90-2 are preferably fully automated, such that studs 94 are automatically loaded into machinery and assembled into frame 98, and attached to each other, using robotics and other automation equipment. Preferably, such automation equipment is also computer numerically controlled, so that the dimensions of frame 98 and the location of window and door frames are automatically supplied to the robotics. In this manner, it is intended that computer scheduling software can be used to substantially automate the scheduling aspect of the production of each frame 98 according to supplies of raw material 74 and/or the demands for particular types of wall sections for a given house 70 at a given subdivision 62.

Figure 4:
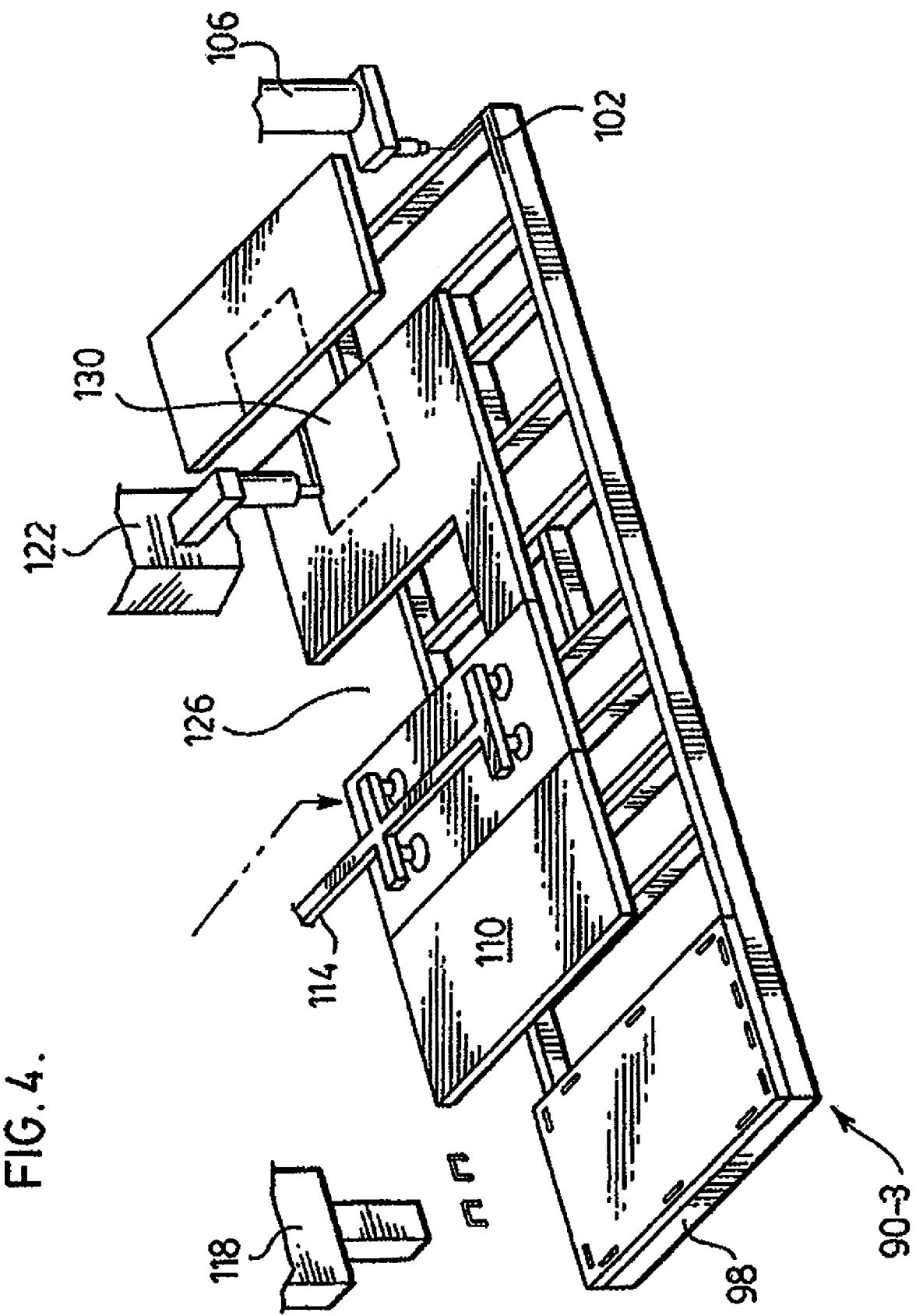
FIG. 4 is a representation of certain stations in the sub-assembly plant of FIG. 2 that are for applying drywall to the frame.

The remaining stations 90 in line 88 are likewise configured to substantially complete an entire wall for a particular house 70. In FIG. 4, station 90-3 is shown in greater detail as a first layer of drywall (or other type of covering) is automatically applied to frame 98. Glue 102 is applied to frame 98 via a robotic glue gun 106. Sheets of drywall 110 are automatically placed into position via a vacuum assist arm 114. (Vacuum assist arm 114 can be manually operated, or automatically operated via a robot). An automatic staple gun 118 mechanically fastens drywall 110 to frame 98. A robotic cutter 122 removes portions of drywall 110 to expose doors 126 and windows 130 within frame 98.

In FIG. 5, frame 98 is shown exiting station 90-3 at which point it is turned over and deposited into station 90-4 exposing the backside of frame 98. Preferably, frame 98 is turned over in an automated fashion in keeping with the automation of assembly line 88.

In FIG. 6, a cutaway of frame 98 is shown. In FIG. 6, representing station 90-4, mechanical components are run through each frame 98. (As mentioned previously, such mechanical components include all electrical, plumbing, heating ventilation and cooling (HVAC) ducts, central vacuum, telephone, cable, Ethernet, including outlets and junctions therefor, and any other components which are typically run within the interior or exterior walls or floors of a house.) In FIG. 6, representative mechanical components include an electrical outlet 134 and electrical conduit 138. Mechanical components, in a present embodiment, are typically installed manually by semi-skilled labour. When house 70 is fully assembled, the integrity of these mechanical components can be tested by skilled trades (i.e. licensed electricians for electrical components; licensed plumbers for plumbing). The exact locations, and types of mechanical components installed within frame 98 would again be done according to building design and specifications for a given house 70. The choices of mechanical materials can be traditional components used when building a house on-site in the traditional fashion, however, the mechanical materials can also be chosen to complement the environment of assembly line 88. Also, of note, the mechanical materials would be chosen to have relatively simple connections or junctions at the periphery of each frame 98, to facilitate connection to corresponding mechanical components in adjacent wall sections 78. Such locations and types would be presented automatically via a computer screen to the individuals conducting the installations at station 90-4.

Figure 7:
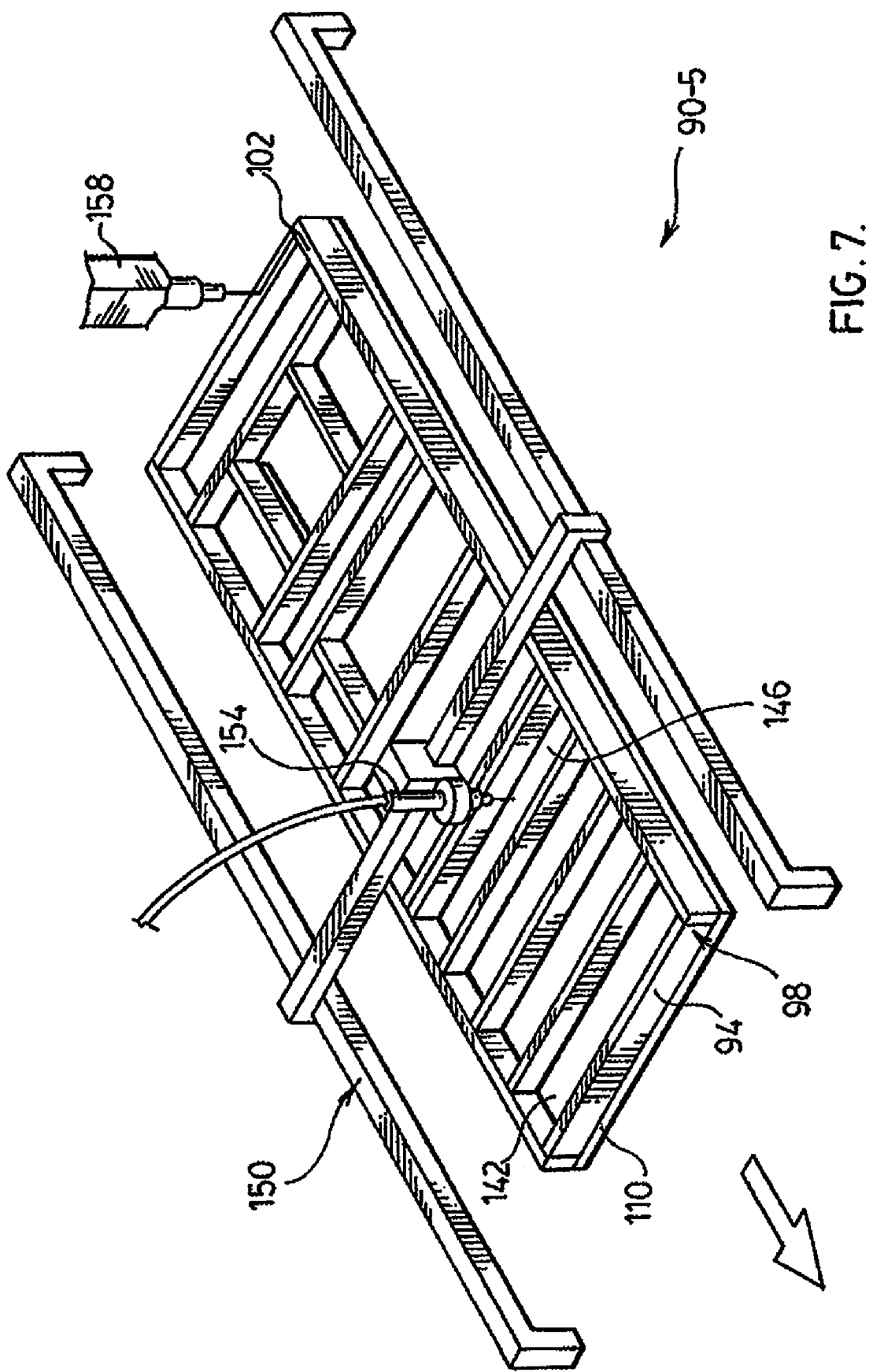
FIG. 7 is a representation of a station in the sub-assembly plant of FIG. 2 which is for injecting insulation into cavities of a frame of a wall.

Once the mechanical components are installed in frame 98, frame 98 is advanced from station 90-4 to station 90-5. Station 90-5 is represented in FIG. 7. In station 90-5, foam insulation 146 is injected in a flowable form into cavities 142 defined by drywall 110 and studs 94 of frame 98. Foam insulation 146 will cure within each cavity 142. A presently preferred foam insulation is a closed cell foam that is commonly used to insulate buildings and homes and is often sold in preformed sheets. In a present embodiment, an overhead X-Y gantry 150 which includes an injector 154 that dispenses foam 146 into each cavity 142 according to a predefined depth and pattern. Gantry 150 and injector 154 are likewise computer controlled.

Note that while insulation 146 can be applied in any wall portion of a house 70, typically insulation 146 is only applied to the exterior walls of any given house 70. However, it can be desired to apply insulation 146 to interior walls where sound proofing is desired, such as between bathroom walls or bedroom walls. Thus, where no insulation 146 is needed for a given frame 98, gantry 150 can remain dormant for that particular frame 98.

Station 90-5 also includes a second glue gun 158 that that applies a second layer of glue 102. Glue gun 158 operates in substantially the same manner as glue gun 106.

Figure 8:
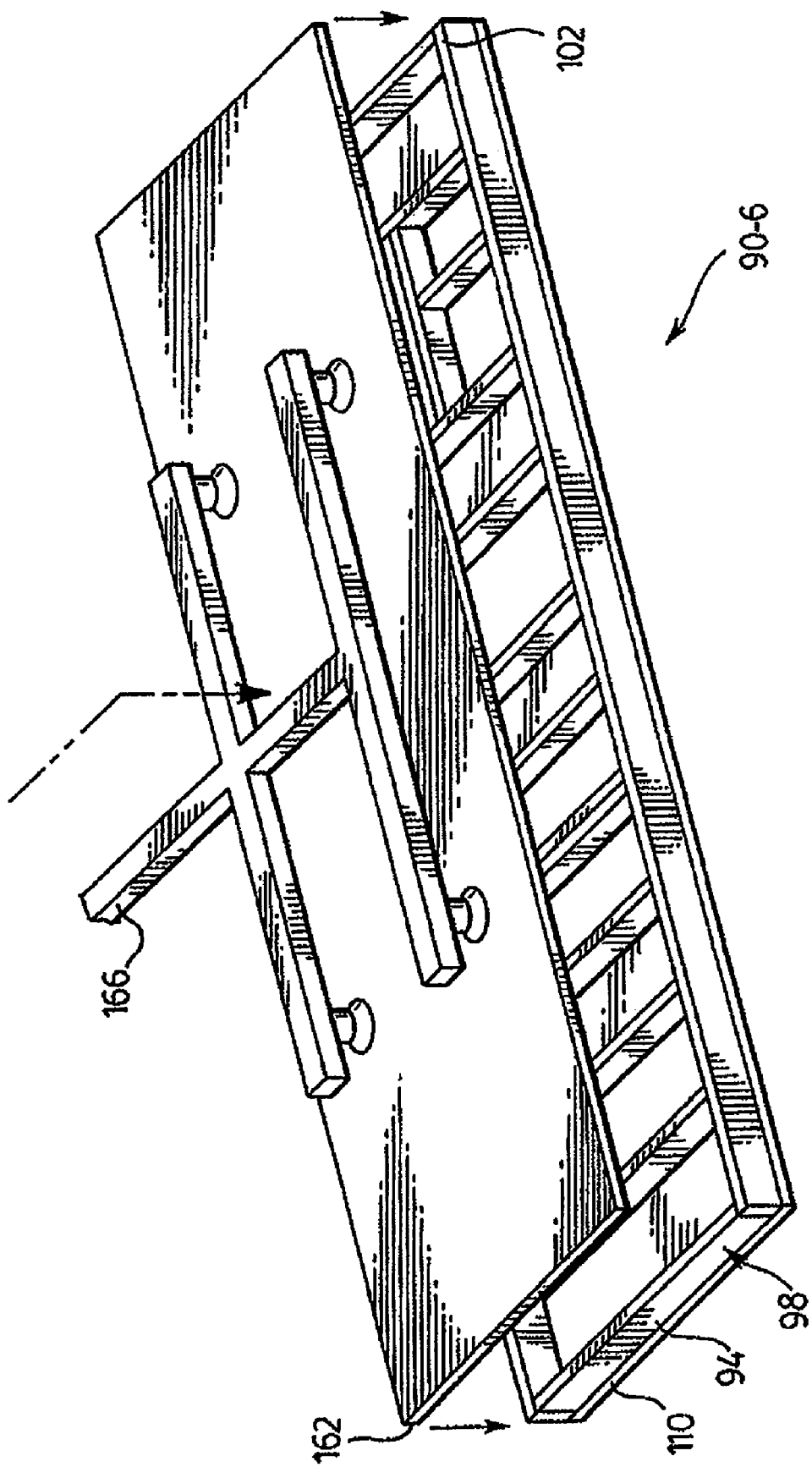
FIG. 8 is a representation of a station in the sub-assembly plant of FIG. 2 for applying a coating, such as drywall, to the frame.

Once the insulation 146 and glue 102 are applied at station 90-5, frame 98 is advanced from station 90-5 to station 90-6. Station 90-6 is represented in FIG. 8. In station 90-6, a covering 162 is applied to the exposed side of frame 98. A vacuum assist arm 166, much like vacuum assist arm 114, can be used to place covering 162 onto frame 98 in station 90-6. Where frame 98 is for an external wall, covering 162 can be a sheathing, such as plywood, oriented strand board, code board or the like. Where frame 98 is for an internal wall, then covering 162 will typically be the same as drywall 110.

At this point those skilled in the art will also now appreciate that covering 162 (and/or drywall 110) can in fact be any type of covering for frame 98 to present a visible surface for an interior or exterior wall.

Figure 9:
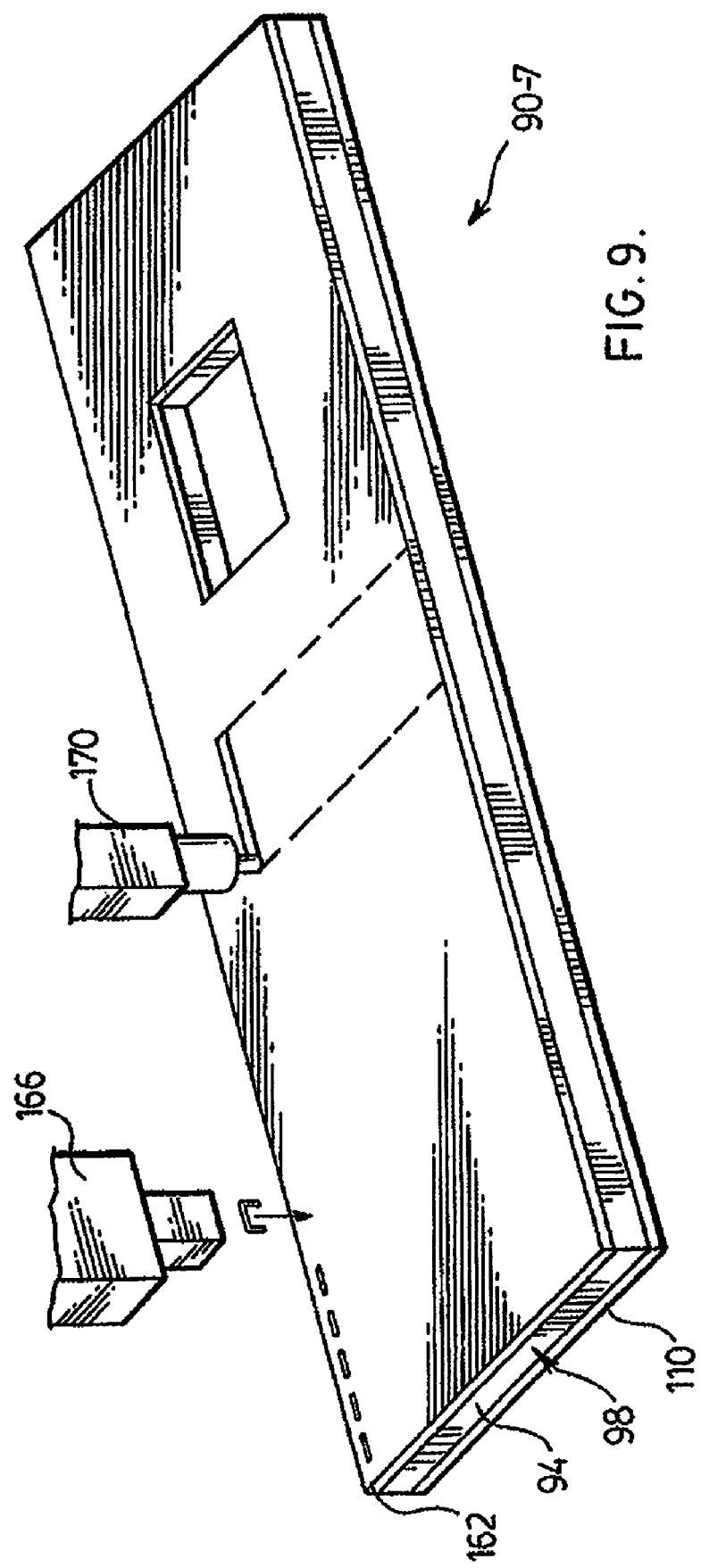
FIG. 9 is a representation of certain stations in the sub-assembly plant of FIG. 2 that is for affixing the coating to the frame and for revealing cutaways.

Once covering 162 is applied at station 90-6, frame 98 is advanced from station 90-6 to station 90-7. Station 90-7 is represented in FIG. 9. In station 90-7 covering 162 is mechanically fastened to frame 98 and, if needed, cutaways, such as for doors and windows, are made. In FIG. 9, it is assumed that covering 162 is drywall, and accordingly, a staple gun 166, much like staple gun 118, is used to apply staples to covering 162 along studs 94. However, where covering 162 is another type of material, another type of mechanical fastening device, and corresponding fasteners, other than staple gun 166, can be used. Cutaways are made by a robotic cutter 170, much like cutter 122, to expose doors and windows and the like.

Figure 10:
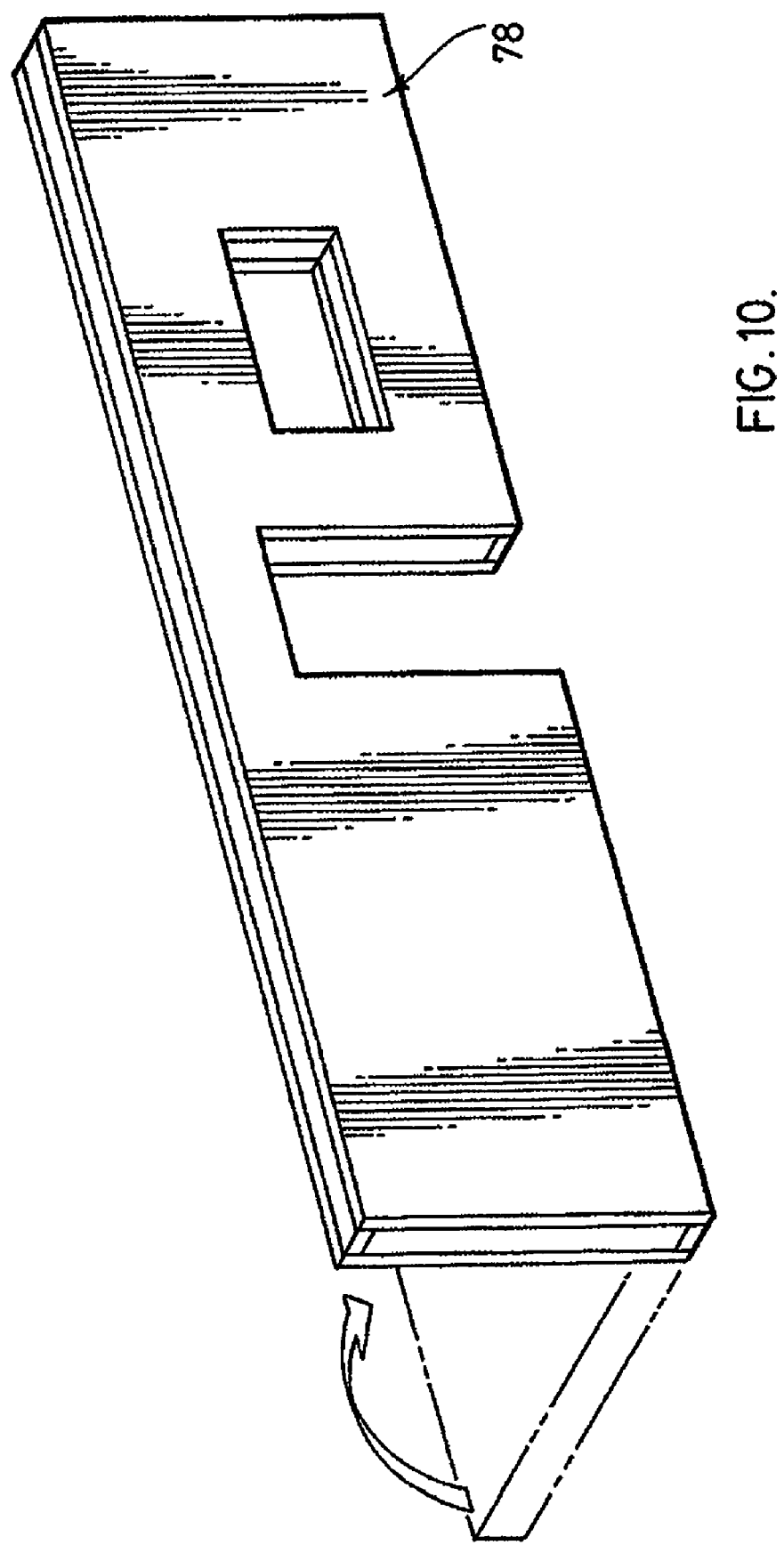
FIG. 10 is a representation of a transfer station in the sub-assembly plant of FIG. 2.
Figure 11:
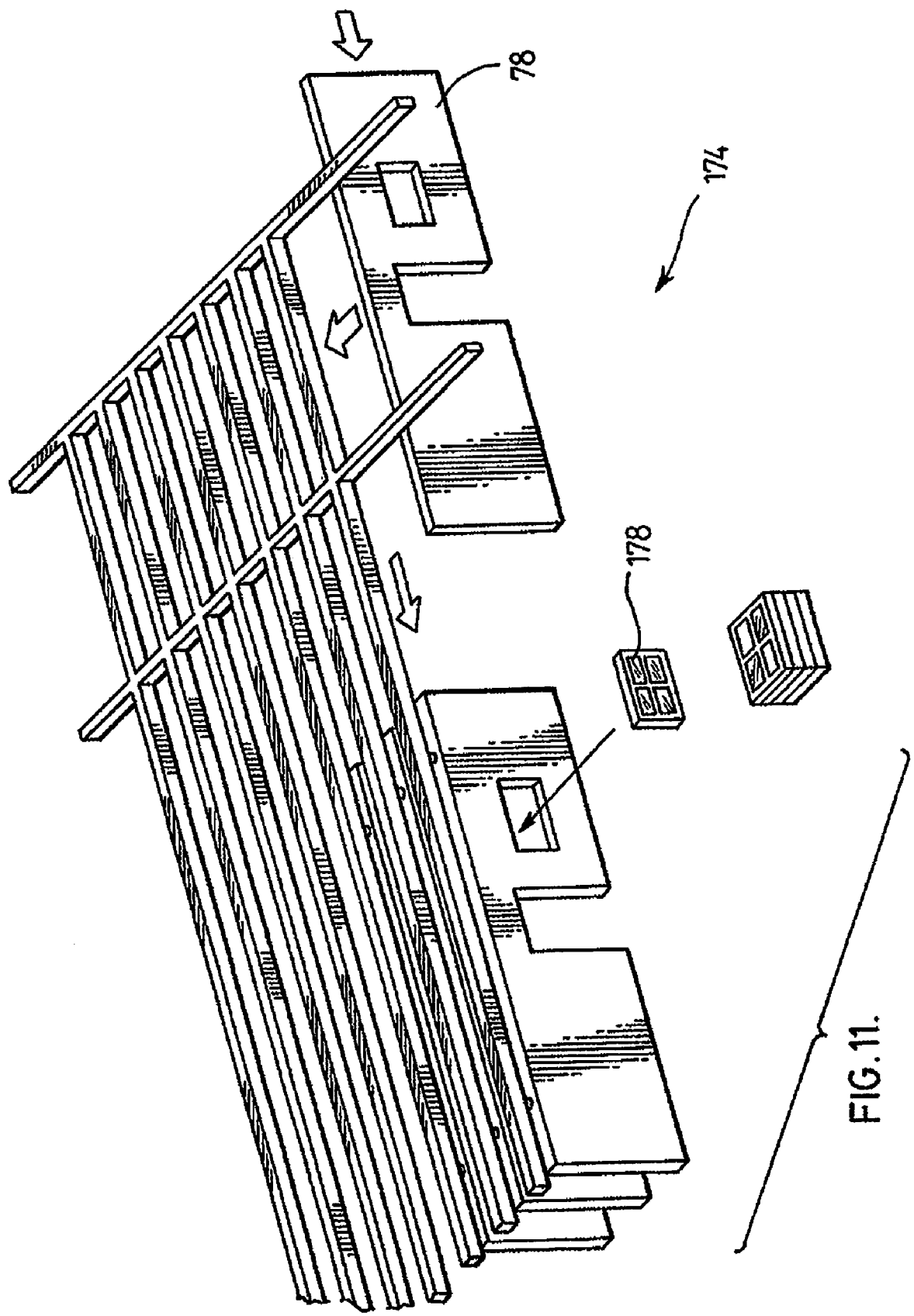
FIG. 11 is a representation of a staging area of the sub-assembly plant of FIG. 2.

As can be seen in FIG. 10, once work in station 90-7 is complete, a planar wall section 78 is now substantially complete and ready for shipping to its destination final assembly facility 58 for assembly into its respective house 70. Thus, referring again to FIG. 2, sub-assembly plant 54 also includes a staging area 174 where completed wall sections 78 are vertically stacked and queued for eventual transport via trucks 83 to their respective final assembly facilities 58. Staging area 174 is shown in greater detail in FIG. 11. Optionally, as shown in FIG. 11, further work can be done on each wall section 78, such as adding windows 178.

At this point it will now be reiterated to those of skill in the art that assembly line 88 is highly configurable so that each wall section 78 that is produced can be very unique in terms of dimensions, locations of doors and windows, type and location of building mechanical, type of external coverings. Thus, as purchasers make requests for specific configurations of houses 70, so too can sub-assembly plant 54 be configured to schedule production runs of specific wall sections 78 accordingly. Likewise, such production runs on assembly line 88 can be scheduled so as to fill trucks 83 according to the particular final assembly facility 58 to which such trucks 83 are destined.

Figure 12:
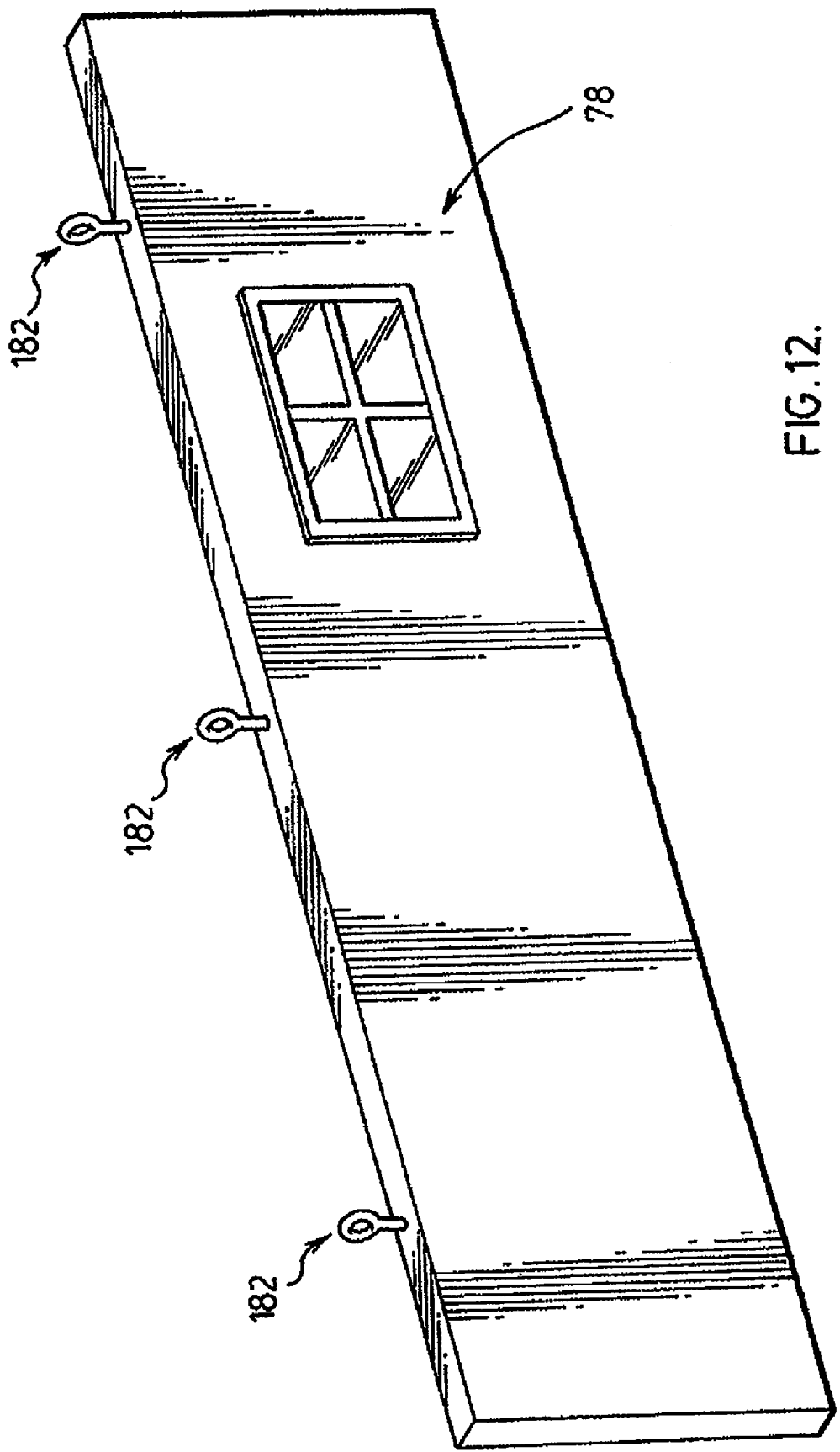
FIG. 12 shows part of a hanging system for hanging wall sections made using the sub-assembly plant of FIG. 2.

Various means of loading wall sections 78 into trucks 83 are contemplated. However, in a presently preferred embodiment of the invention, a hanging system is employed. Referring now to FIGS. 12-15, a novel and inventive set of removable hangers 182 are employed in order to suspend wall sections 78 during transportation in trucks 83. As best seen in FIG. 12, a series of hangers 182 are mounted to the top of each wall section 78. An appropriate number of hangers 182 are employed in order to securely support the weight of each wall section 78.

As best seen in FIGS. 13 and 14, each hanger 182 comprises a threaded eye bolt 186 that can be screwed into (or removed from) a complementary nut portion 190. Nut portion 190 has a flange portion 194 and a female-threaded portion 198 which receives the threads on bolt 186. Flange portion 194 abuts the under-side of stud 94, while female-threaded portion 198 is received within a hole that passes through stud 94. Flange portion 194 thus supports the localized weight of each stud 94. The height of female-threaded portion 198 is chosen to substantially match the depth of stud 94, or is at least less than the depth of stud 94, so as to not protrude from the top of stud 94 and thereby alter the dimensions of frame 98. Those skilled in the art will now recognize that once wall section 78 is received at final assembly facility 58, each eye bolt 186 can be removed from female-threaded portion 198, so that wall section 78 is left with no projections and the dimensions originally prescribed.

Figure 15:
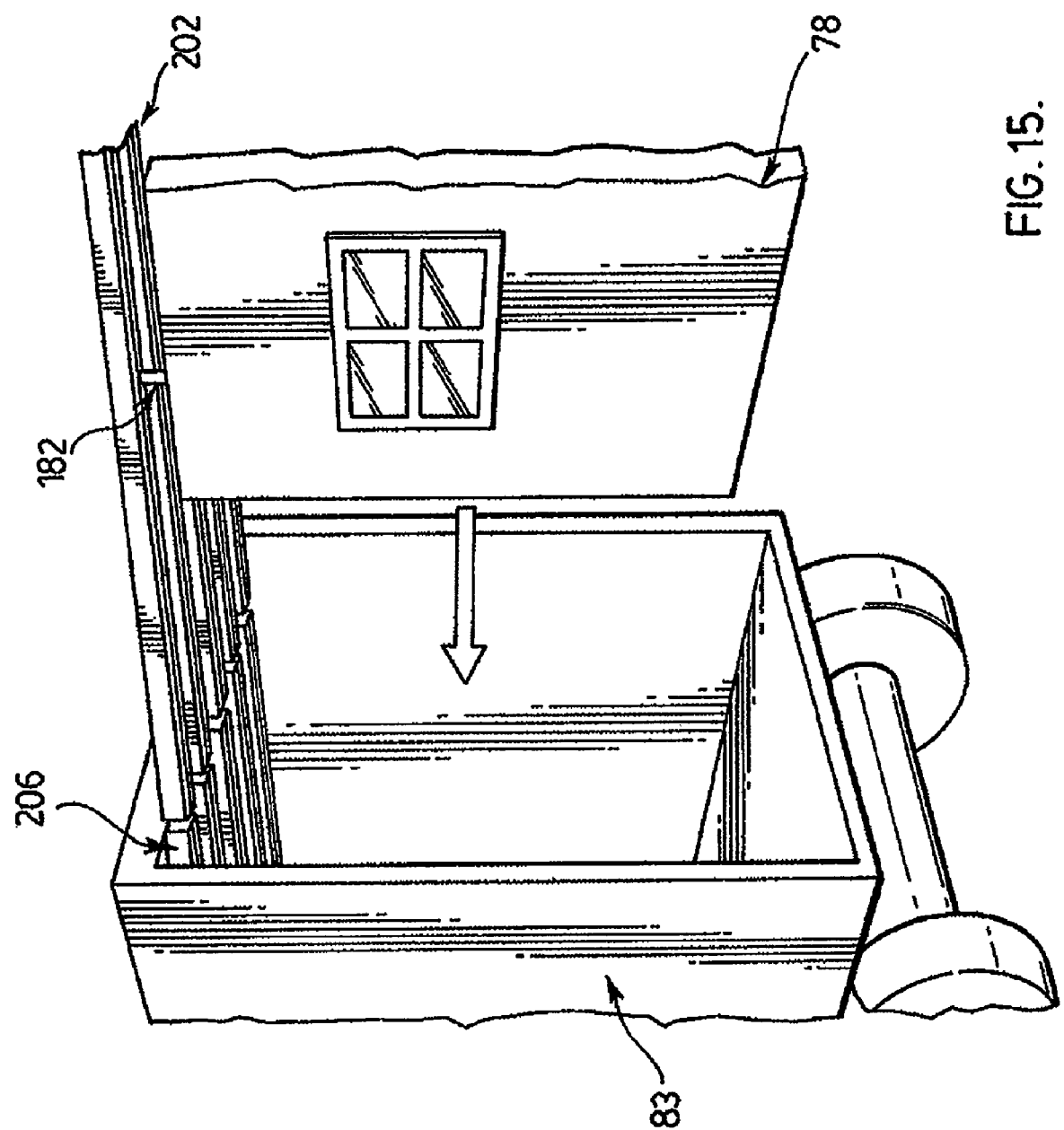
FIG. 15 is an isometric view showing how the hanging system of FIG. 12 can be used to store and transport wall sections made using the sub-assembly plant of FIG. 2.

As best seen in FIG. 15, hangers 182 thus can be slid into a channelized overhead rail 202 within staging area 174 that align with a channelized overhead rail 206 within truck 83. Rails 202 and 206 capture the eye portion of eyebolt 186 so that rails 202 and 206 can support the weight, and allow the storage of wall sections 78. A plurality of rails 206 can be disposed in parallel and/or series within each truck 83 so that a plurality of wall sections 78 can be carried simultaneously by truck 83.

Referring again to FIG. 2, sub-assembly plant 54 also includes a flooring area 210 where floor sections 80 are manufactured. Floor section 80 can be manufactured using an assembly line like assembly line 88, or manually, as desired. However manufactured, each floor section 80 constitutes all or part of a floor for each house 70. Again, each floor section 80 is made according to the custom design of each house 70. Where a house 70 has multiple stories, then flooring area 210 can be used to make floors for each storey. Each floor section 80 is likewise shipped via truck 83 to a final assembly facility 58.

Figure 16:
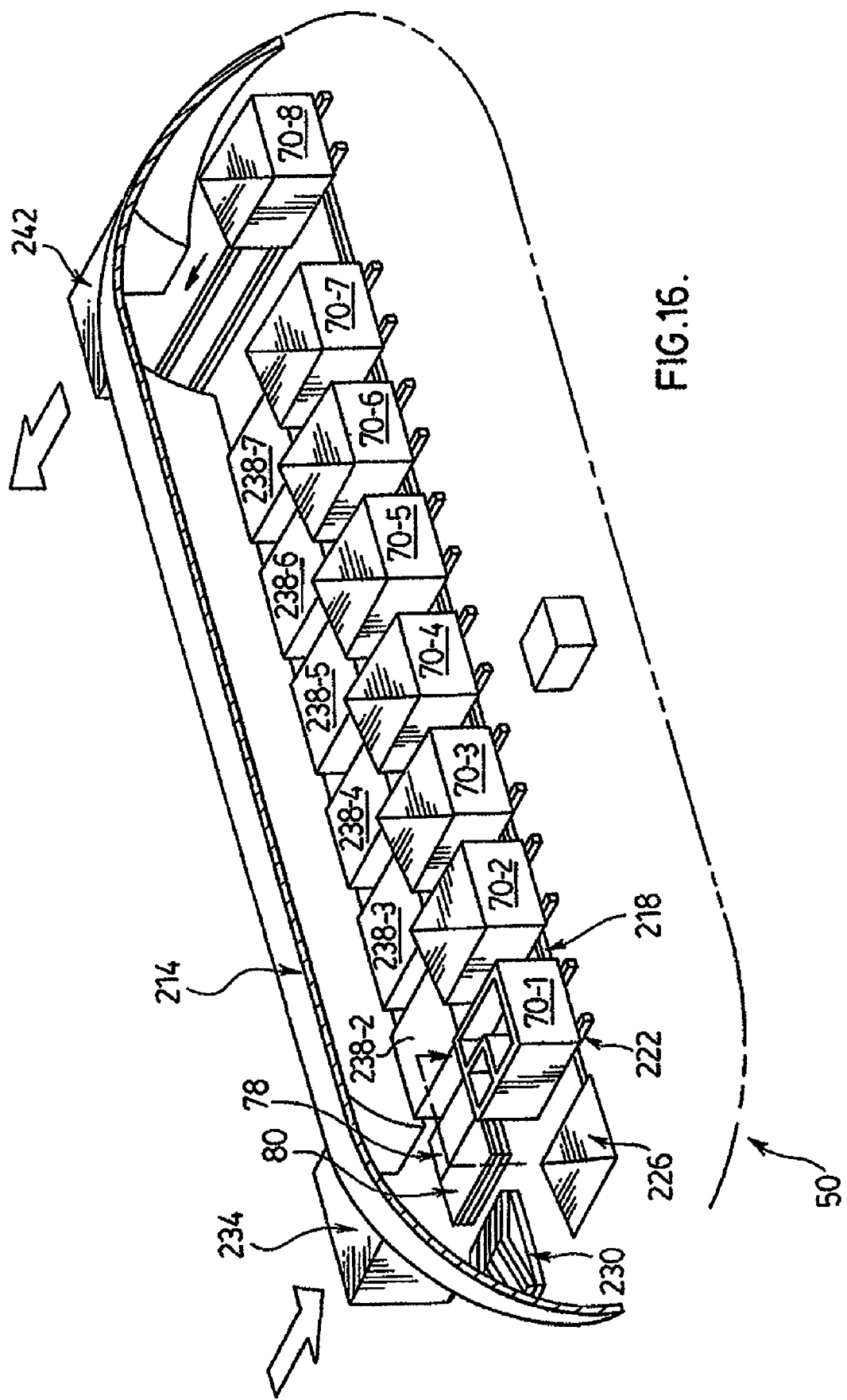
FIG. 16 is an isometric view of an exemplary final assembly facility from the system of FIG. 1.
Figure 17:
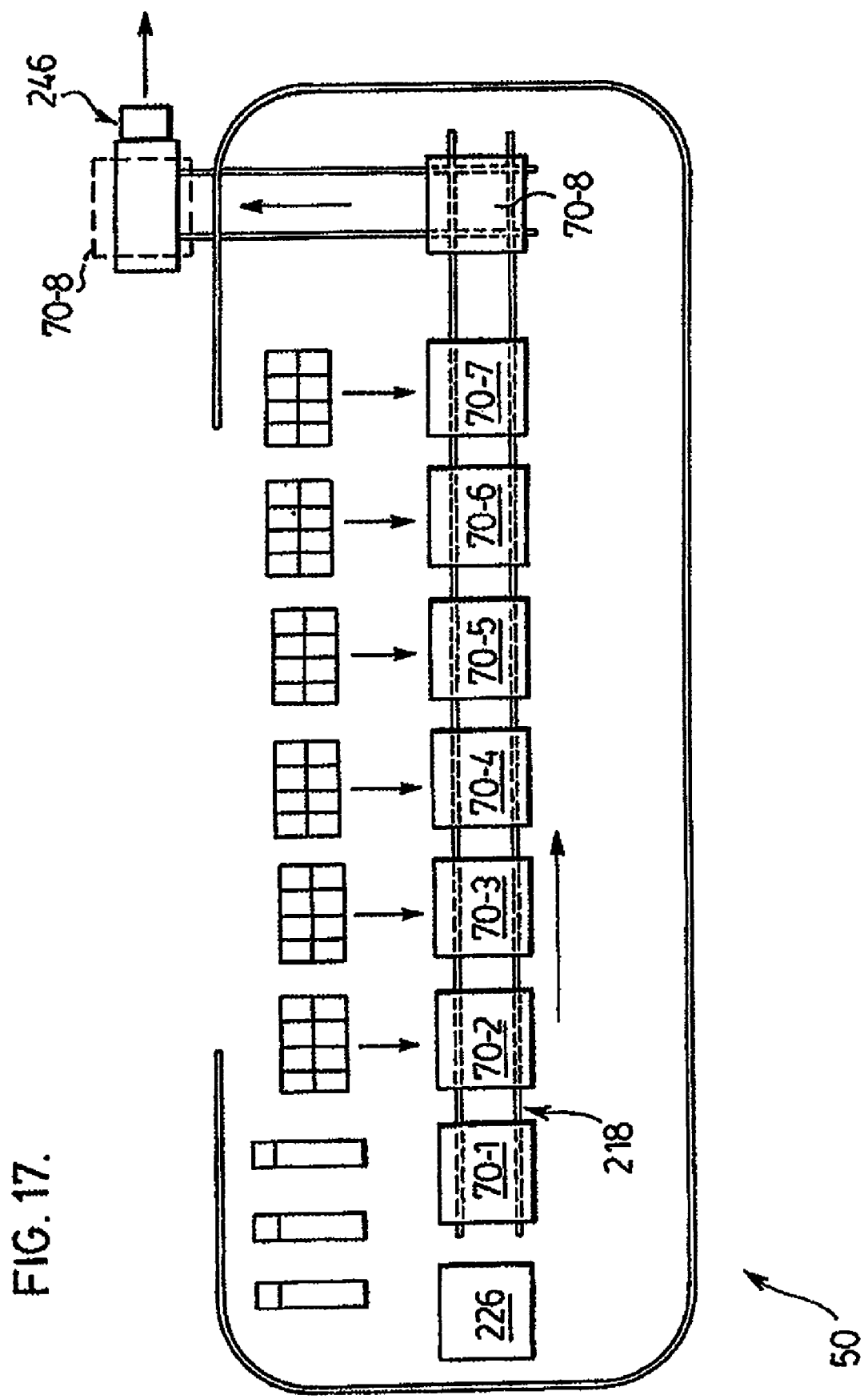
FIG. 17 is a top planar view of the final assembly facility of FIG. 16.

Thus, once floor sections 80 and wall sections 78 are complete, they are shipped via truck 83 to their intended final assembly facility 58. Referring now to FIGS. 16 and 17, an exemplary final assembly facility 58 in accordance with another embodiment is shown in greater detail. As best seen in FIG. 16, final assembly facility 58 is made from a temporary structure, which in a present embodiment is a flexible material 214 held by a temporary frame made of aluminum tubing, not shown. A presently preferred flexible material 214 is the same material used to build a so-called "tennis bubble".

Facility 58 also includes a pair of rails 218 that run the length of final assembly facility 58. Each house 70 is built upon a pair of beams 222 that run along the length of rails 218. A roof 226 for each house 70 is built at a first, beginning end of rails 218. Roof 226 is built from trusses 230 received via an inbound loading dock 234 which receives trucks 83.

Wall sections 78 and floor sections 80 received via dock 234 are assembled in order to build the exterior and interior shell of the first house 70-1 on rails 218. During such assembly mechanical components between each wall section 78 and floor section 80 are connected. Once the shell of house 70-1 is complete, an overhead crane or gantry is used to place roof 226 onto house 70-1.

Final assembly facility 58 includes a plurality of stations, responsible for various stages of completion of each house. Final assembly facility 58 in FIGS. 16 and 17 is shown with eight houses, 70-1, 70-2 . . . 70-8, each at various stages of completion. Inventory 238 for each station is kept adjacent to each station. Each station is used to progressively finish each house 70. Such finishings include, for example: stairs, railings, light fixtures, plumbing fixtures, painting, doors, windows. Again, all steps taken at each station can be completely customized according to the order of the purchaser of the house 70.

Once a house is complete, such as house 70-8, it exits facility 58 via an output docking port 242 transported via a specially designed transporter 246. Transporter 246 has a flatbed which sits above a front and rear cab, both of which have controls for steering the transporter 246. Transporter 246 is also steerable via remote control, so that the operator can be outside of transporter 246 and maneuver transporter 246 while having full view of all angles of transporter 246. Transporter 246 also has steerable front and rear axles in order to be able to tightly maneuver the house 70 to its final lot 66. The flatbed of transporter 246 is below-grade to facility 58, so that rails 218 are on the same level as the flatbed of transporter 246.

Figure 18:
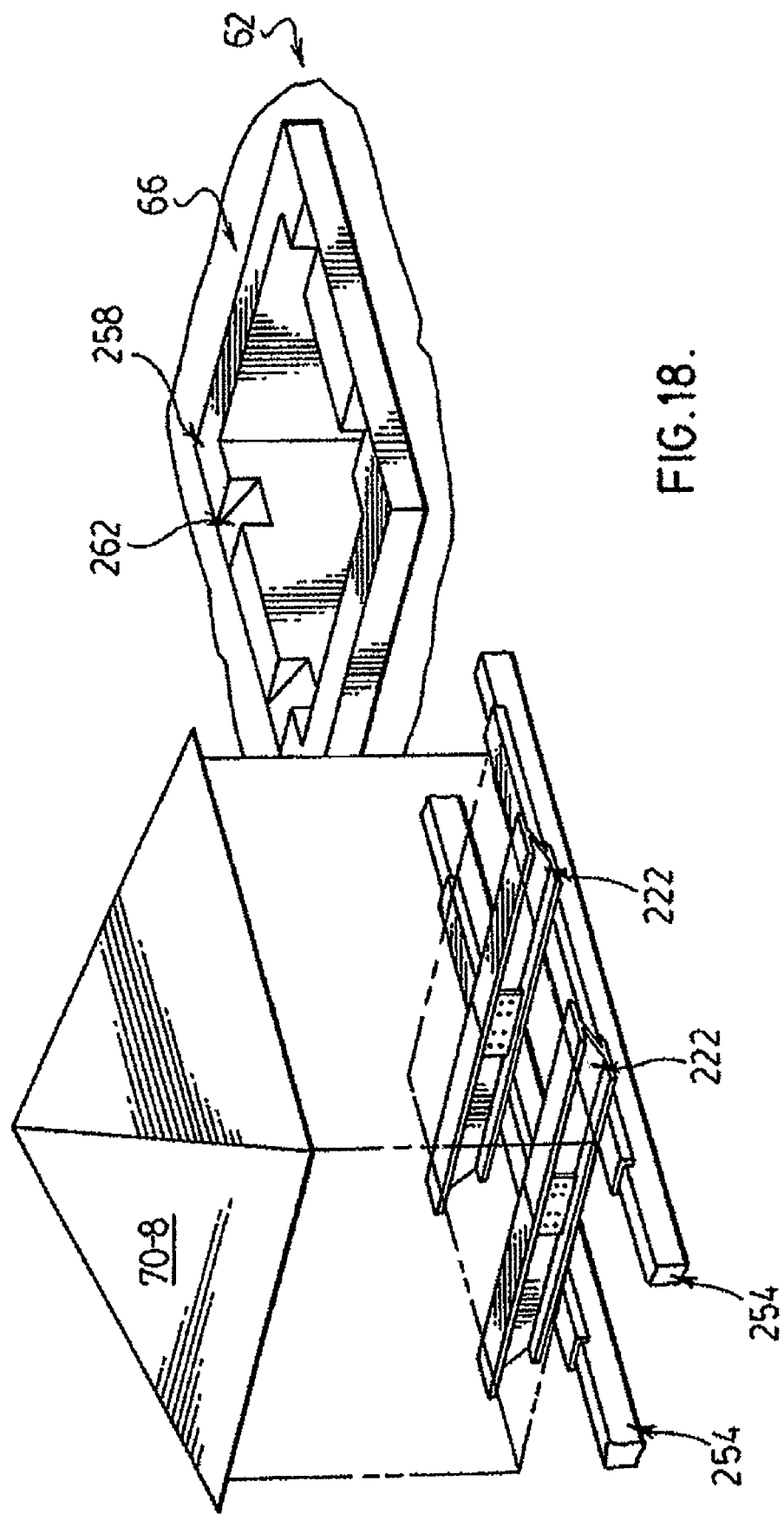
FIG. 18 shows an exemplary mechanism for transferring a house built using the system of FIG. 1 onto a foundation.

As best seen in FIG. 18, house 70-8 is then carried by transporter 246 to the final lot 66 within subdivision 62 where house 70-8 is to be placed. Also as seen in FIG. 18, the flatbed of transporter 246 (not shown in FIG. 18) comprises a pair of slider-rails 254 which support beams 222 of house 70-8. House 70-8 is slid off of slider-rails 254 and onto a pre-poured foundation 258 on lot 66. Foundation 258 includes a plurality of tapered sockets 262 which are positioned to receive the distal ends of beams 222 in a complementary manner.

Figure 19:
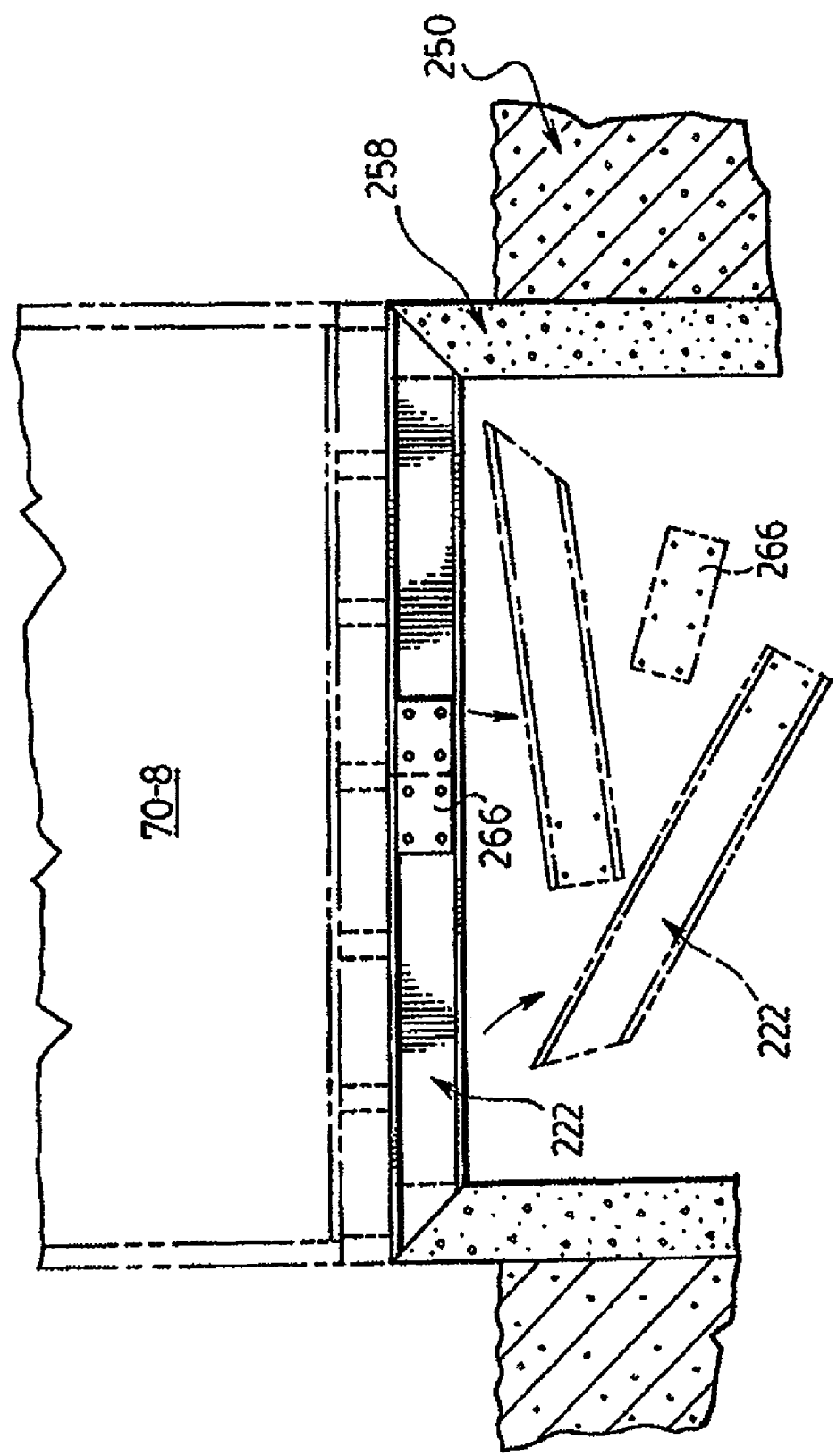
FIG. 19 shows how the mechanism of FIG. 18 can be removed once the house in FIG. 18 is in position on the foundation.

As best seen in FIG. 19, once house 70-8 is in position on foundation of 258, beams 222 can be removed by unfastening and removing a joining-plate 266, which separates each beam 222 into halves and allows removal of each beam 222 from the basement of house 70-8. While FIG. 19 shows two halves, it should be understood that each beam 222 can have a plurality of sections connected with a plurality of removable joining-plates.

It is to be understood that sub-sets and combinations and variations of the foregoing embodiments are contemplated and within the scope of the invention. One such variation is shown in FIGS. 20, 21 and 22, which depict a skate 300*a* which can be used to maneuver wall sections 78. Skate 300*a* comprises an inverted-U shaped body 304*a* and a plurality of wheels 308*a* mounted to the extremities of each arm 310*a* of body 304*a*. Wheels 308*a* are rotable within each arm 310*a* so that skate 300*a* can be rolled along a surface, such as the floor of sub-assembly plant 54.

As seen in FIG. 20, a rail 320*a*, complementary to the inverted-U shape of body 304*a* can be mounted along a surface, such as the floor of sub-assembly plant 54. Skate 300*a* can be rolled over rail 320*a*, so that rail 320*a* will guide the path of movement skate 300*a*.

Figure 23:
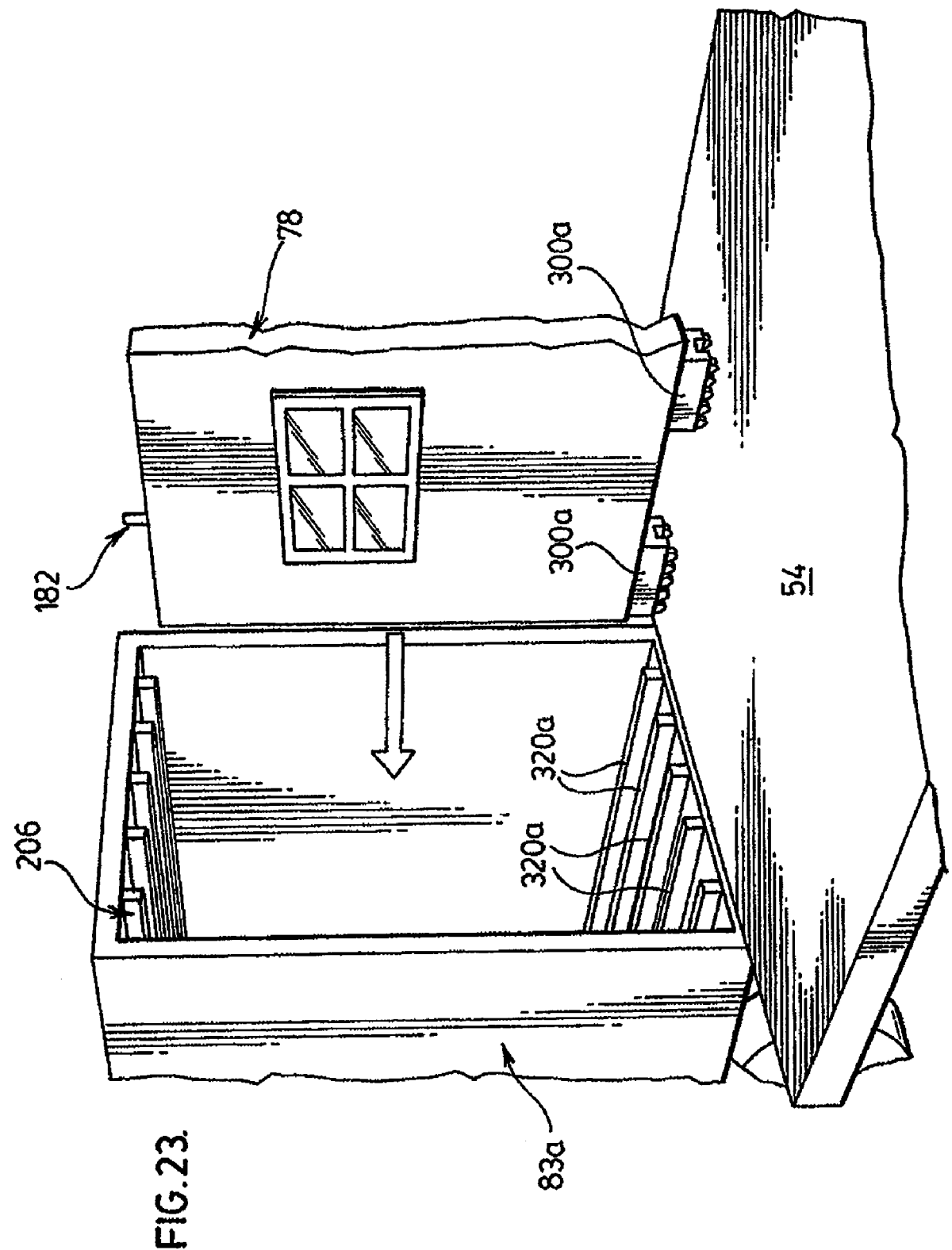
FIG. 23 shows how the skate and rail system can be used to store and transport wall sections.

Referring now to FIG. 23, (a modification of FIG. 15), a modified version of truck 83 is shown and is labeled as truck 83*a*. Truck 83*a* includes a plurality of rails 320*a* mounted along the floor thereof. In FIG. 23, overhead rail 202 of sub-assembly plant 54 is omitted, and skates 300*a* are used to move wall sections 78 throughout sub-assembly plant 54. As can be seen in FIG. 23, it is contemplated that a plurality of skates 300*a* can be used. Wall sections 78 rest on the surface of skates 300*a* and can be slid into truck 83*a* by aligning hanger 182 with overhead rail 206 within truck 83*a*, and correspondingly sliding skate 300*a* over the rail 320*a* that corresponds with its matching overhead rail 206. In this embodiment, hanger 182 is simply for guiding and maintaining wall section 78 vertical in truck 83*a*, and the weight of wall section 78 is supported by skate 300*a*.

Figure 24:
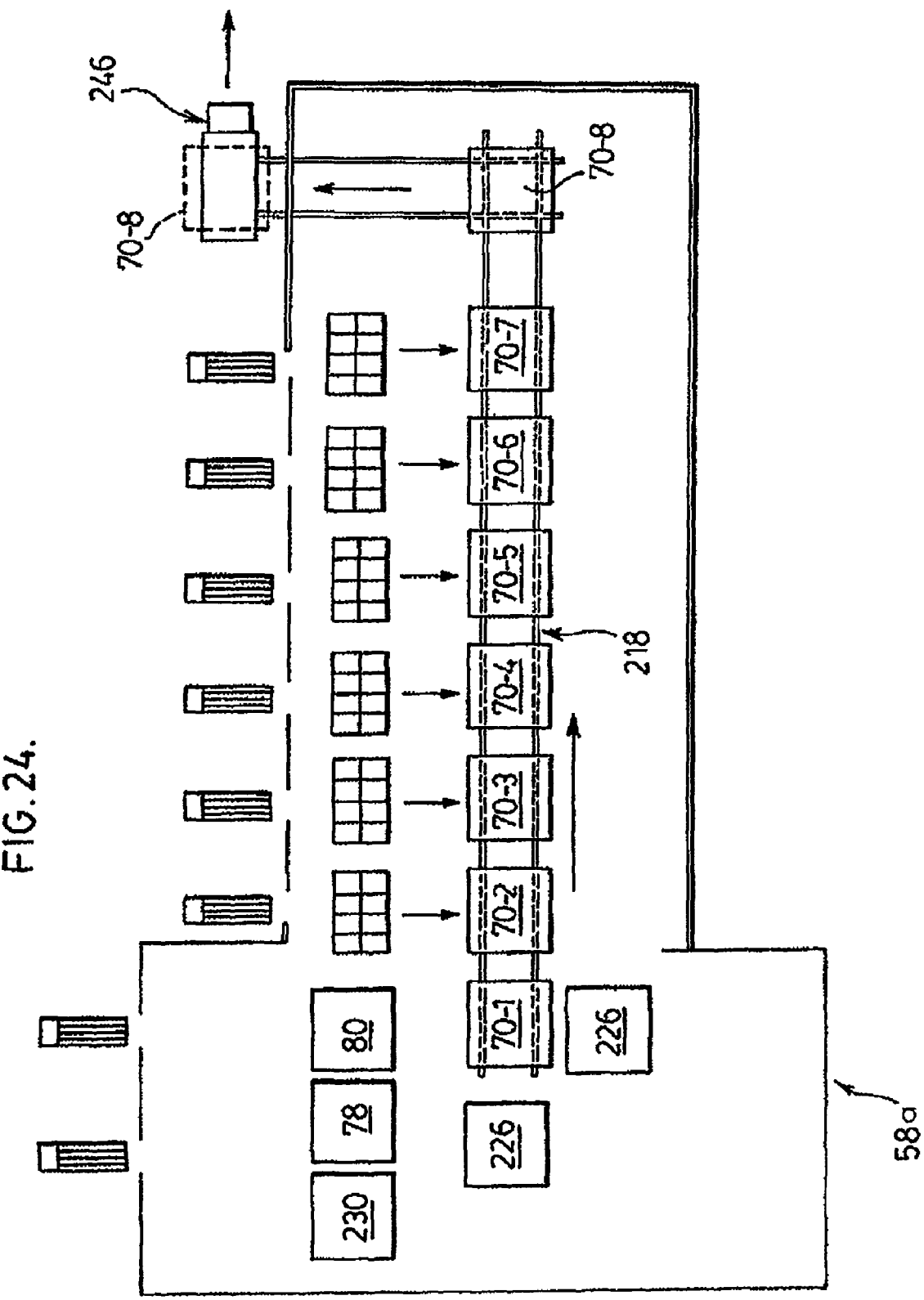
FIG. 24 shows a modified version of the final assembly facility of FIG. 17 in accordance with another embodiment.

Another variation is shown in FIG. 24, which shows a modified layout of final assembly facility 58, labeled as facility 58*a*. Facility 58*a* is an entirely metal structure, but preferably, panelized in a manner that facility 58*a* can still be disassembled from one location and reassembled at another. Facility 58*a* differs from final assembly facility 58 also in the fact that facility 58*a* is T-shaped. The wider section of facility 58*a* can be used as a staging area for trusses 230, wall sections 78 and floor sections 80. Additionally, the wider section of facility 58*a* permits multiple areas in which to assemble roofs 226, with at least two such areas being shown in FIG. 24. Also shown in FIG. 24 are multiple loading docks each with a truck adjacent thereto for supplying inventory to facility 58*a*.

Figure 25:
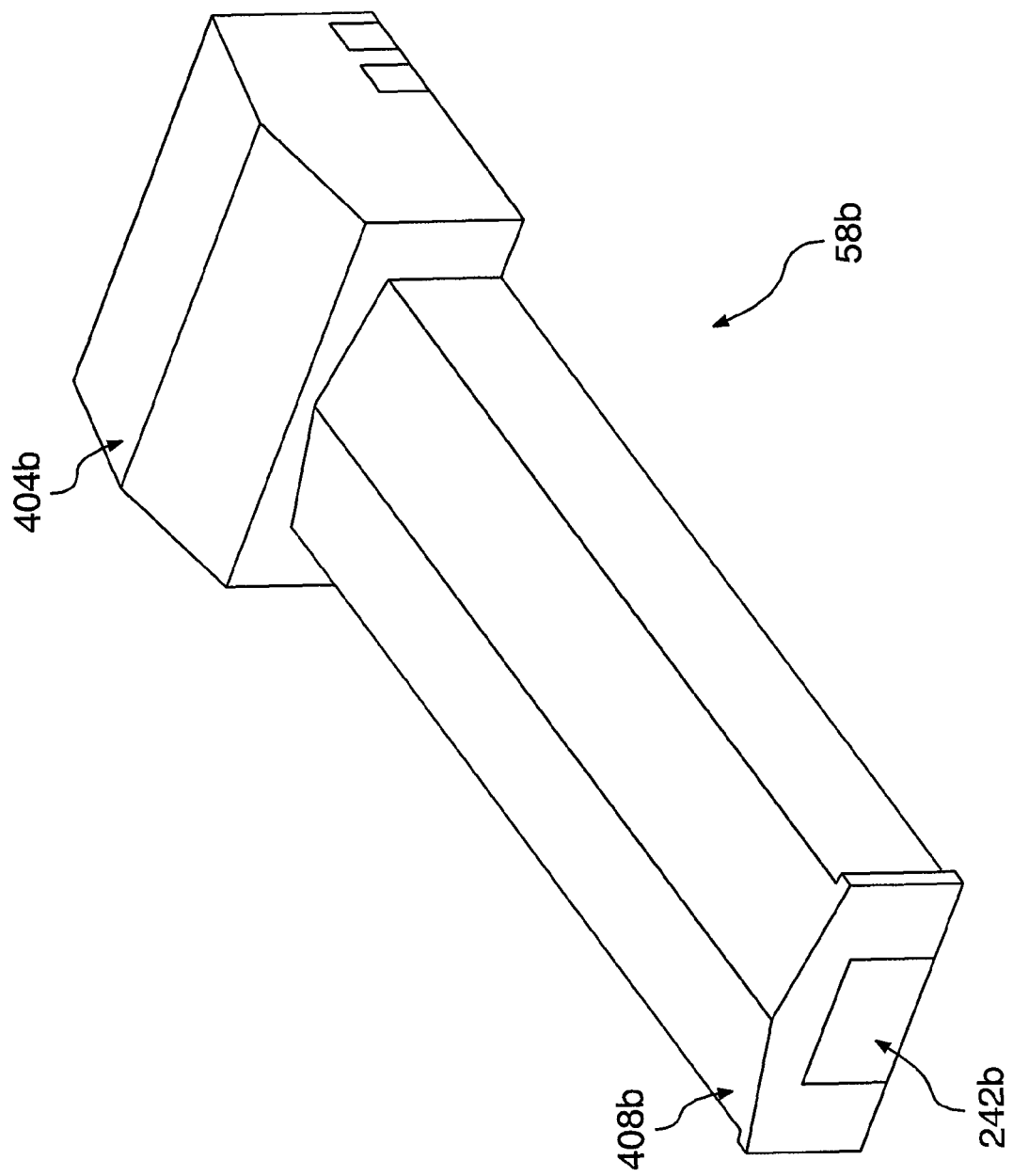
FIG. 25 shows a modified version of the final assembly facility of FIG. 24.
Figure 26:
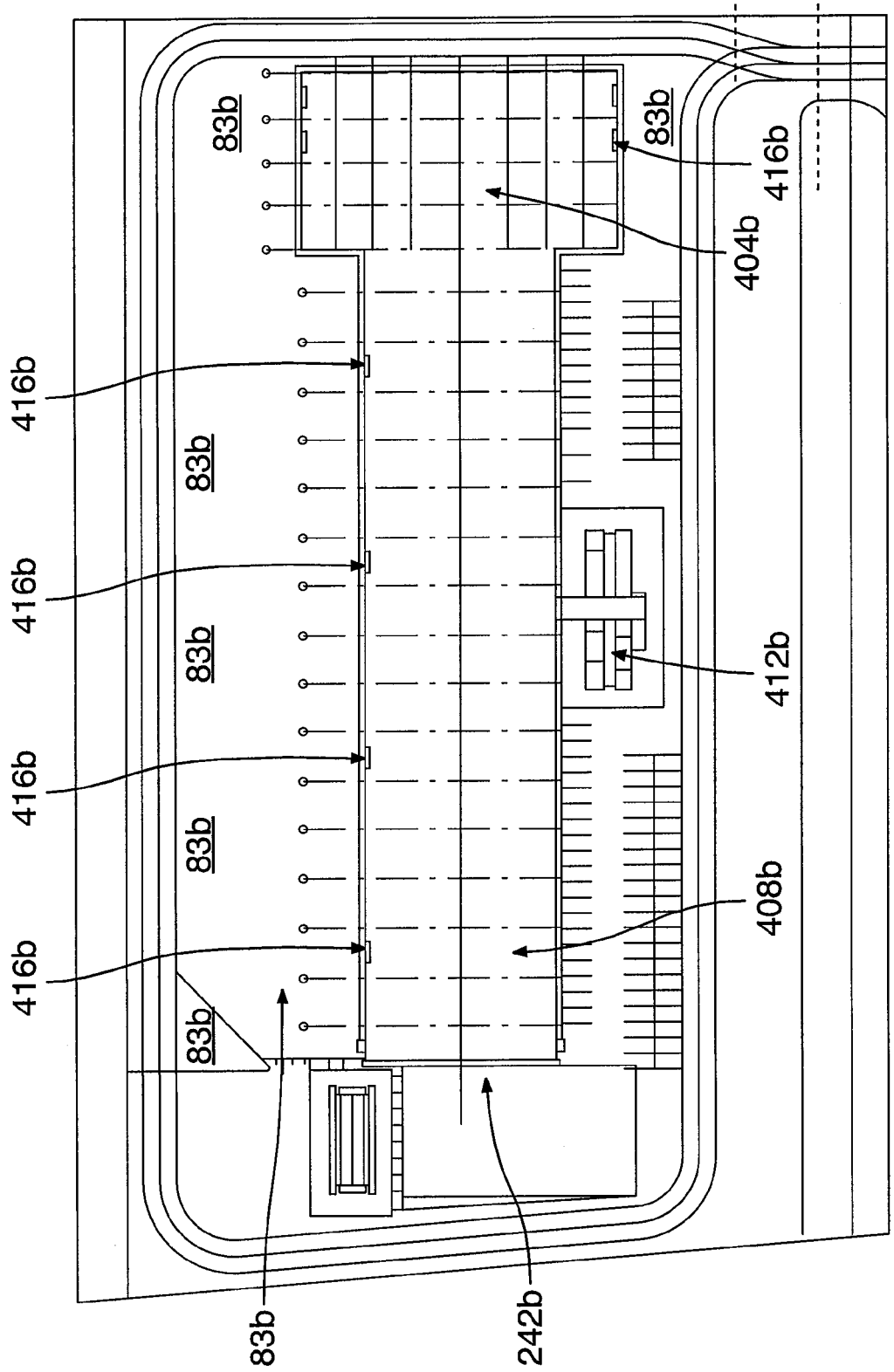
FIG. 26 is a top view of the facility of FIG. 25.
Figure 27:
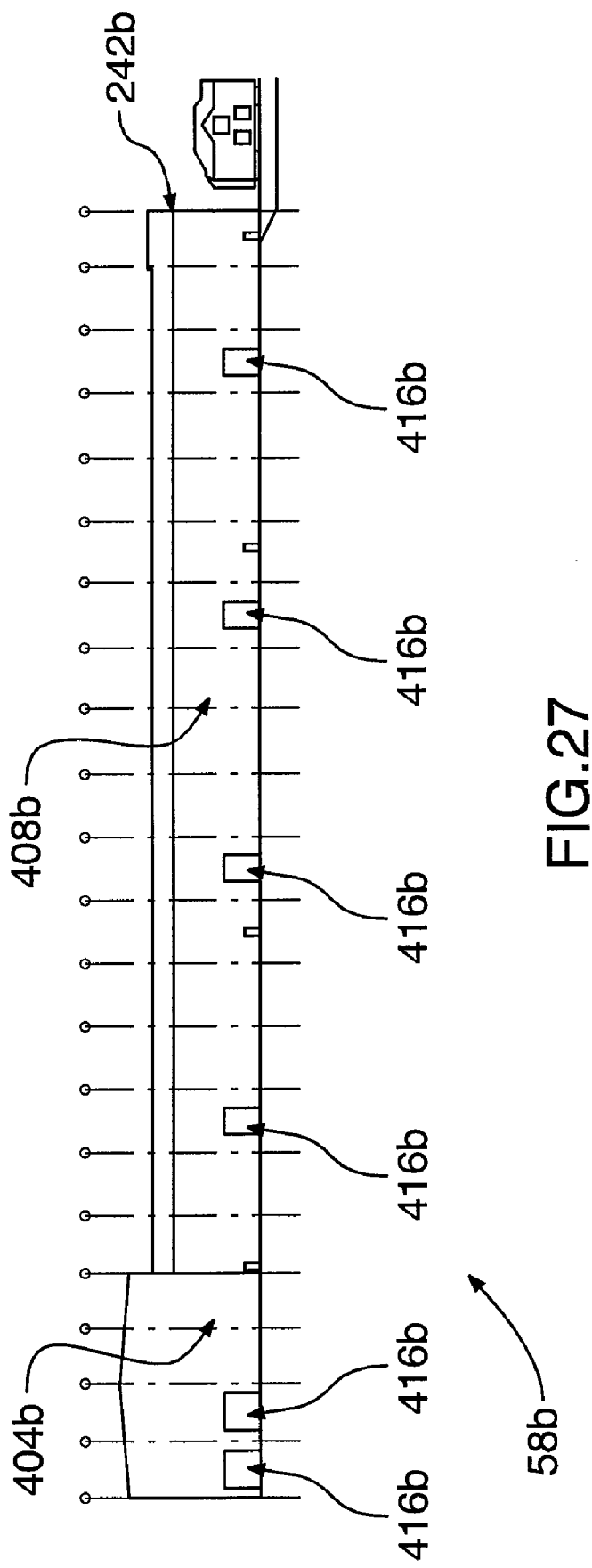
FIG. 27 is a rear view of the facility of FIG. 25.
Figure 28:
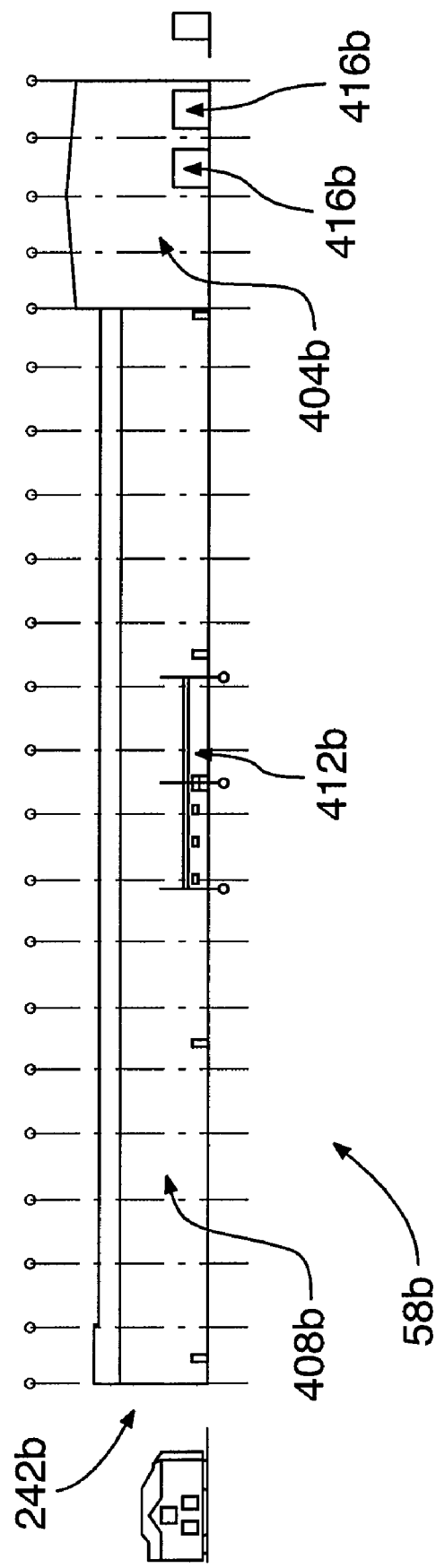
FIG. 28 is a front view of the facility of FIG. 25.
Figure 29:
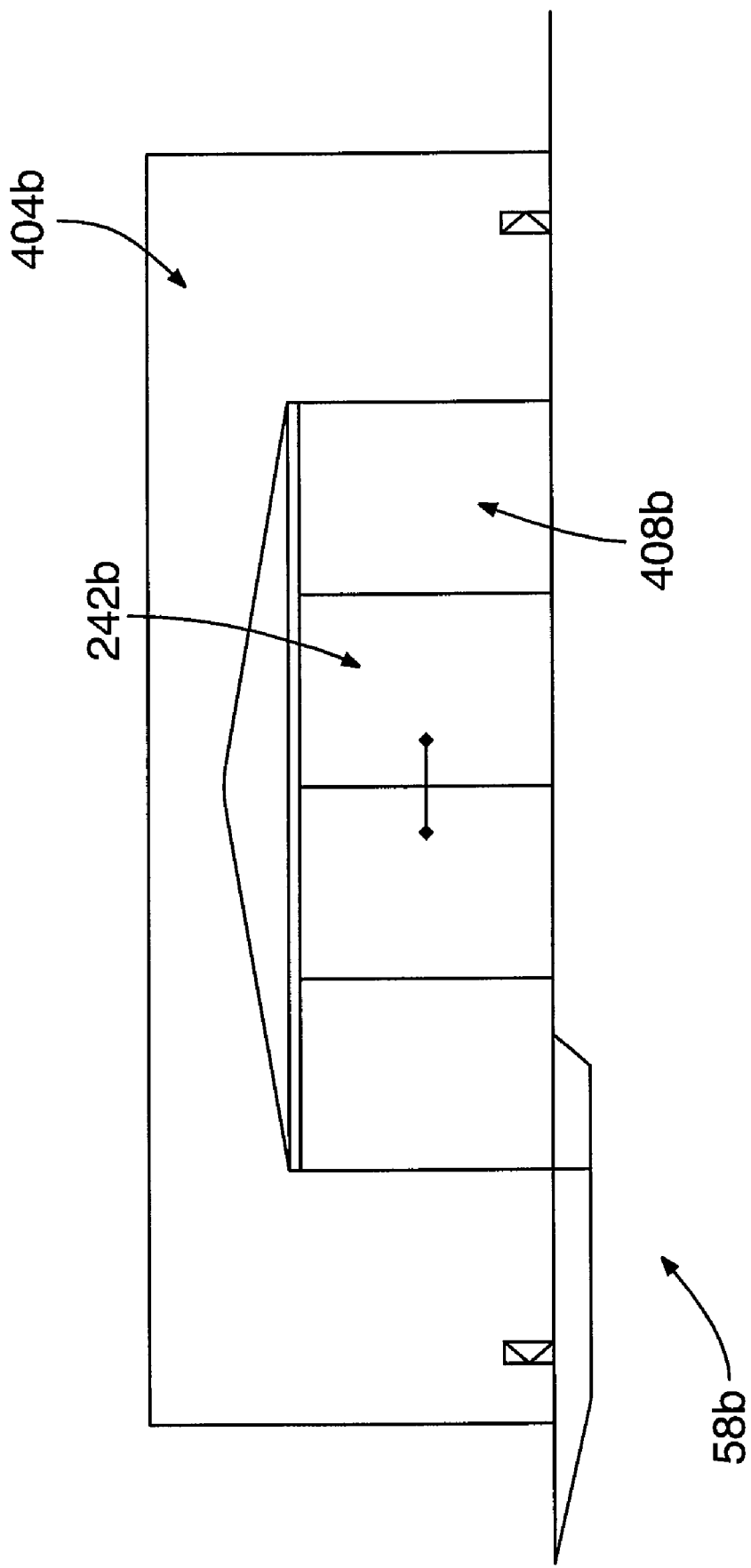
FIG. 29 is a left side view of the facility of FIG. 25.
Figure 30:
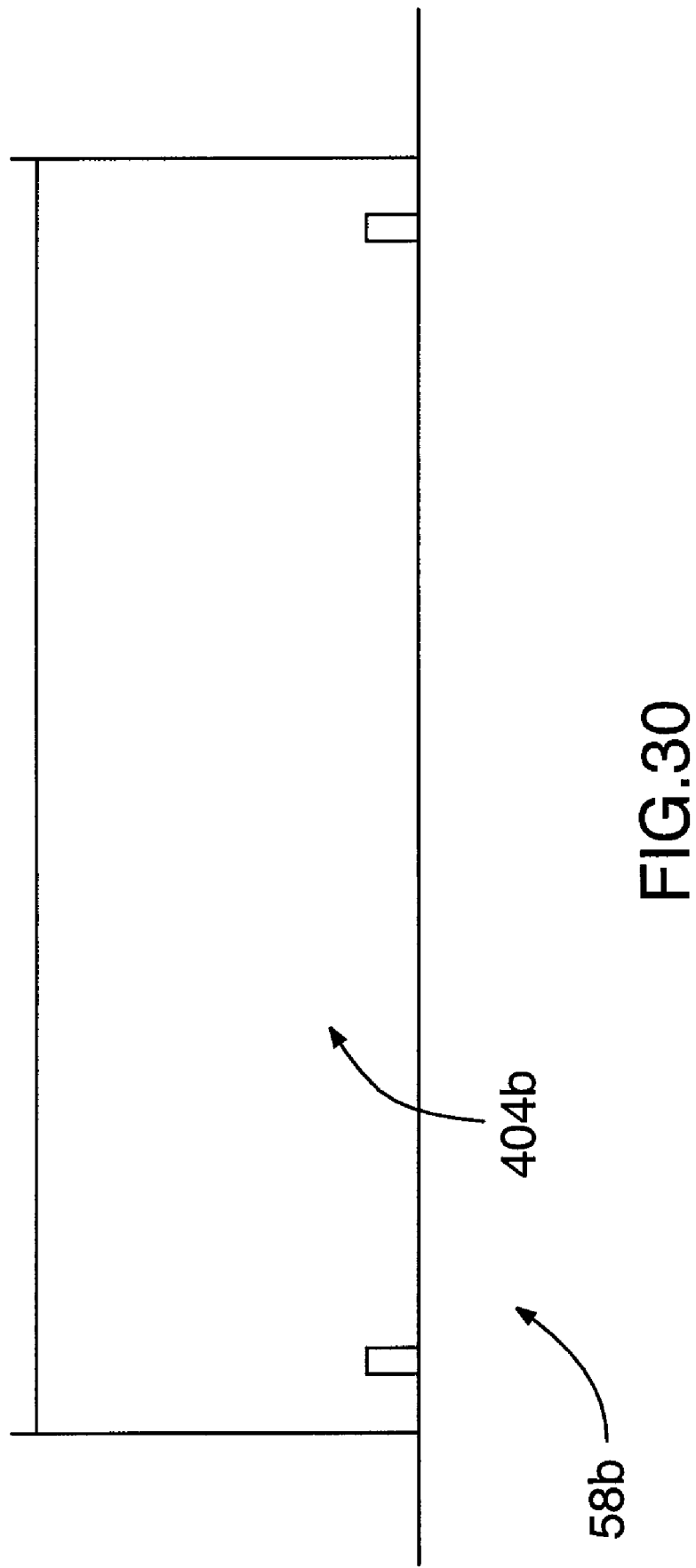
FIG. 30 is a right side view of the facility of FIG. 25.

Another variation is shown in perspective FIG. 25, which shows a modified layout of assembly facility 58*a*, labeled as facility 58*b*. Facility 58*b* is also shown from a top view in FIG. 26; from a rear view in FIG. 27; from a front view in FIG. 28; from a left view in FIG. 29 and from a right view in FIG. 30.

Facility 58*b* includes many of the features of facility 58*a* but with some exceptions which will be explained in further detail below. Like facility 58*a*, facility 58*b* is T-shaped, and in a present embodiment includes a crane section 404*b* and a final assembly section 408*b*. One difference of note is that output docking port 242*b* is disposed in-line with the length of facility 58*b*. Facility 58*b* also includes an administration section 412*b*, seen in FIGS. 26 and 28. Administration section 412*b* can be divided up into offices for engineering, accounting, supply-chain management, senior management and other personnel that would be associated with facility 58*b* as part of its operation. Facility 58*b* also includes a plurality of loading bays 416*b*, seen in FIGS. 26, 27 and 28. Trucks 83*b* containing materials to be assembled in facility 58*b* can use loading bays 416*b* to deliver those materials to the appropriate section of facility 58*b*.

In a presently preferred embodiment, facility 58*b* is a prefabricated movable building, made from metal or other suitable material or combination of materials. The floor of facility 58*b* is asphalt for easy removability and recycling.

Figure 31:
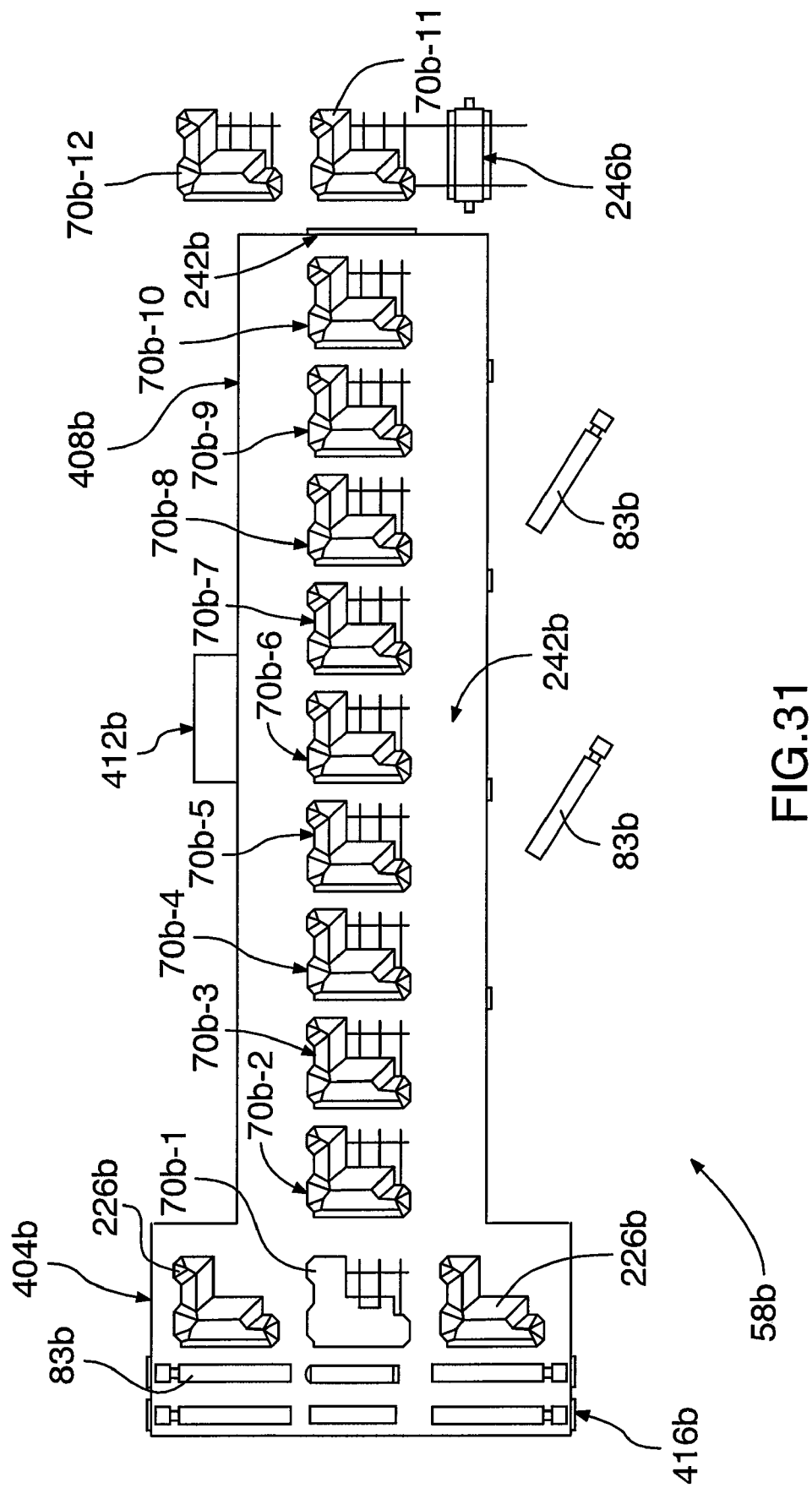
FIG. 31 is a top view of the assembly stations of the facility of FIG. 25.

Referring now to FIG. 31, a schematic representation from the top of facility 58*b* is shown. FIG. 31 shows certain aspects of facility 58*b* in greater detail. Specifically, a plurality of trucks 83*b* are shown within the crane section 404*b*, which are used to transport wall sections 78 and floor sections 80 into facility 58*b* from plant 54. Roofs 226*b* are assembled within two sub-assembly areas at the outer periphery of crane section 404*b* as shown in FIG. 31. Also shown in FIG. 1 is a first house 70*b*-1, which is disposed within crane section 404*b* and which has been framed with floor sections 80 and wall sections 78, but which has not yet had a roof 226*b* placed thereon. An overhead crane within crane section 404*b* is configured to lift a fully assembled one of the roofs 226*b* and place that roof 226*b* onto house 70*b*-1.

Figure 32:
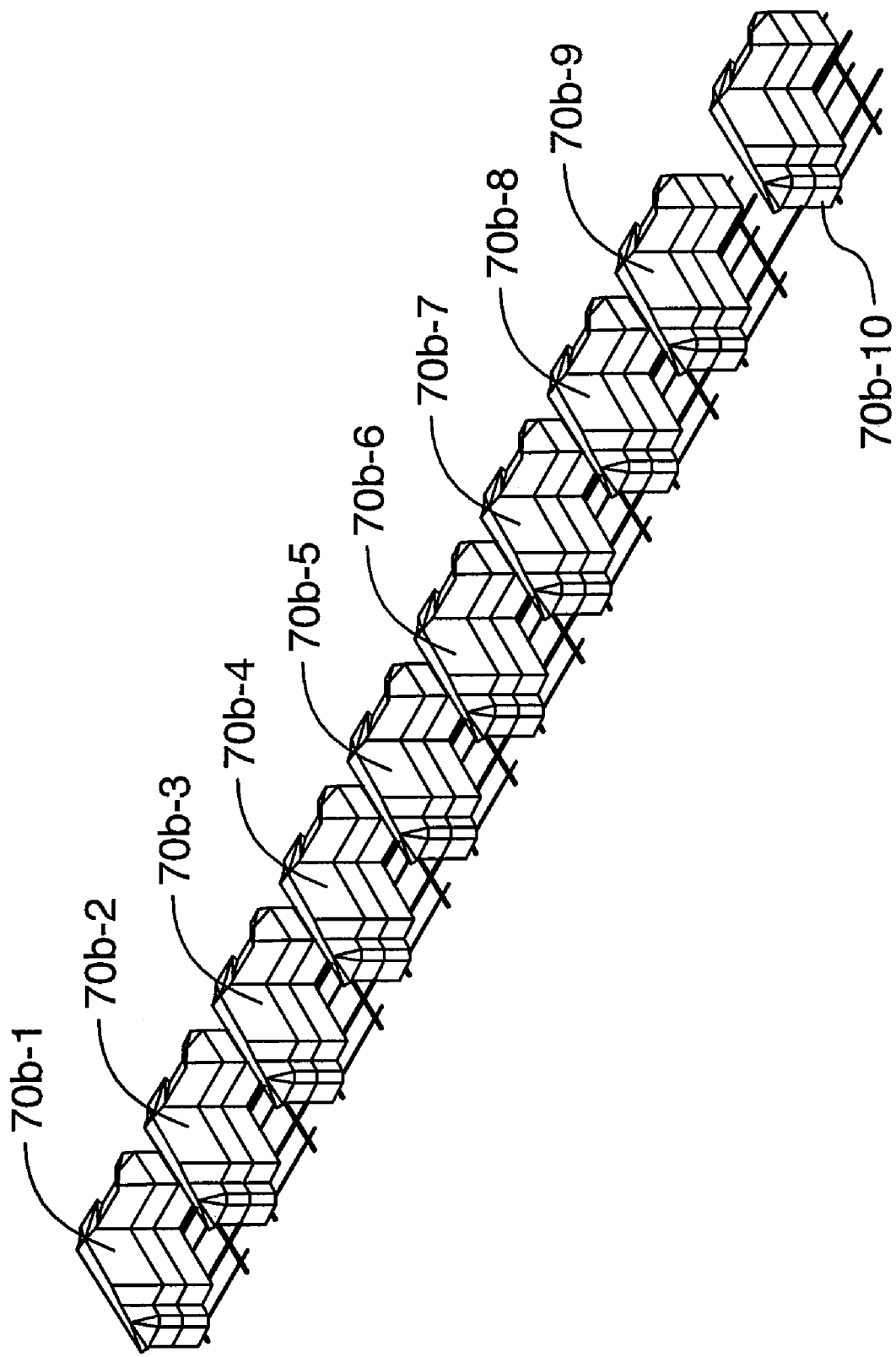
FIG. 32 is a perspective view of the assembly stations of the facility of FIG. 25.
Figure 33:
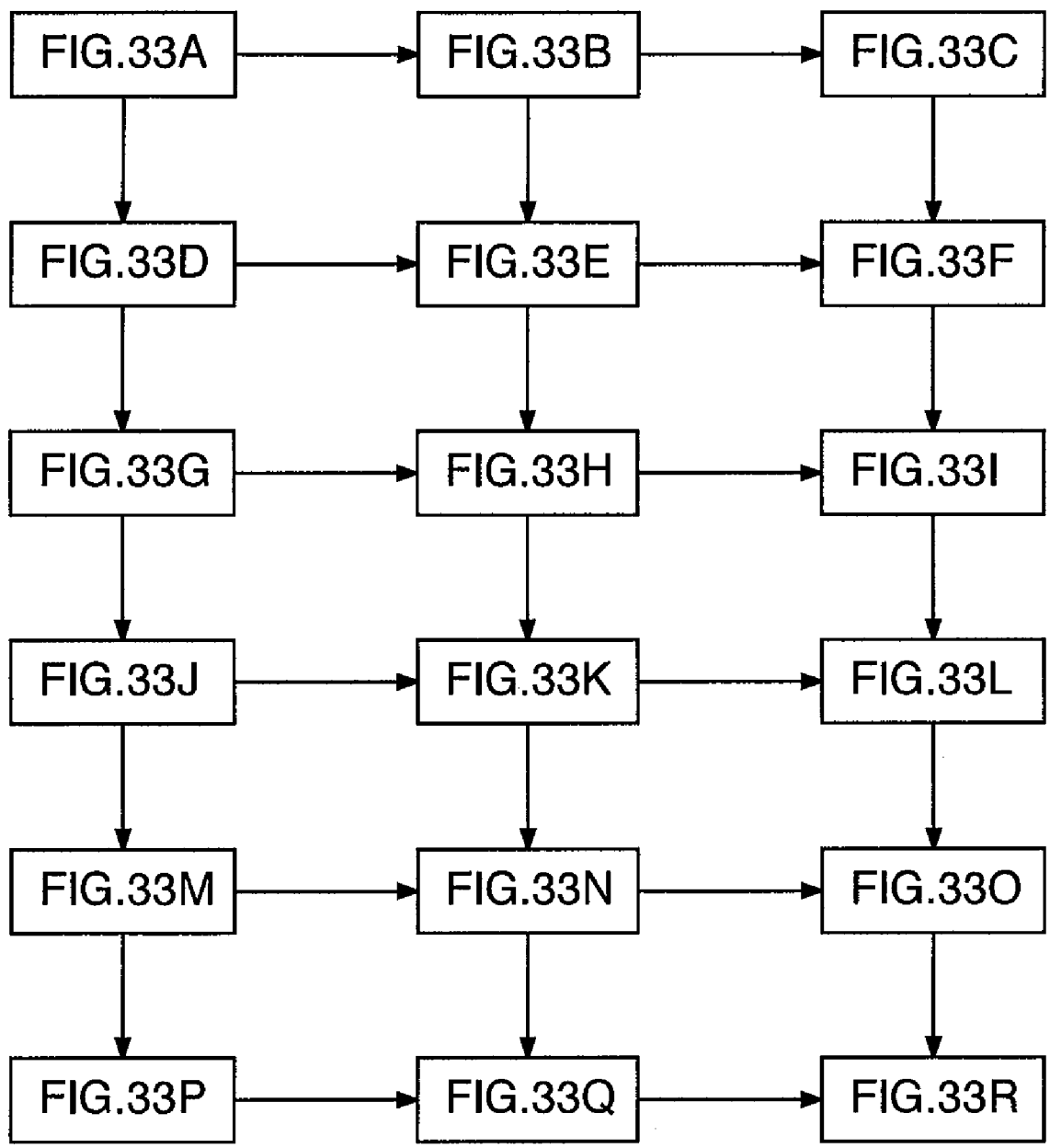
FIG. 33 illustrates instructions for viewing FIGS. 33A through 33R.
Figure 33B:
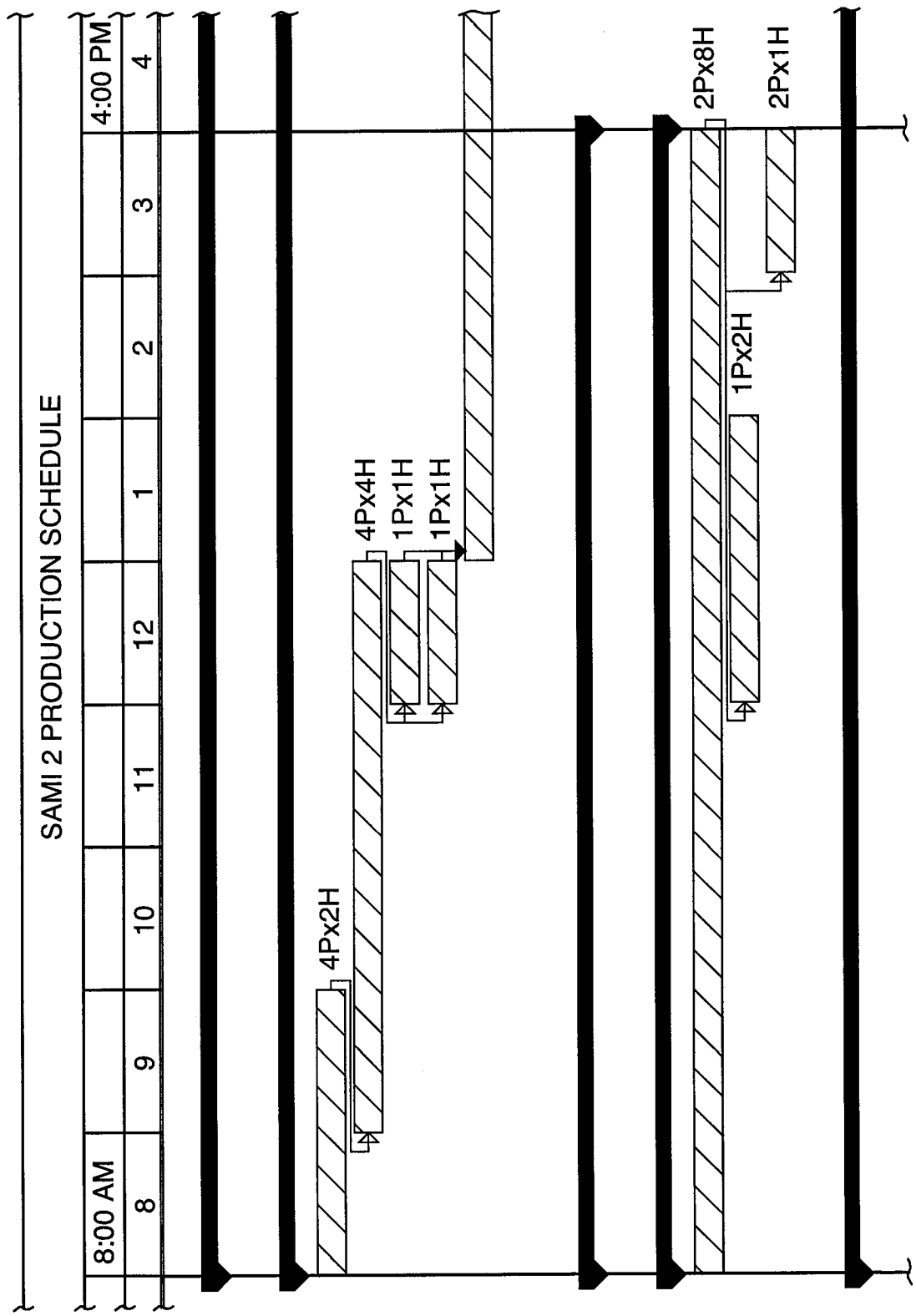
FIGS. 33A through 33R illustrate an exemplary production schedule for the assembly stations of the facility of FIG. 25.
Figure 33C:
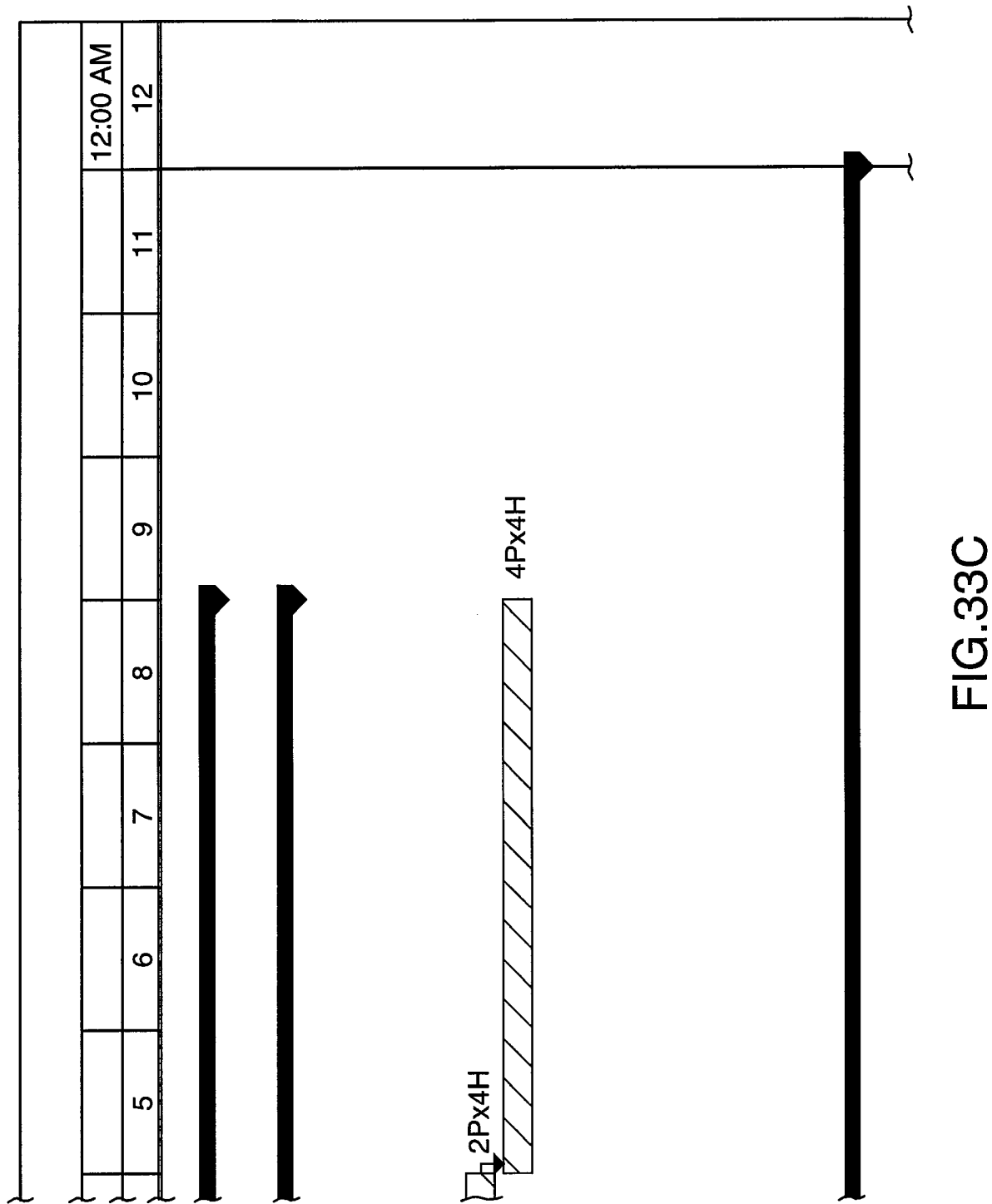
Figure 33E:
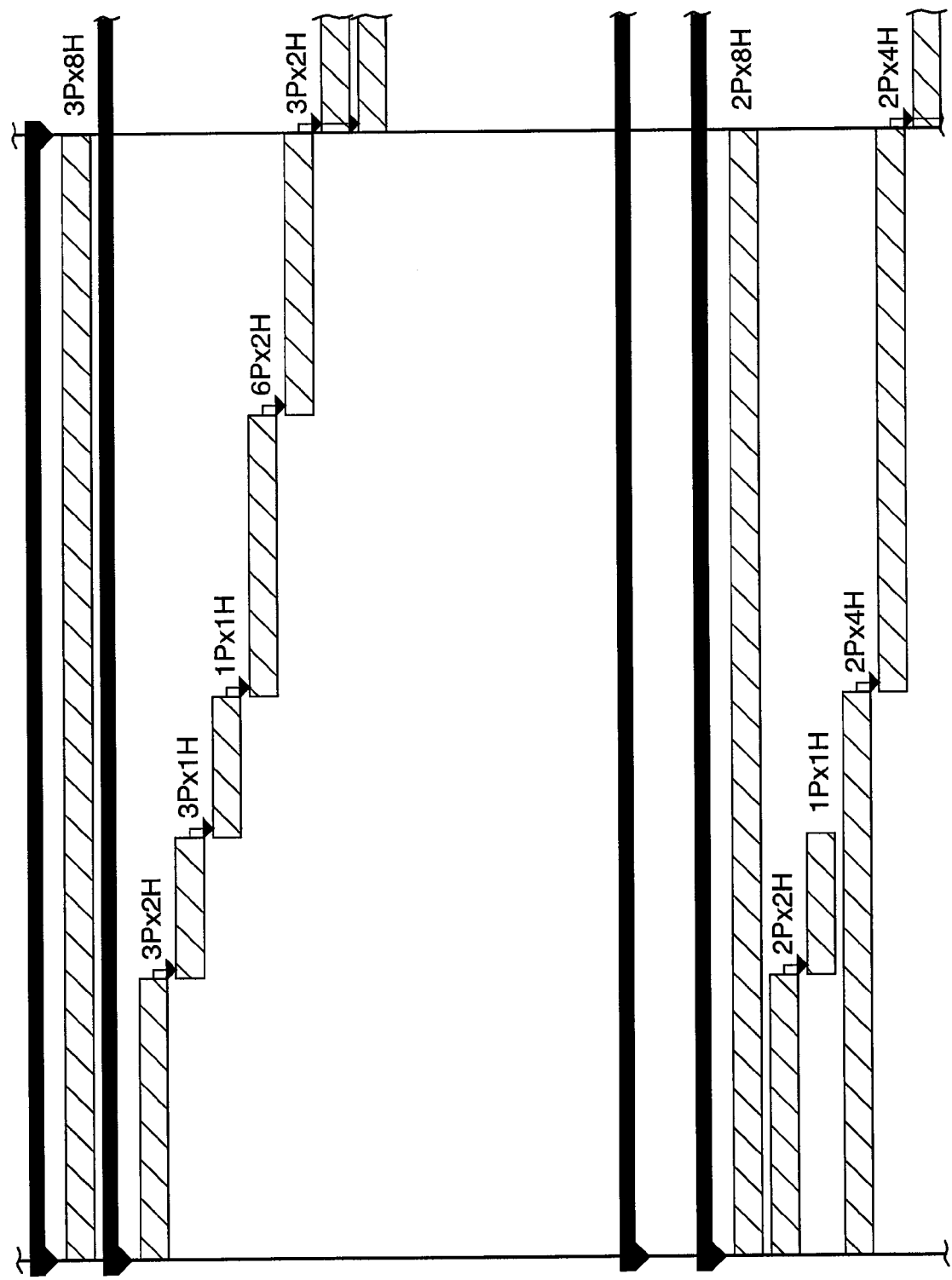
Figure 33F:
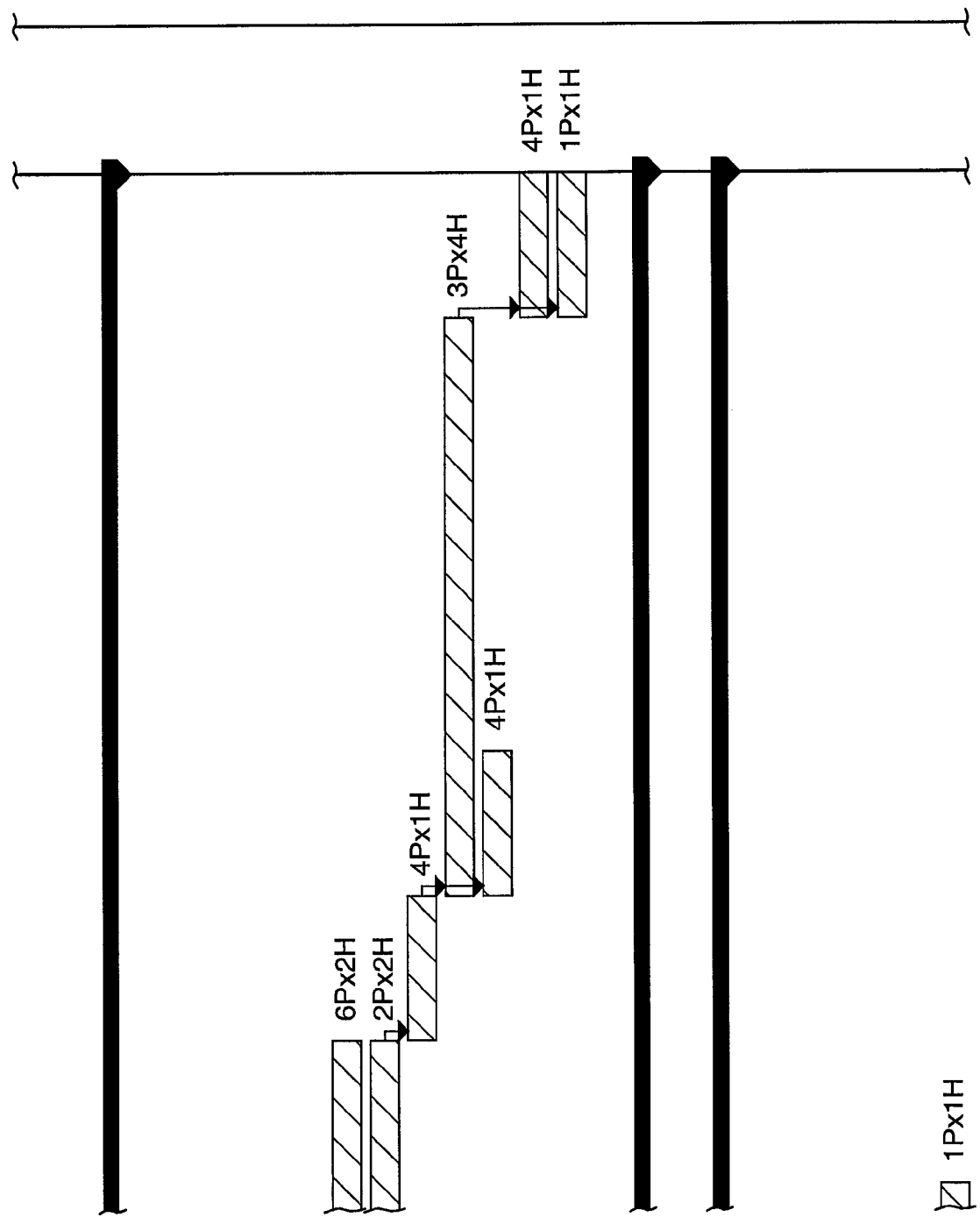
Figure 33H:
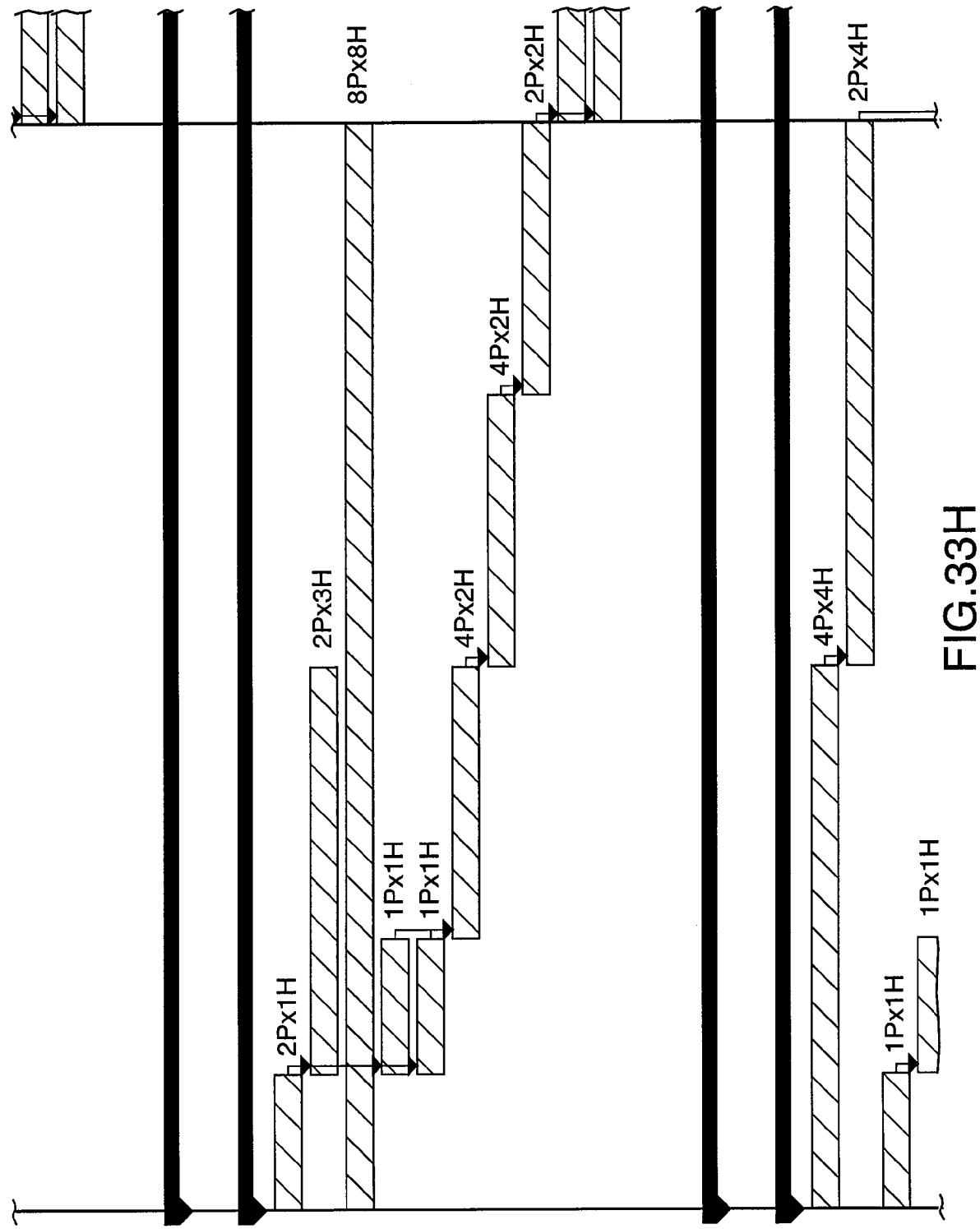
Figure 33I:
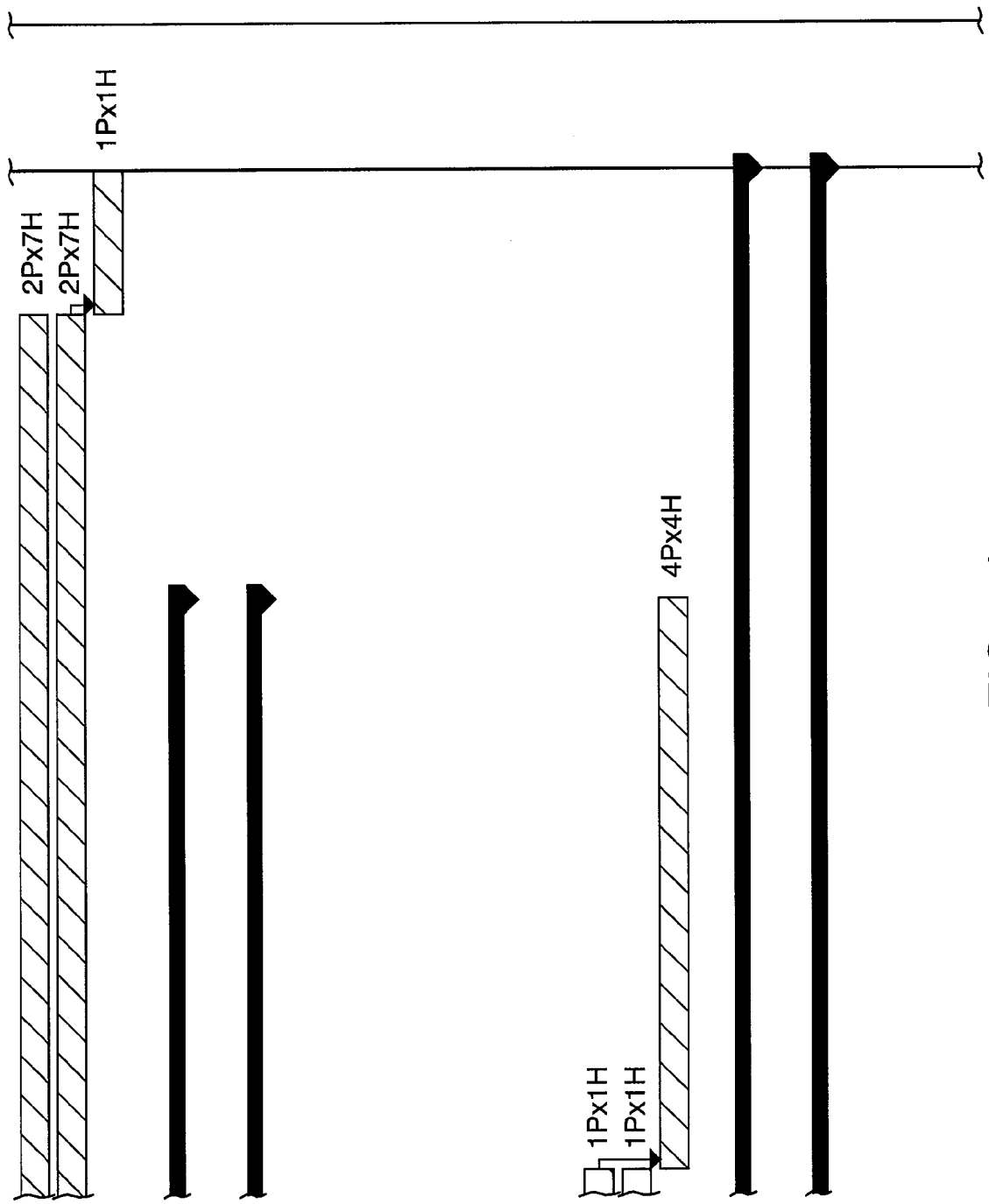
Figure 33K:
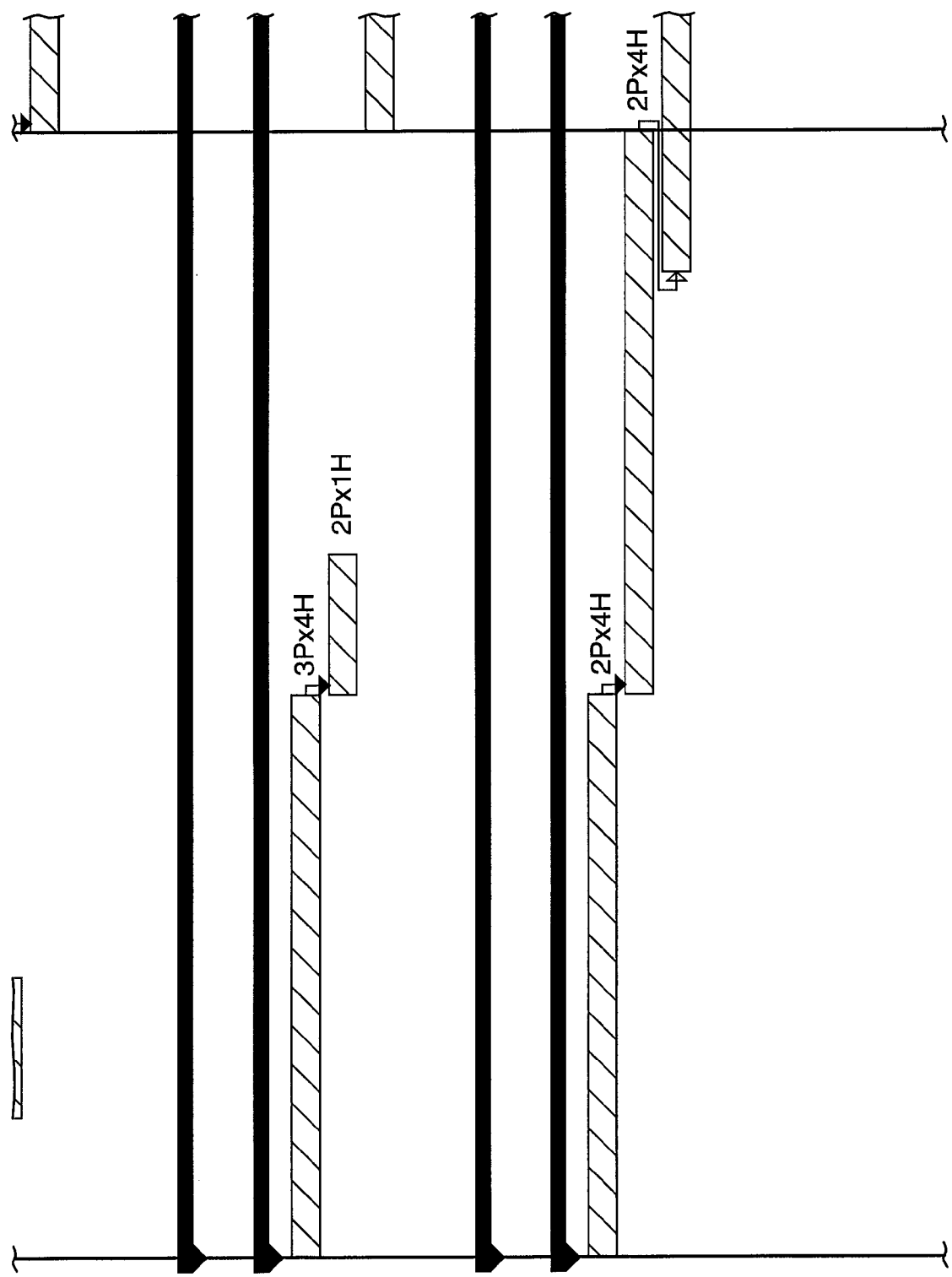
Figure 33L:
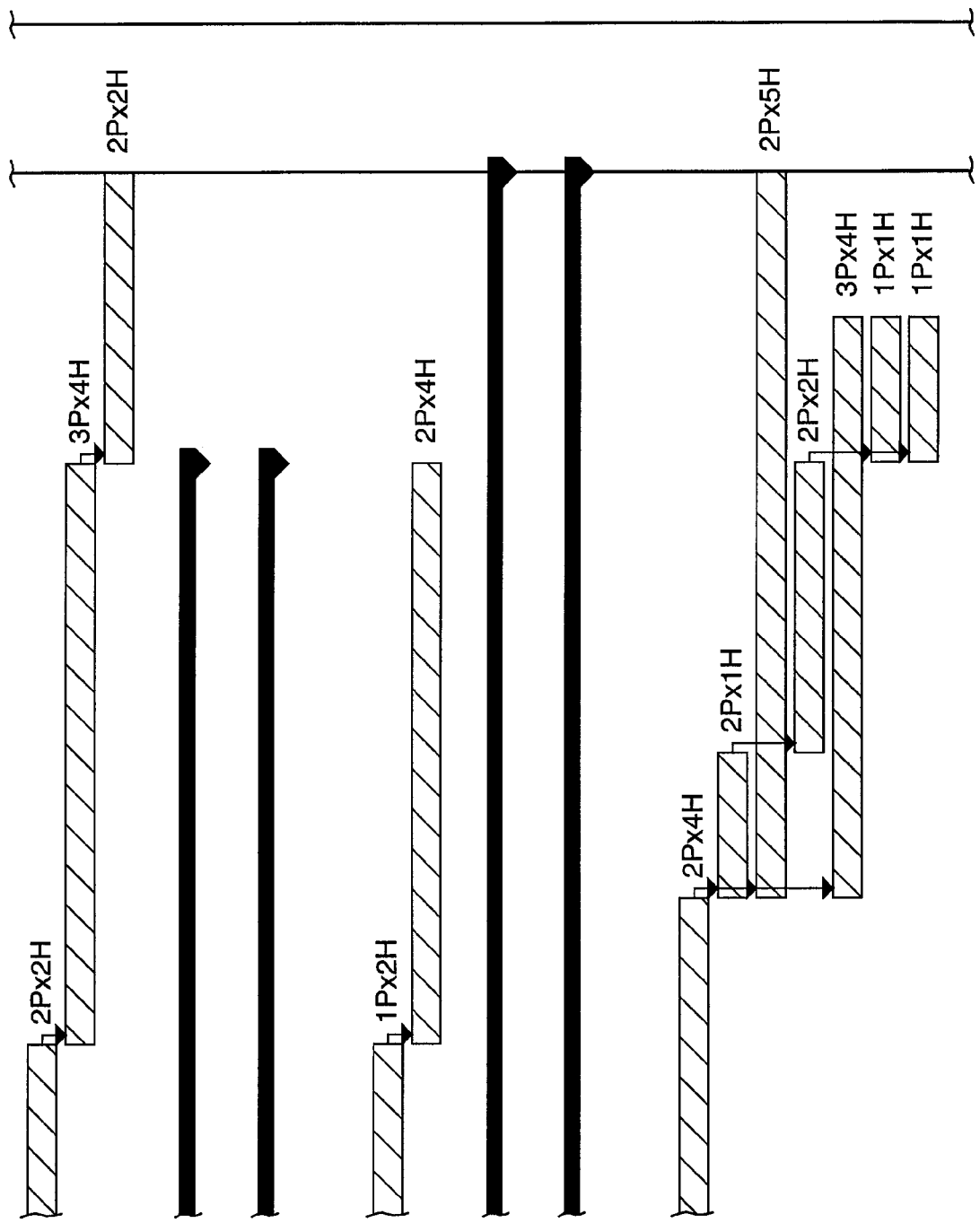
Figure 33N:
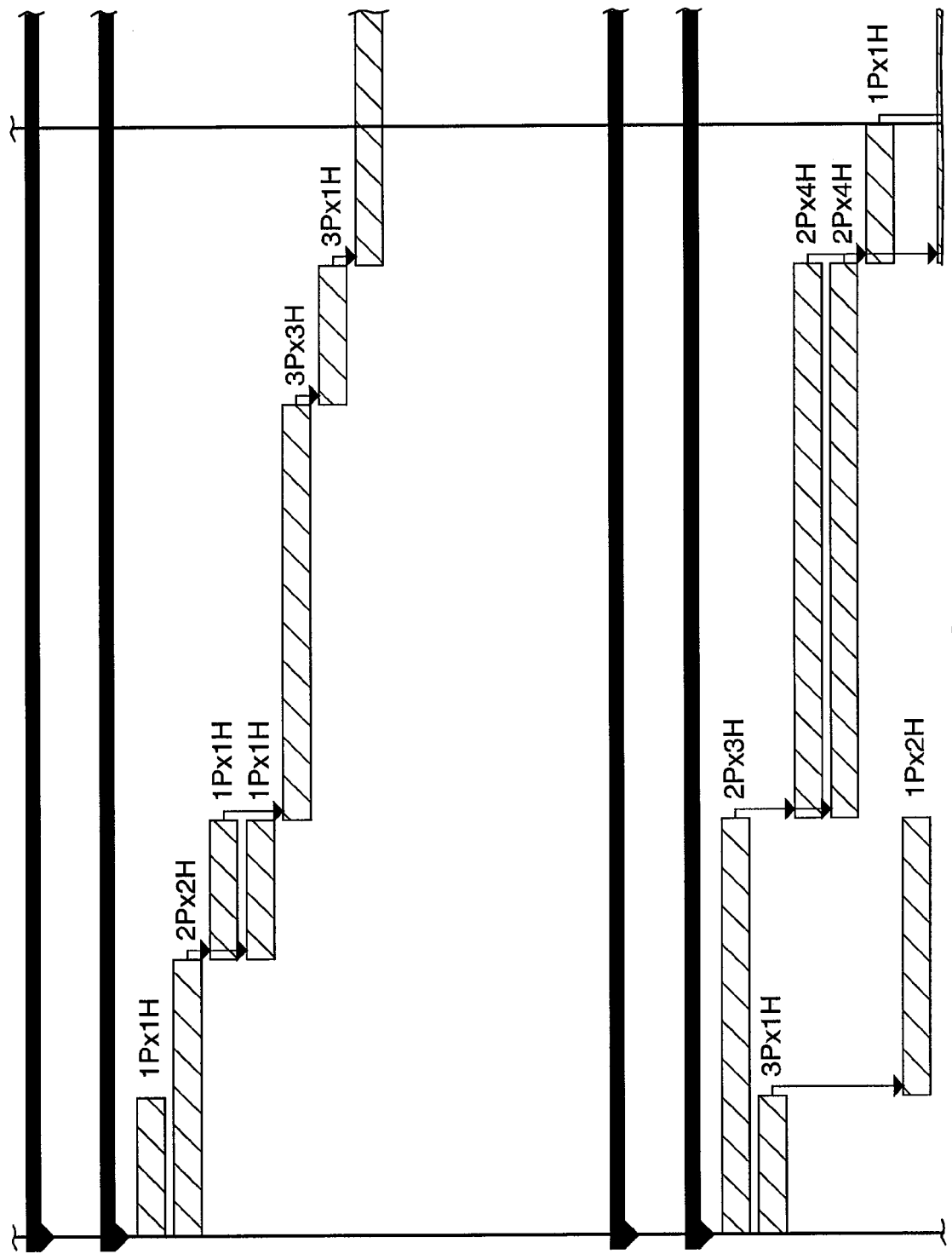
Figure 33O:
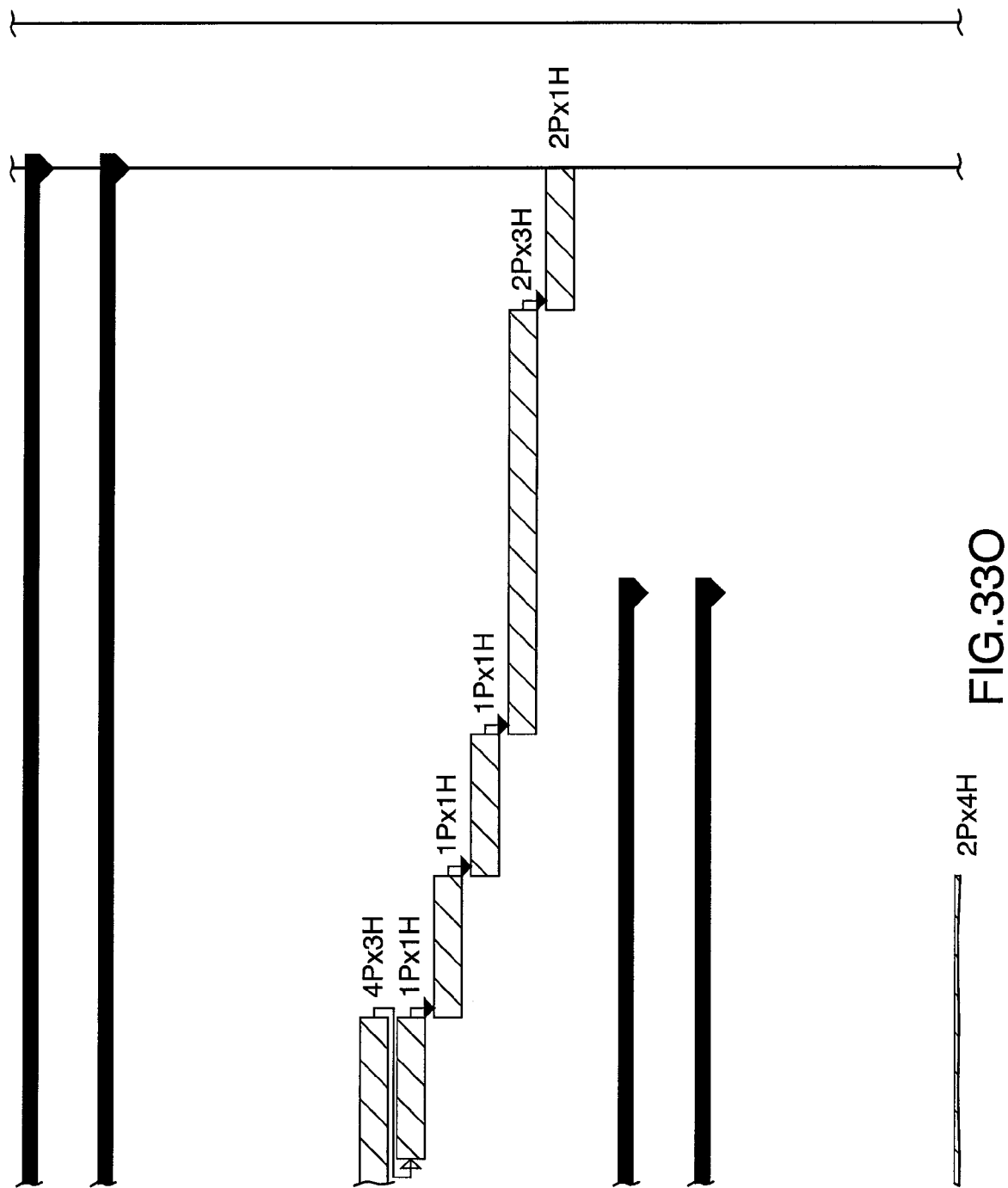
Figure 33Q:
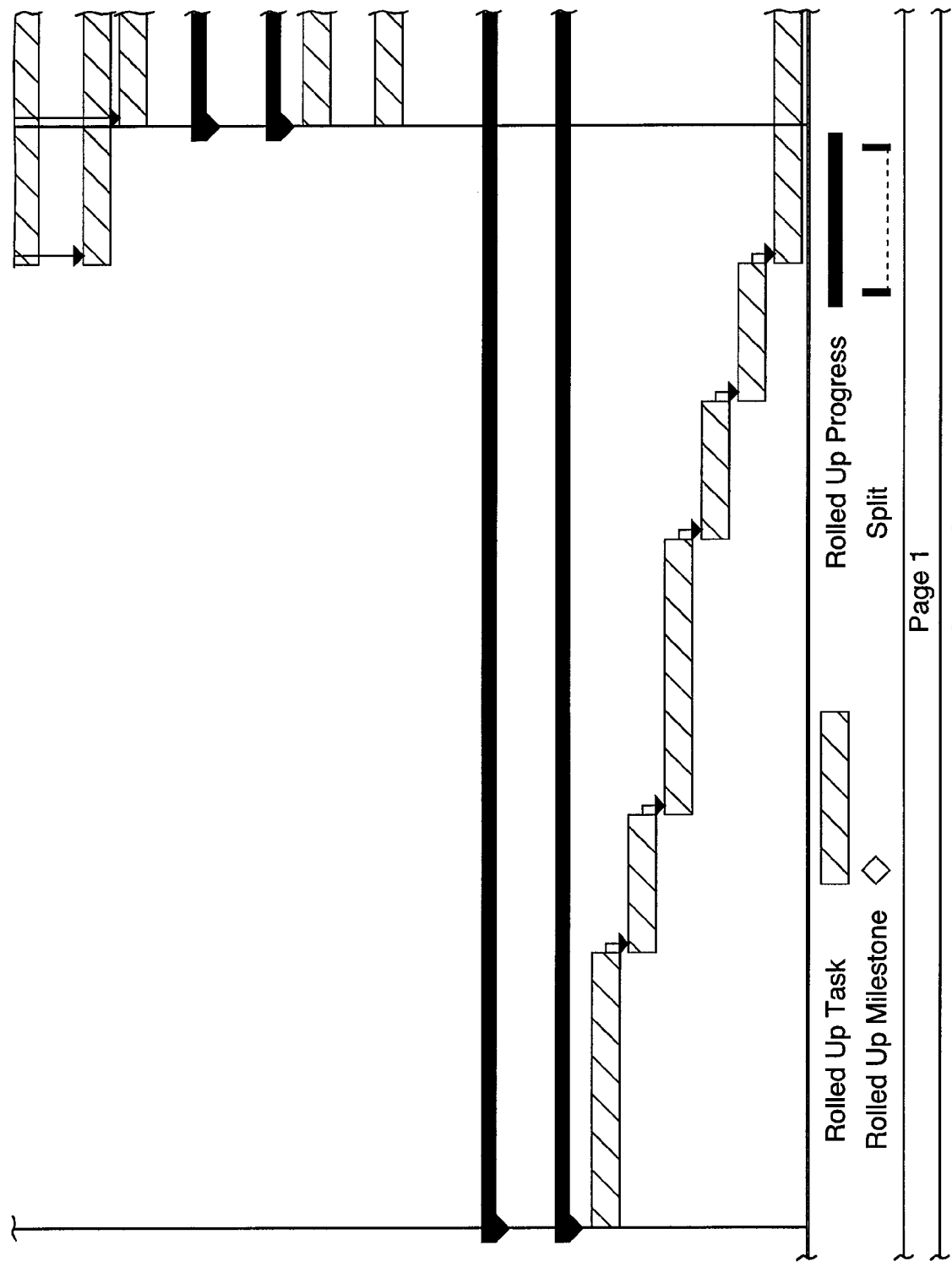
Figure 33R:
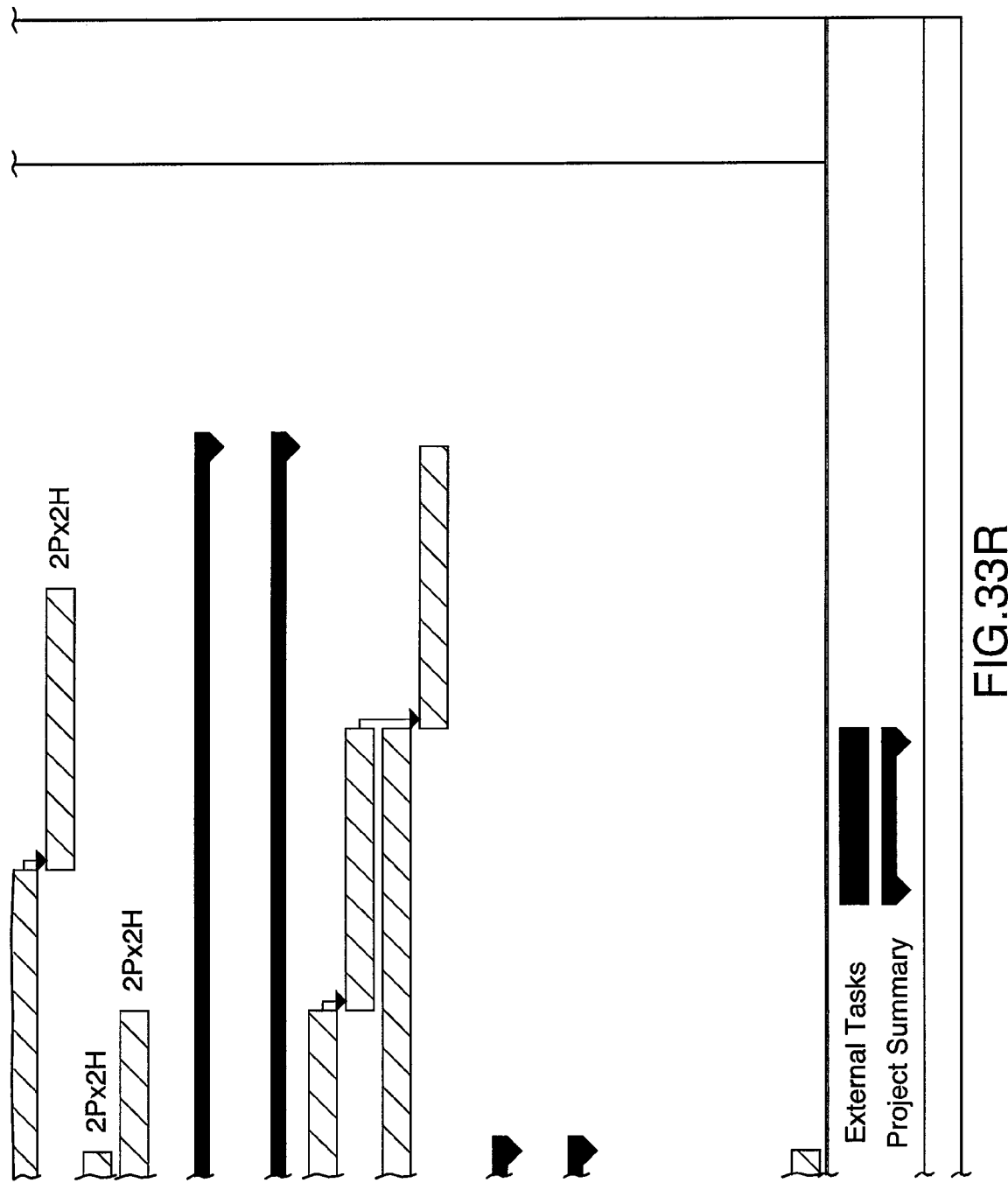
Figure 35:
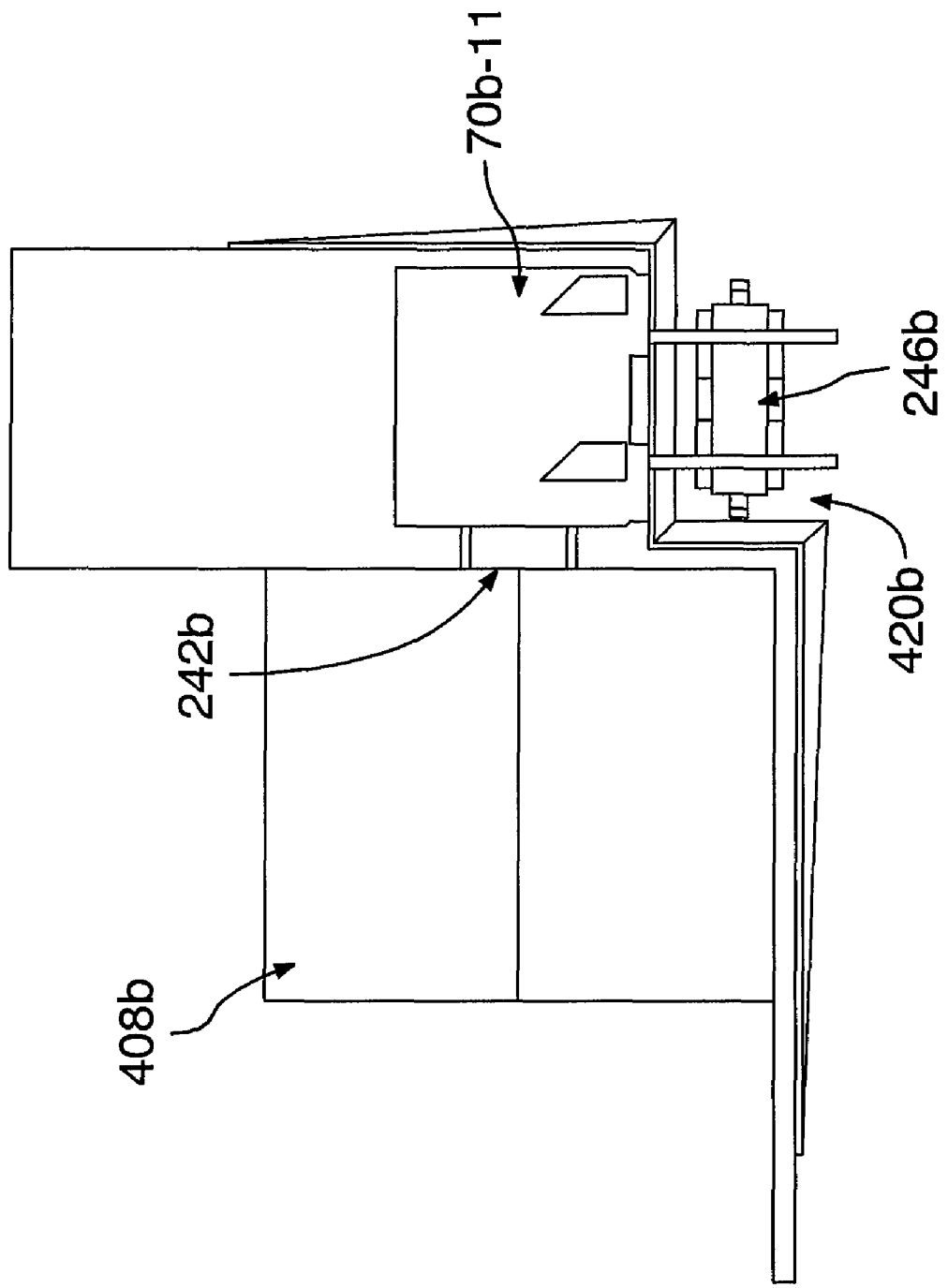
FIG. 35 is a top view of the loading area of the facility of FIG. 25.

FIG. 31 also shows a plurality of houses 70*b*-2, 70*b*-3 ... 70*b*-10 at various stages along final-assembly section 408*b*. FIG. 31 also shows house 70*b*-11 which is located outside output docking port 242*b* and ready to be placed onto transporter 246*b*. House 70*b*-12 is also located outside output docking port 242*b* and reflects a location where a finished house can be temporarily stored so that other houses(s) 70*b* can exit facility 58*b* and be placed onto transporter 246*b*. FIG. 32 shows the houses 70*b*-1 through 70*b*-10 within facility 58*b* in isolation from the facility 58*b*. FIGS. 33A-33R show a exemplary production schedule that can be used for houses 70*b*. Stations 0-A and 0-B on the production schedule reflect the roof assembly areas at the sides of crane section 404*b*. Stations 1-10 correspond to houses 70*b*-1 through 70*b*-10 respectively. The scheduling of building construction can be automated using known computing devices to create the schedule in FIGS. 33A-33R, according to the unique features that are purchased for each home.

Figure 36:
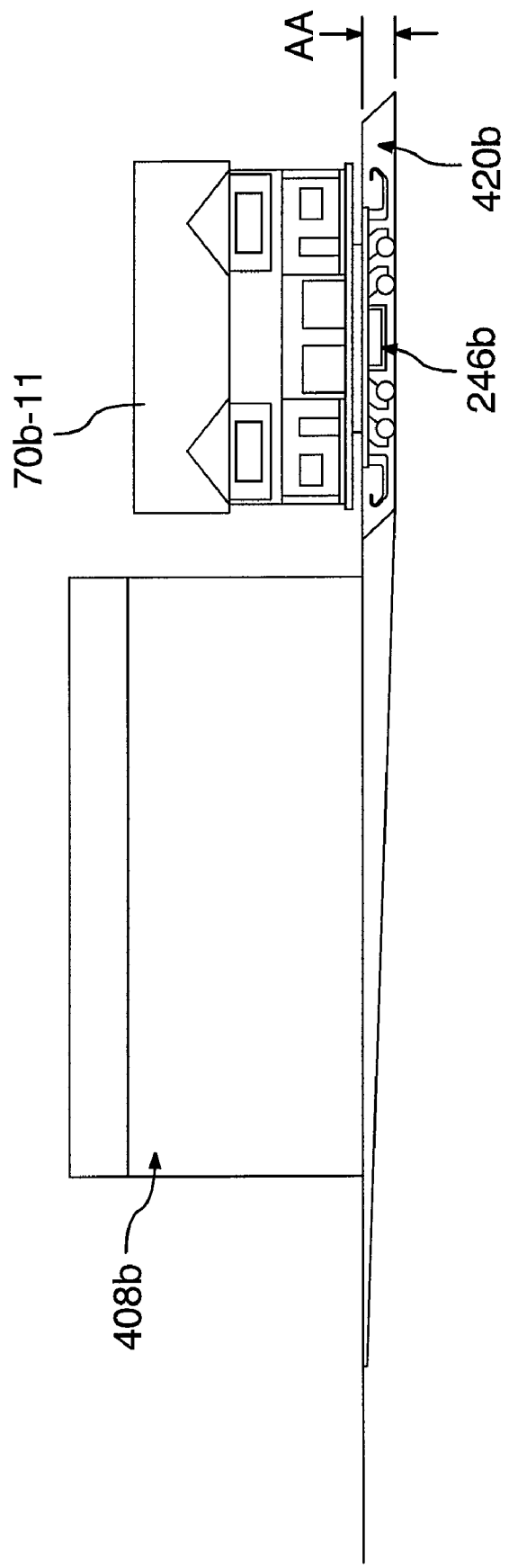
FIG. 36 is a rear view of the loading area of the facility of FIG. 25.
Figure 37:
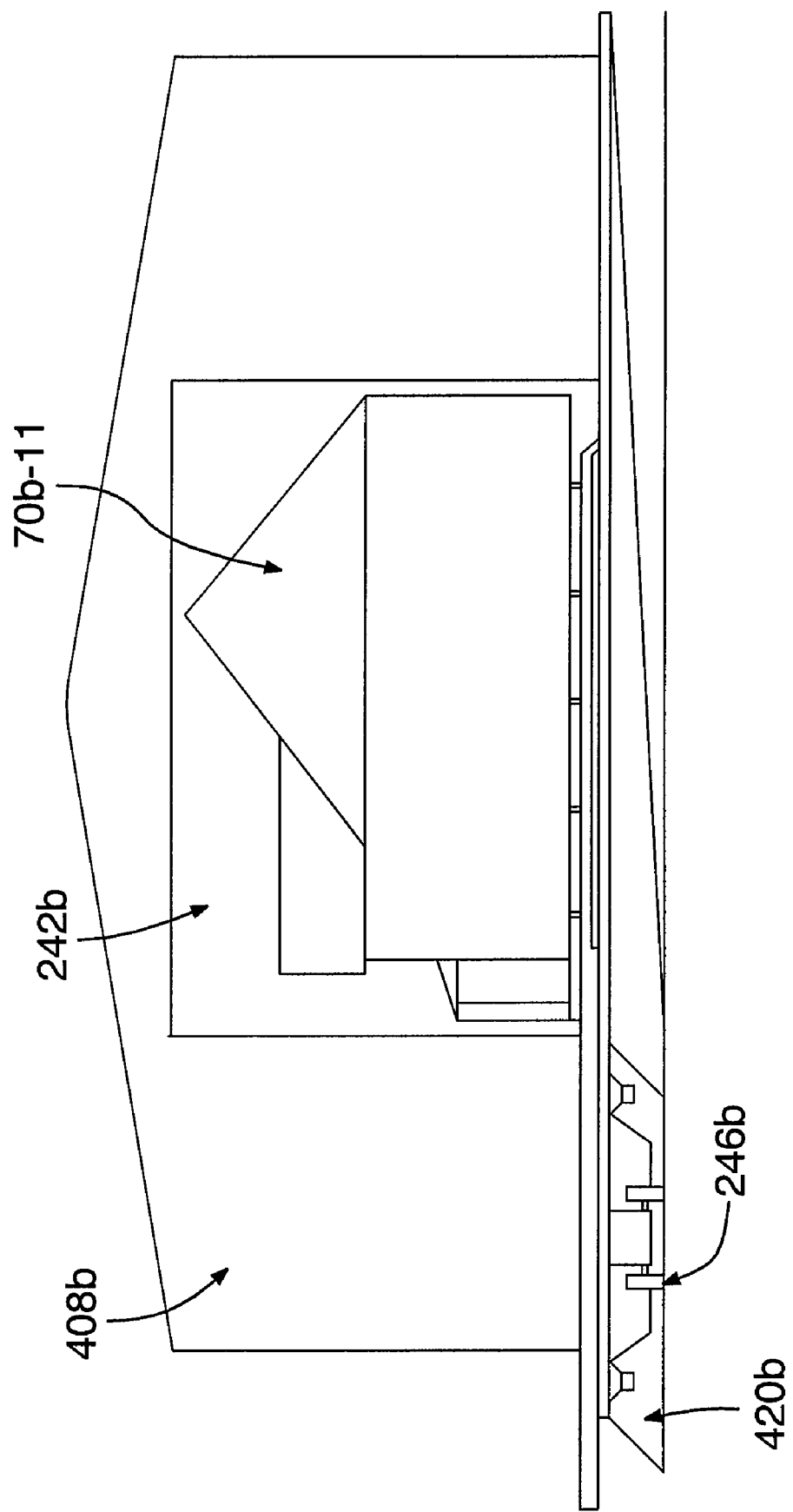
FIG. 37 is a left-side view of the loading area of the facility of FIG. 25.

Referring now to FIGS. 34-37, the loading area of facility 58*b* is shown in greater detail. Of note is that transporter 246*b* is positioned within a loading zone 420*b*. Loading zone 420*b* is located below grade to the floor of facility 58*b*. As shown in FIG. 36, the distance by which loading zone 420*b* is below grade is marked by the dimension AA. Dimension AA reflects the height of transporter 246*b*, taking into account the rail structure used to move house 70*b*-11, so that the rails on transporter 246*b* are co-planar to the rails outside of port 242*b* upon which house 70*b*-11 is resting in FIGS. 34-37.

Figure 38:
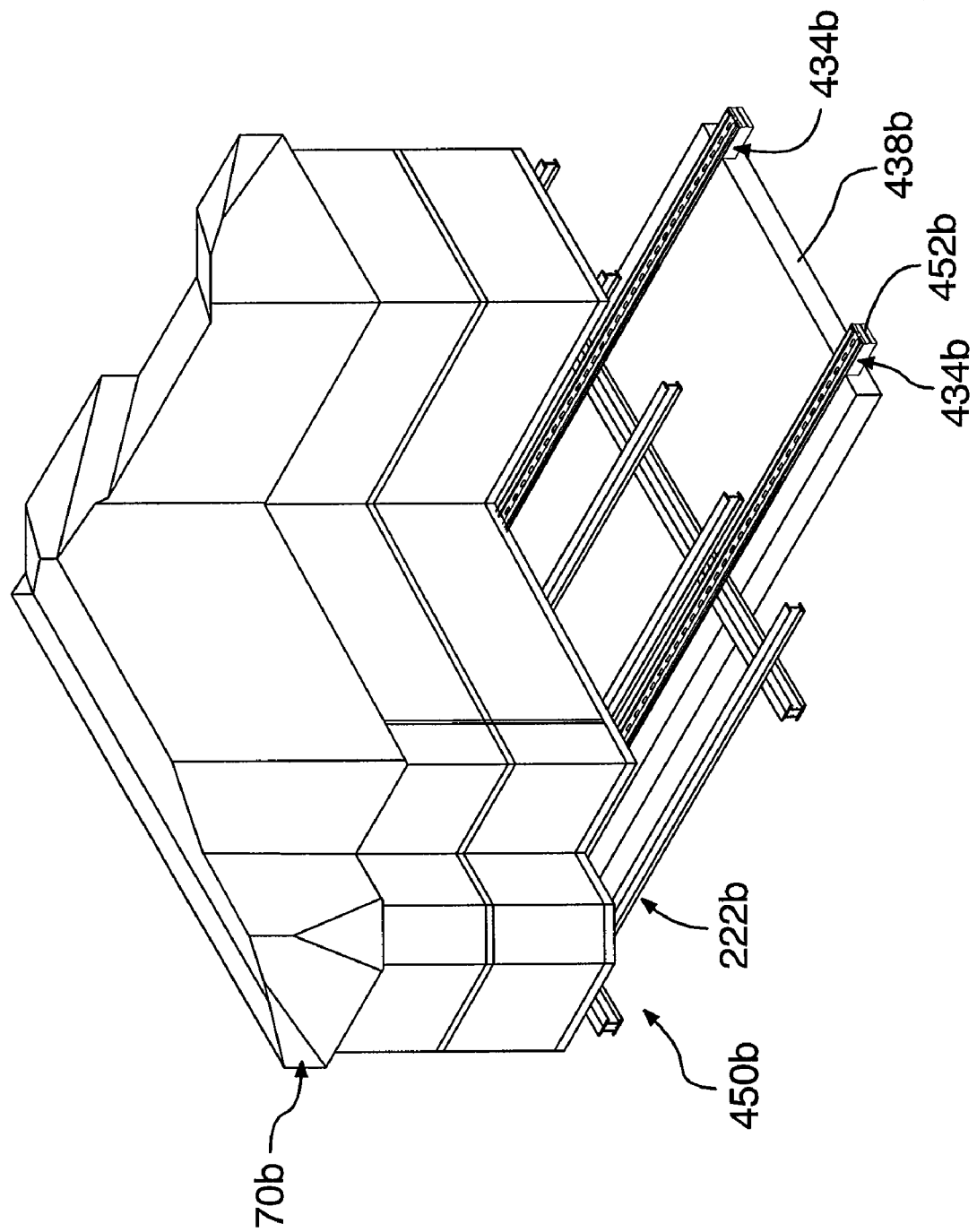
FIG. 38 is a perspective view of the rail system for the assembly stations of FIG. 32.
Figure 39:
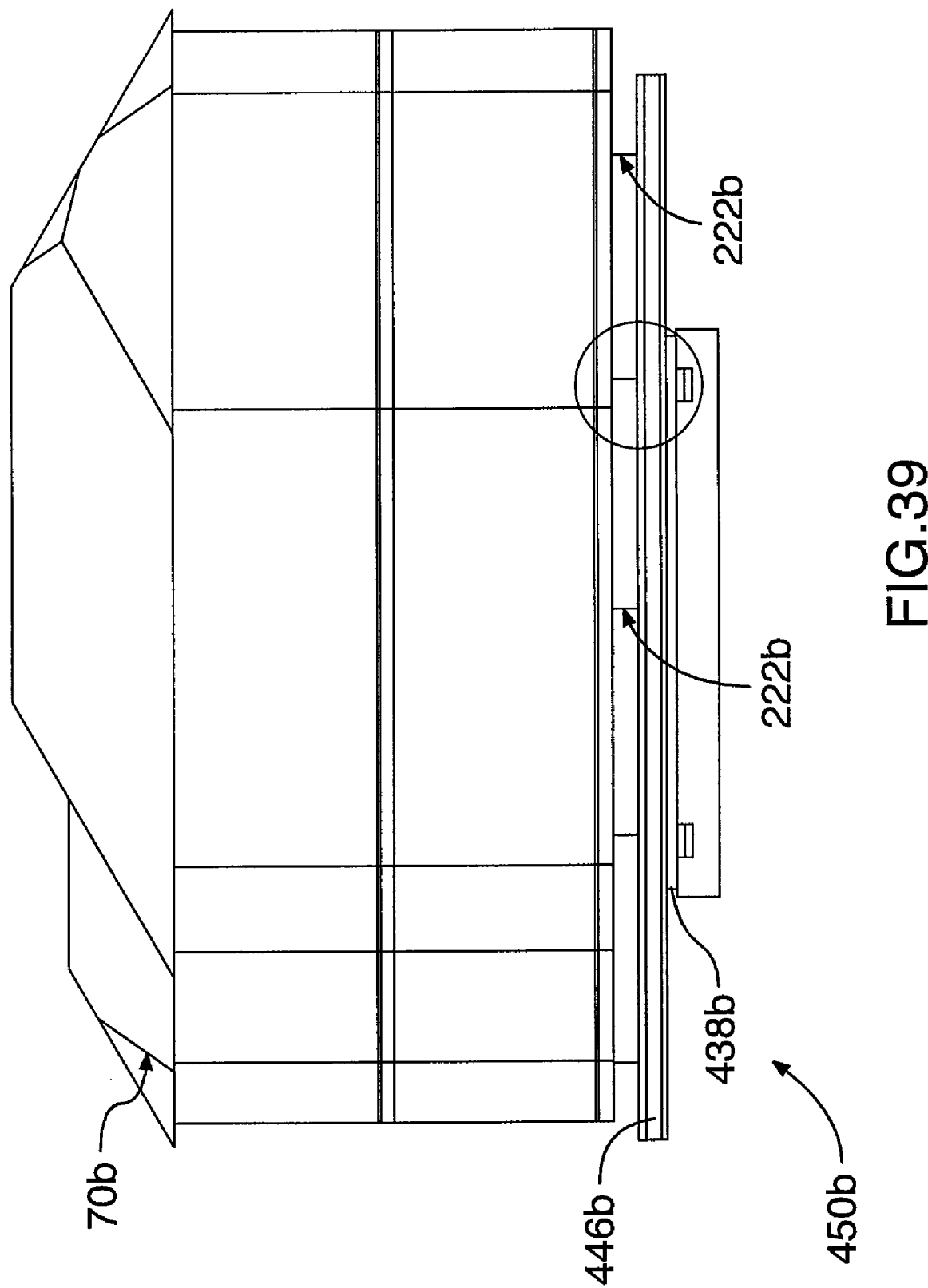
FIG. 39 is a left-side view of the rail system of FIG. 38.
Figure 40:
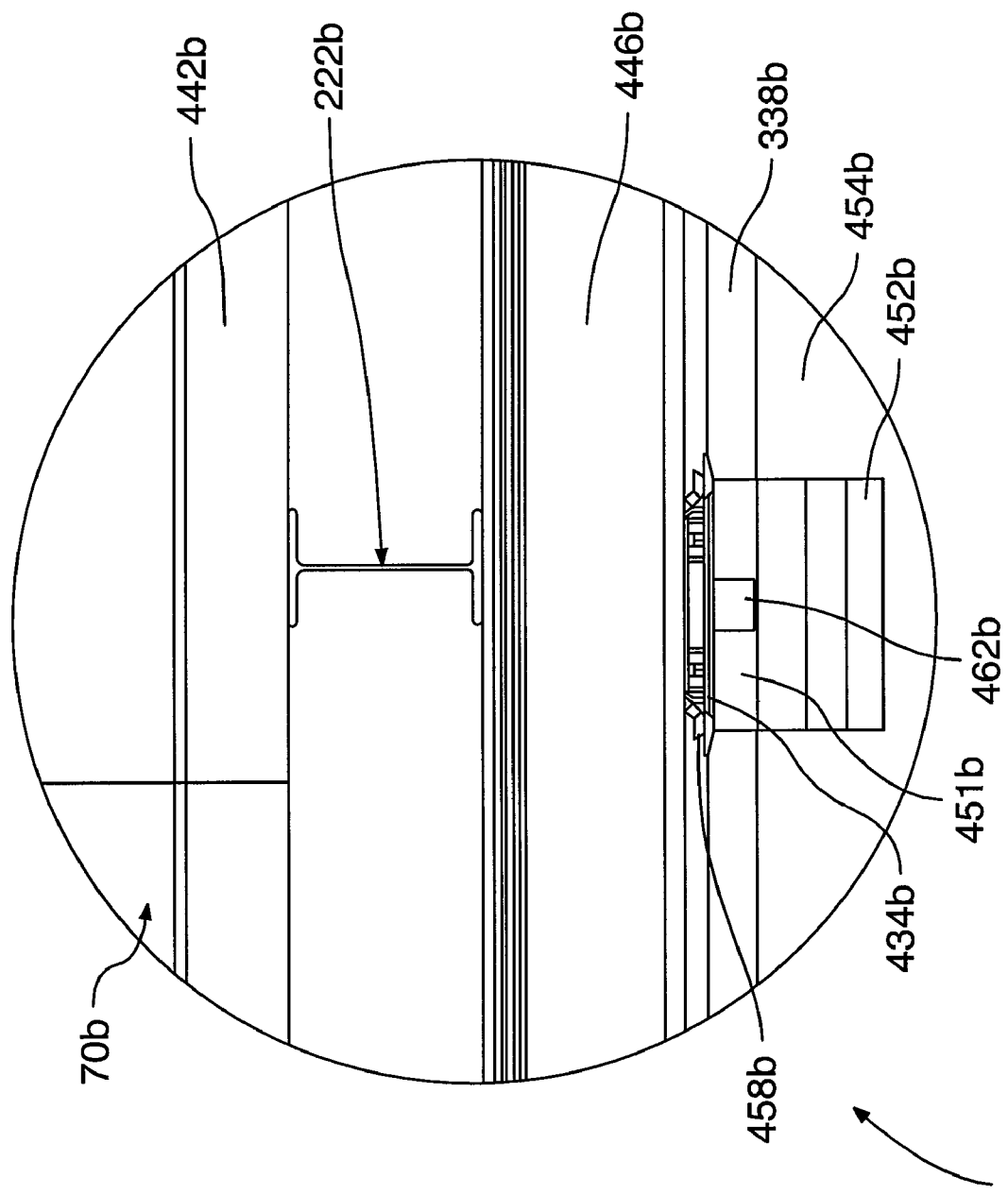
FIG. 40 shows a detail of the rail system of FIG. 39.

Referring now to FIGS. 38-40, a portion of the rail system 450*b* used to transport a house 70*b* through facility 58*b* is shown. Rail system 450*b* comprises a pair of skid plates 434*b* which run along the length of an asphalt floor 438*b* of facility 58*b*. As previously discussed, asphalt is used so that it can be broken-up and removed when facility 58*b* is dismantled. As best seen in FIG. 40, the first floor sub-floor 442*b* of house 70*b* rests upon carrier beams 222*b*. A sufficient number of carrier beams 222*b* are provided to support the length of house 70*b*. Carrier beams 222*b* are disposed in parallel to skid plates 434*b*. In turn, carrier beams 222*b* rest upon a plurality of skid beams 446*b* which lie between carrier beams 222*b* and skid plates 434*b* and are perpendicular thereto. As best seen in FIG. 40, a skid shoe 458*b* rests between skid beam 446*b* and each skid plate 434*b*. Each skid plate 434*b* and each skid shoe 458*b* are coated with a high friction graphite to restrict the movement of house 70*b* when the moving apparatus 490*b* (better seen in FIG. 47) is not in use. Moving apparatus 490*b* is described in greater detail below. In this manner, house 70*b* can be moved along the length of skid plate 434*b* using a hydraulic jack, but when not being moved, each house 70*b* will remain substantially stationary along skid plate 434*b* at its selected position within facility 58*b*.

As best seen in FIG. 40, plates 434*b* are mounted above a pair of wooden rails 451*b* which in turn is disposed above a concrete rail 452*b*. Rails 452*b* are disposed within asphalt floor 438*b* and are made of a graded concrete, which increases in density as the depth of the concrete increases. As can also be seen in FIG. 40, a granular base 454*b*, typically gravel, or the like, lies beneath asphalt floor 438*b* and surrounds each concrete rail 452*b*. A hollow channel 462*b* is also formed between wooden rails 451*b* and beneath plate 434*b* in order to receive the wedge 516*b* (better seen in FIG. 49) of moving apparatus 490*b*. Moving apparatus 490*b* and wedge 516*b* are described in greater detail below.

Figure 41:
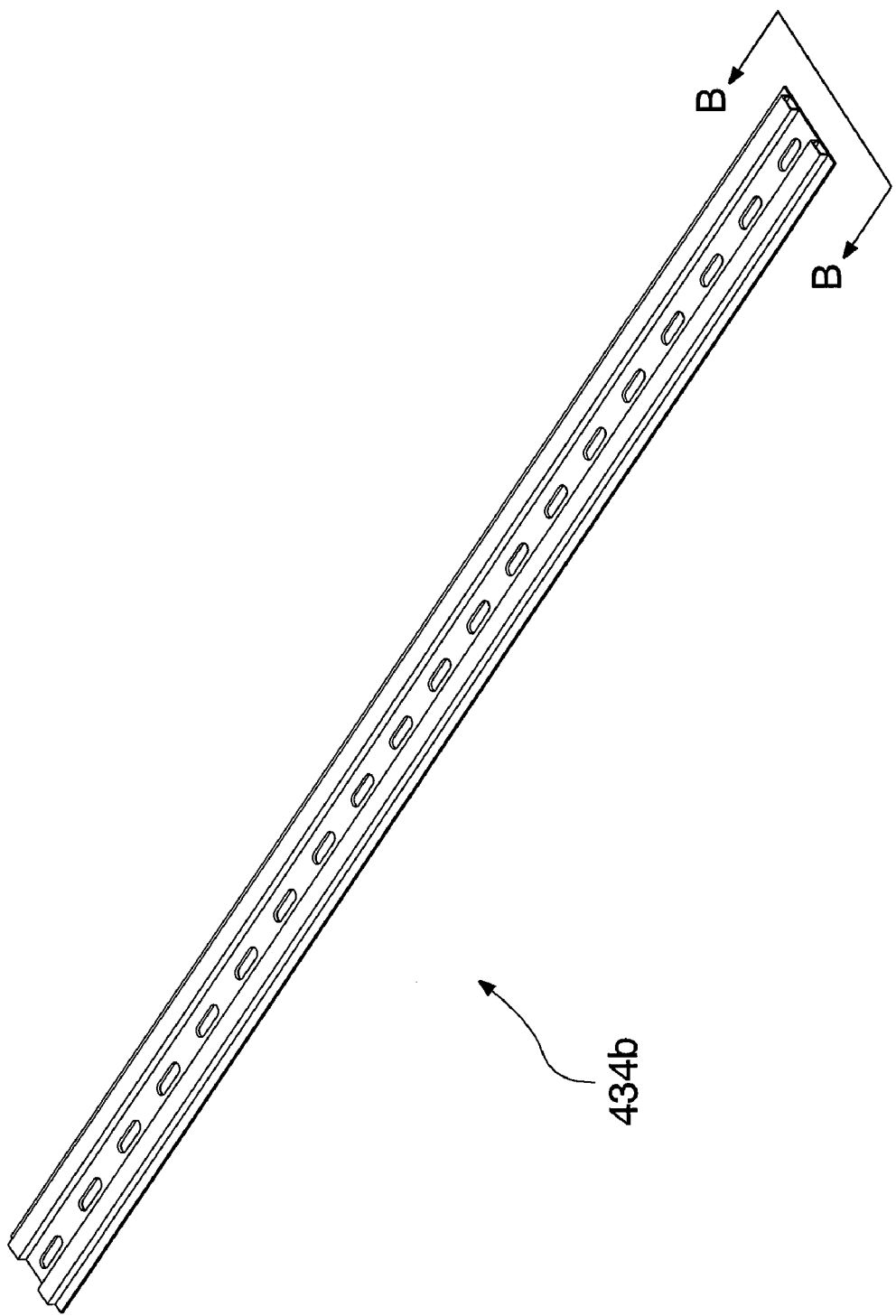
FIG. 41 is a perspective view of the skid plates of the rail system of FIG. 38.
Figure 42:
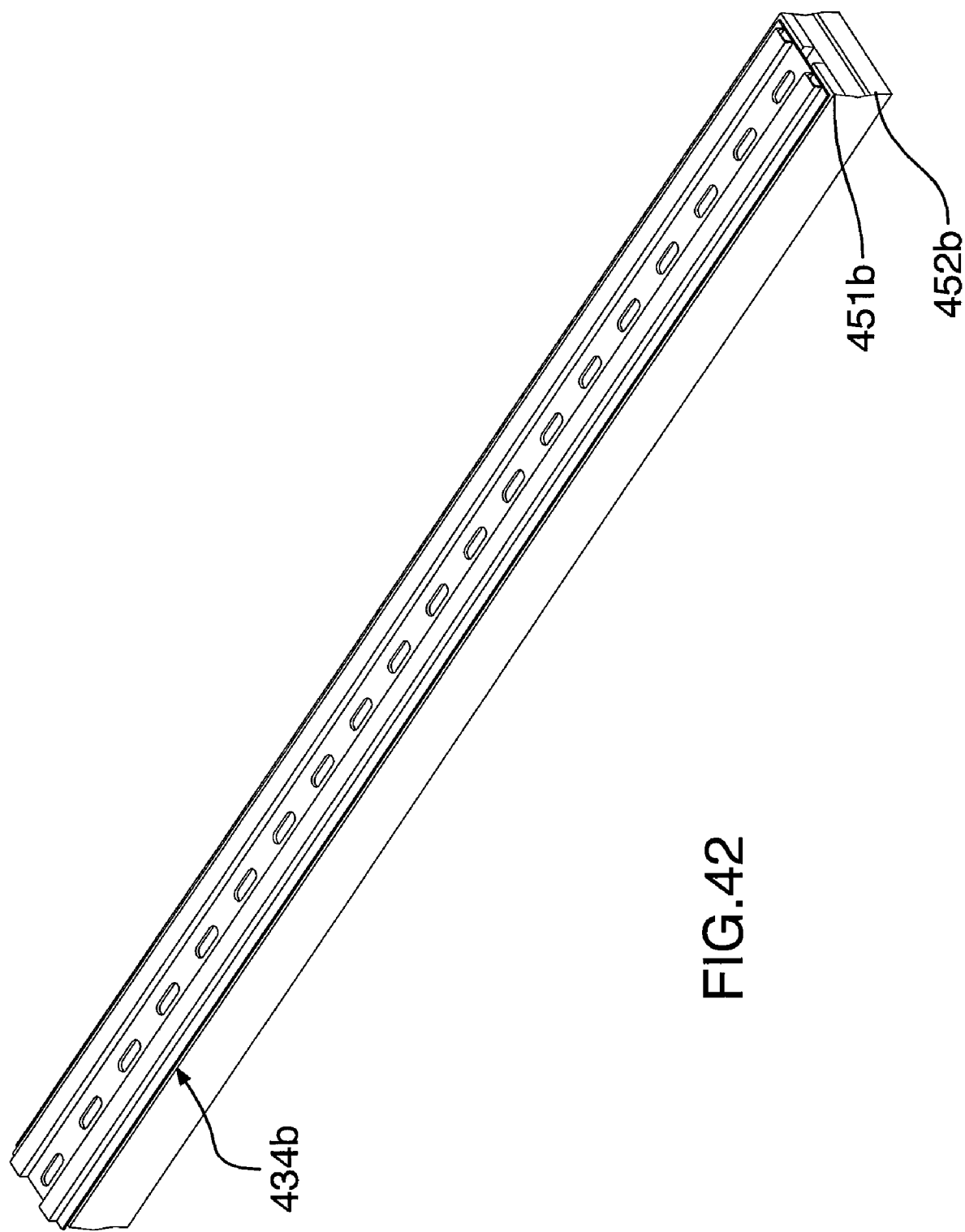
FIG. 42 is a perspective view of the skid plates and the concrete rail of the rail system of FIG. 38.
Figure 43:
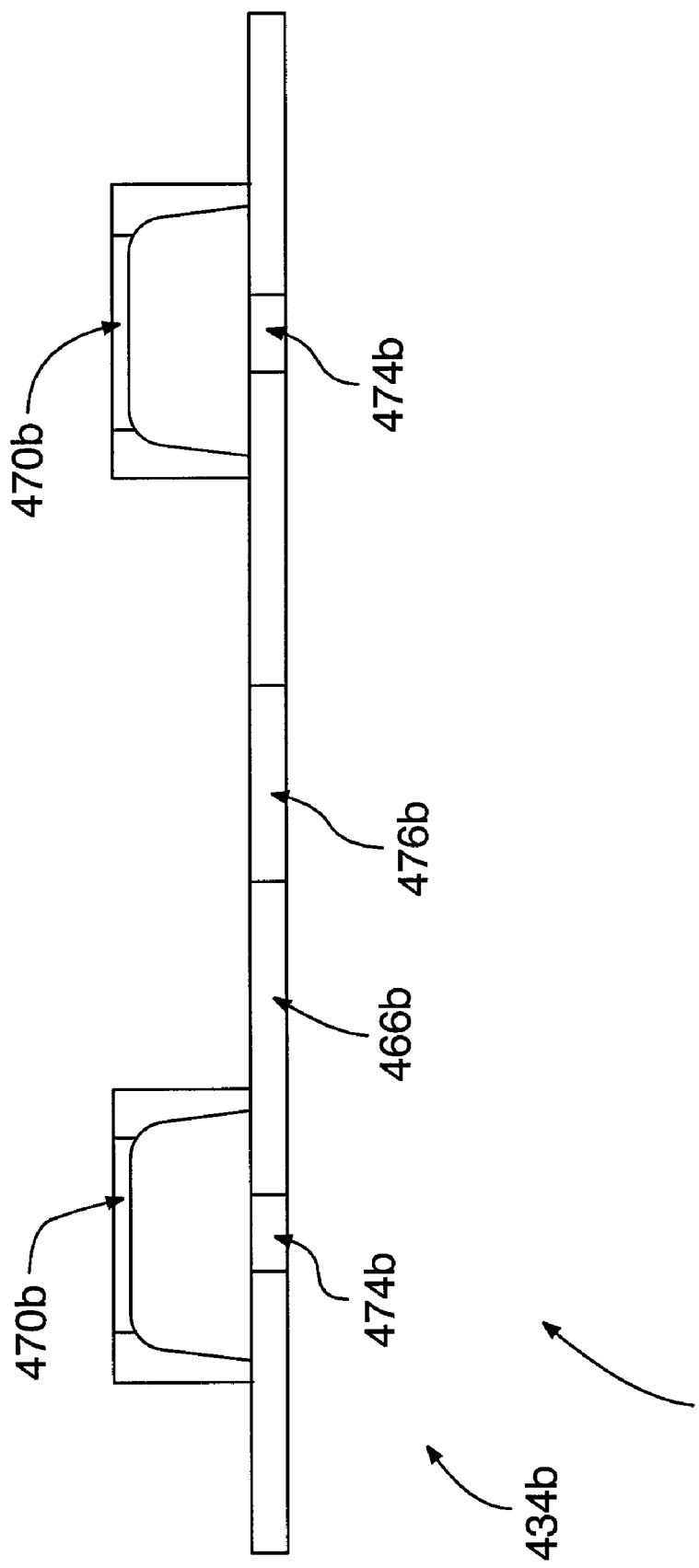
FIG. 43 is an end-view of the skid plates of FIG. 41.

Plate 434*b* is shown in greater detail in FIGS. 41-43. As can be best seen in FIG. 43, each plate 434*b* comprises a substantially flat base portion 466*b* and a pair of raised bars 470*b* that run the length of each plate 434*b*. A series of holes 474*b* and 476*b* are also provided along the length of plate 434*b*. The outer holes 474*b* are for receiving fasteners that anchor plate 434*b* into place. The middle holes 476*b* are for providing spaces into which wedge 516*b* of moving apparatus 490*b* fits to anchor moving apparatus 490*b* (better seen in FIGS. 47 and 49).

Figure 44:
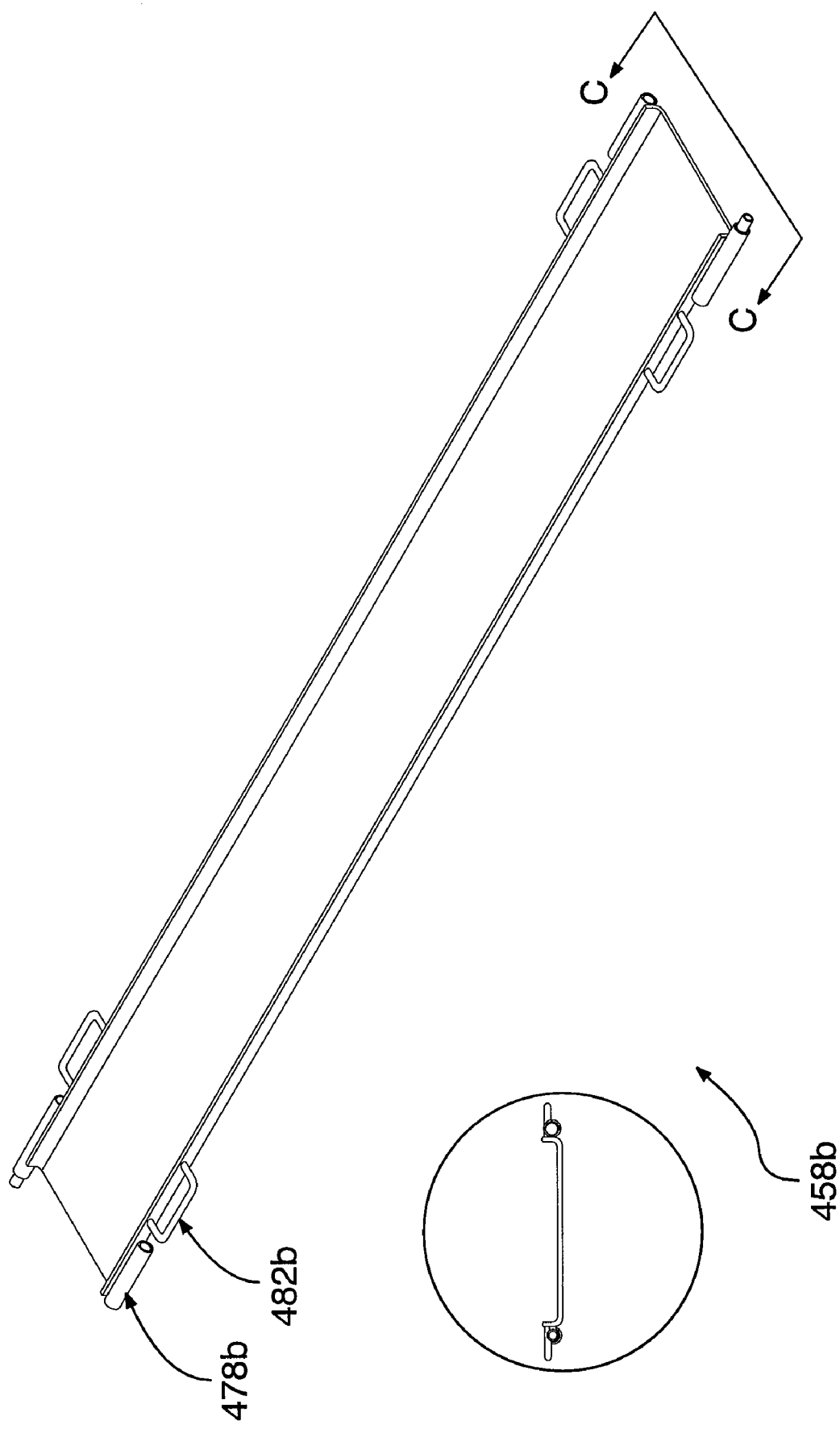
FIG. 44 is a perspective view of the skid shoe of the rail system of FIG. 38.
Figure 45:
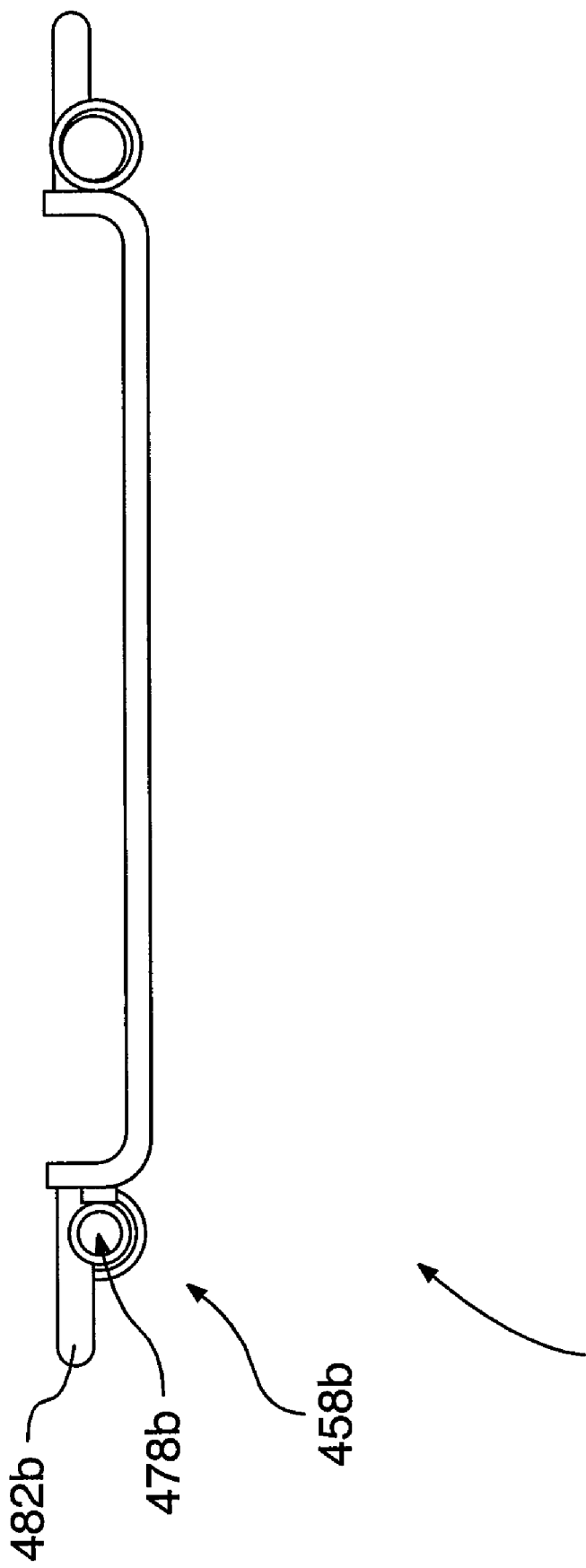
FIG. 45 is an end-view of the skid shoe of FIG. 44.
Figure 46:
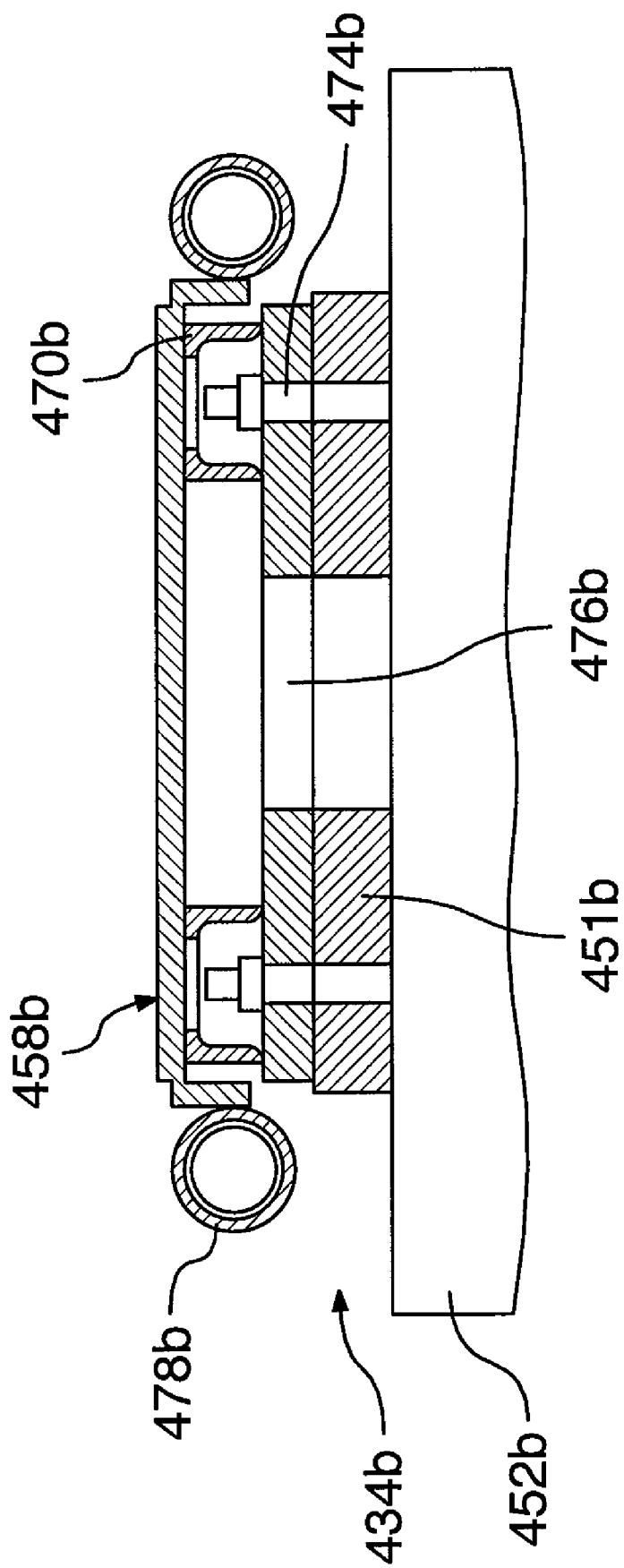
FIG. 46 shows the rail system of FIG. 40 in even greater detail.

Skid shoe 458*b* is shown in greater detail in FIGS. 44-45. FIG. 46 shows the skid shoe 458*b* from FIG. 45 (except inverted) in context with plate 434*b* from FIG. 43. As best seen in FIG. 46, each skid shoe 458*b* is a substantially U-shaped sheet, having a width complementary to the width of raised bars 470*b* so that each shoe 458*b* grasps bars 470*b*, thereby restricting lateral motion of shoe 458*b* in relation to plate 434*b*, while permitting longitudinal motion of shoe 458*b* along the length of plate 434*b*.

Each shoe 458*b* also includes a pair of outboard connection tubes 478*b* on each end of each shoe 458*b*. Each connection tube 478*b* permits a mechanical engagement with a train of shoes 458*b*, and with moving apparatus 490*b* (better seen in FIG. 47) which can be used to move each shoe 458*b* along each rail 434*b* and thereby move house 70*b* along rail system 450*b*.

Each shoe 458*b* also includes a pair of handles 482*b* on each end of each shoe 458*b*. Handles 482*b* can be used to lift and carry each shoe 458*b*. Handles 482*b* are particularly useful when a shoe 458*b* reaches the end of rail system 450*b* closest to docking port 242*b*, at which point the shoe 458*b* can be lifted off of plate 434*b* and carried back to the beginning of the rail system 450*b* inside crane building 404*a*.

Figure 47:
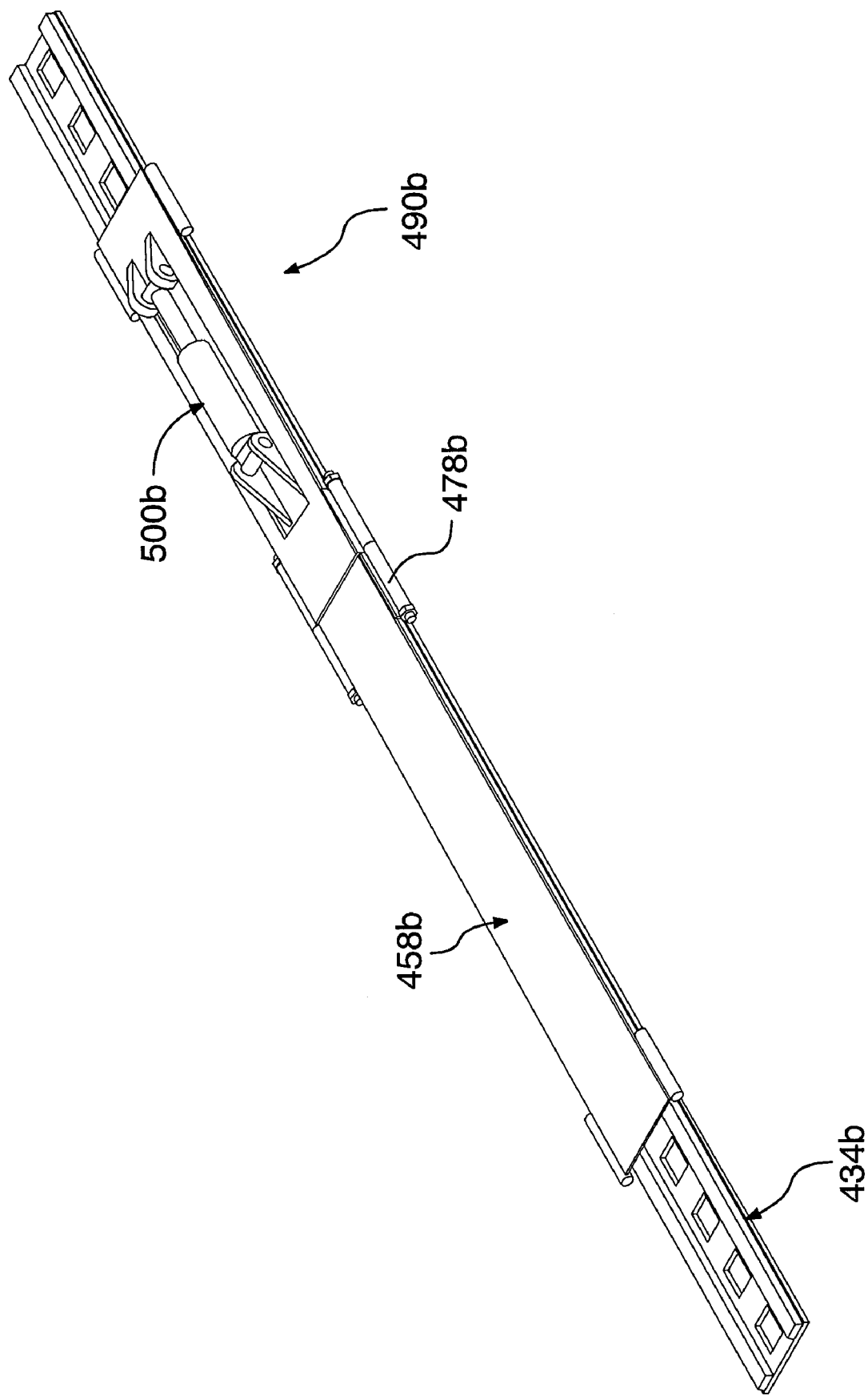
FIG. 47 is a perspective view of the skid plates and skid shoes together with a moving apparatus.
Figure 48:
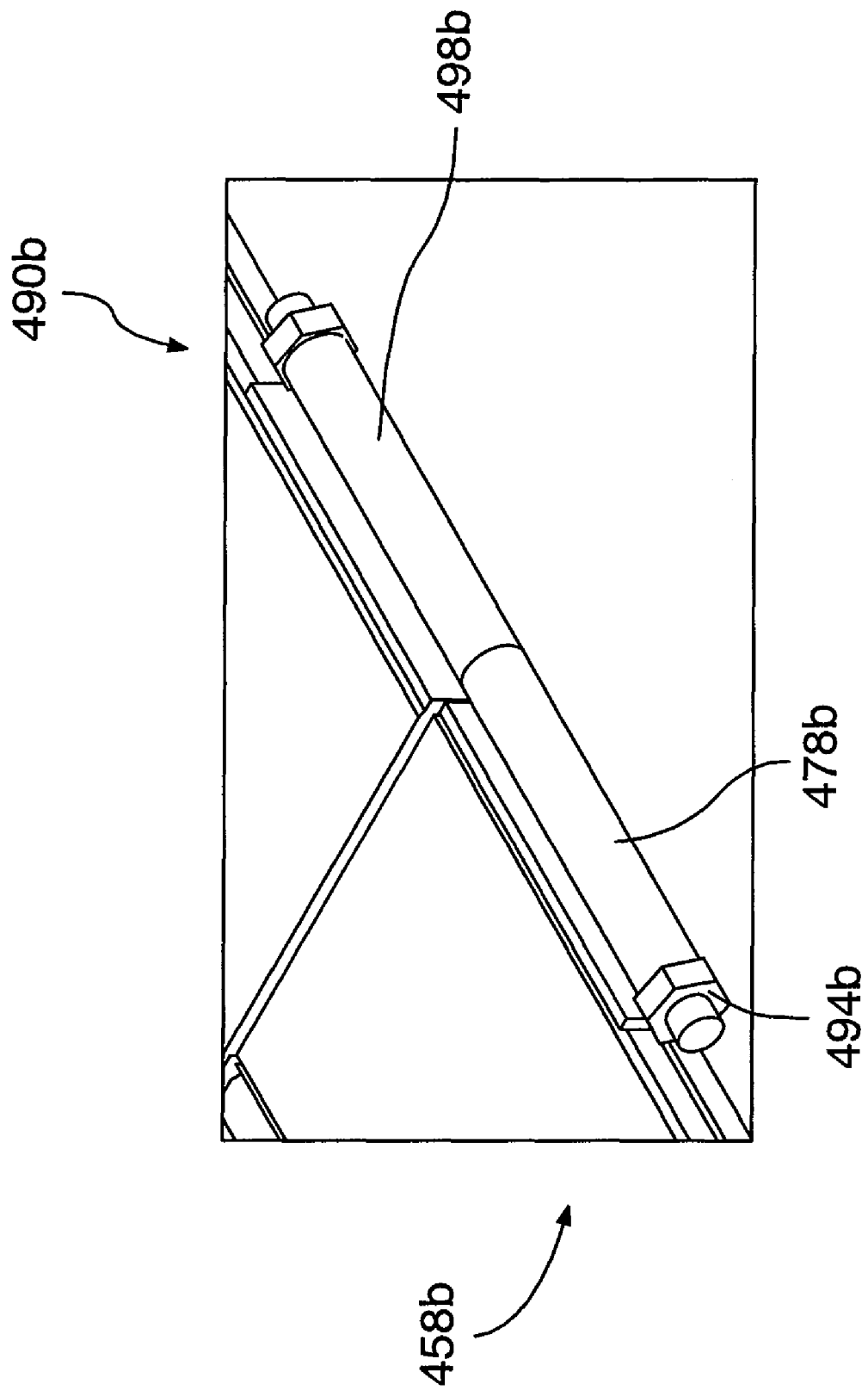
FIG. 48 shows the connection between the skid shoes and the moving apparatus in greater detail; and, FIG. 49 shows the cylinder of the moving apparatus of FIG. 47.
Figure 49:
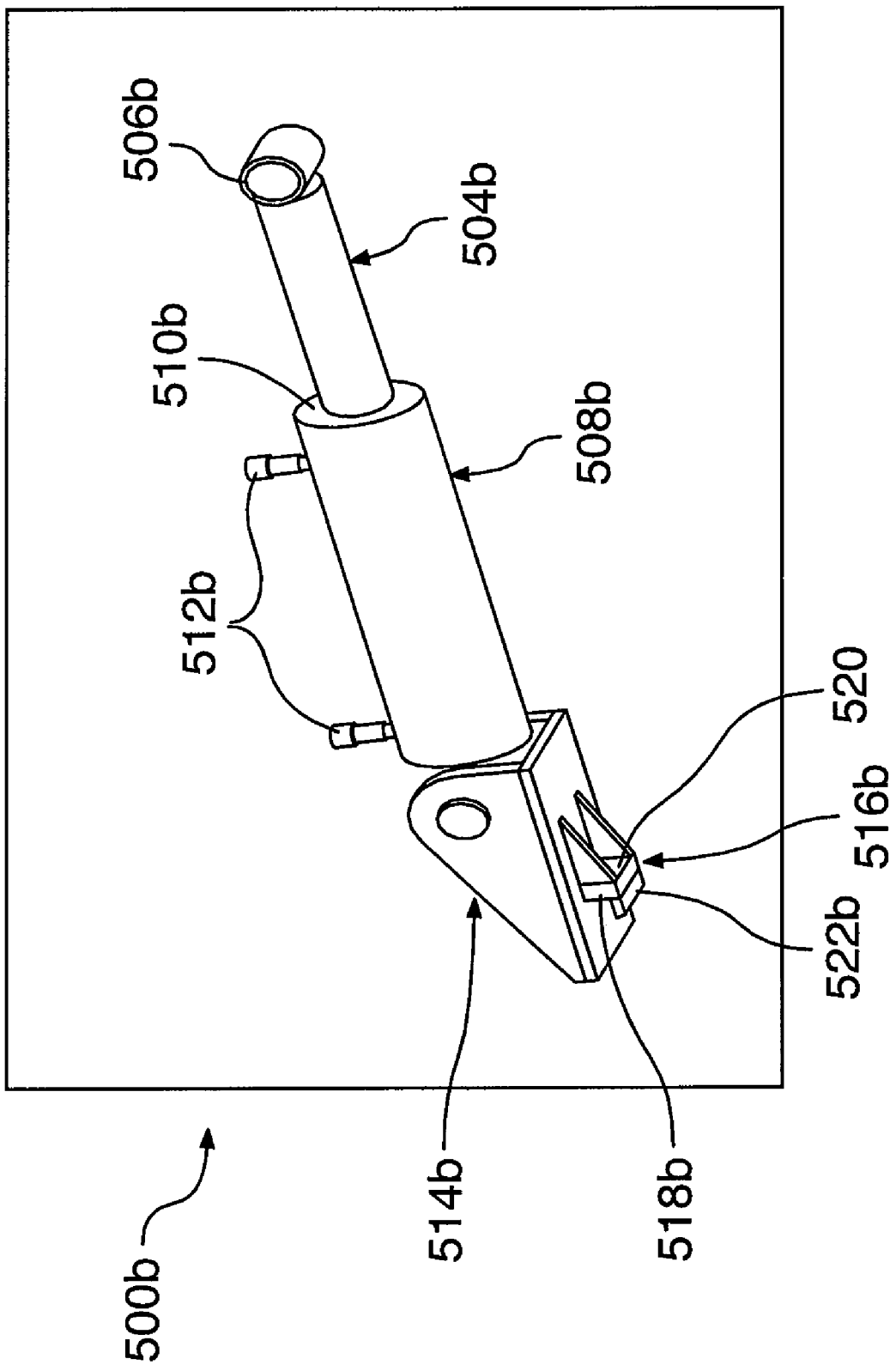

Referring now to FIG. 47, a perspective view of shoe 458*b* is shown slidably mounted on plate 434*b*. Additionally, FIG. 47 shows a moving apparatus 490*b* that is connected to shoe 458*b* via outboard connection tubes 478*b*. FIG. 48 shows the connection between shoe 458*b* and moving apparatus 490*b* in greater detail, as a bolt 494*b* is shown passing through connection tube 478*b* and through a corresponding cylinder 498*b* on moving apparatus 490*b*. Referring to FIGS. 47 and 49, moving apparatus 490*b* includes, in a present embodiment, a movable cylinder 500*b*. Movable cylinder 500*b* in a present embodiment, is a seventy-five ton cylinder that when urged into an extended position will move shoe 458*b* along plate 434*b*. In one configuration best seen in FIG. 47, moving apparatus 490*b* is mounted to pull skid shoe 458*b* along skid rail 434*b*, and is shown in the extended position. It is to be understood that moving apparatus 490*b* may be mounted at either end of skid rail 434*b*, and is equally capable of pushing and pulling skid shoe 458*b* along skid rail 434*b*.

In operation, it can be desired so that houses 70*b* move from one station to the next using rail system 450*b* once a day. Finishing work is performed on each house 70*b* during the day, and by night each house 70*b* is moved to its next station. Using the novel rail system 450*b* described herein, an entire train of houses 70*b* can be moved in one hour. Thus, facility 58*b* can, if desired, operate two shifts per day, for a total of sixteen hours in each station, with only one hour needed to move the houses 70*b* to the next station.

It can be desired to schedule building of houses 70*b* so that houses 70*b* that are farthest from facility 58*b* are built first and, progressively, houses nearer to facility 58*b* are build last. This can be desired so as to ensure that transporter 246*b* does not have to navigate through existing houses. Concurrently, the scheduling of building construction can be automated using known computing devices to create the schedule in FIGS. 33A-33R, according to the unique features that are purchased for each home, and according to a desired build-order.

FIG. 49 shows movable cylinder 500*b* in greater detail. Movable cylinder 500*b* includes an arm 504*b*, a body 508*b*, and a head 514*b*. Movable cylinder 500*b* is connected to the remainder of moving apparatus 490*b* (not shown in FIG. 49) via an eye 506*b*. Where a component of movable cylinder 500*b* described below has two ends, the end further away from eye 506*b* shall be referred to as the "distal end", while the end closer to eye 506*b* shall be referred to as the "proximal end".

Arm 504*b* includes eye 506*b* at its proximal end, through which arm 504*b* is connected to the remainder of moving apparatus 490*b*. The distal end of arm 504*b* inserts into body 508*b*, and can extend and retract out of and into body 508*b*.

Body 508*b* includes a sleeve 510*b* at the proximal end of body 508*b*, and two hydraulic fluid ports 512*b*. Sleeve 510*b* accommodates the distal end of arm 504*b*, and allows arm 504*b* to extend and retract from body 508*b*. Hydraulic fluid ports 512*b* allow entry and exit of hydraulic fluid to force arm 504*b* to extend from or retract into sleeve 510*b*.

Head 514*b* is connected to the distal end of body 508*b*, and includes a wedge 516*b*. Wedge 516*b* extends from head 514*b* in the direction of skid rail 434*b* (not shown in FIG. 49). As seen in FIG. 49, wedge 516*b* is substantially triangular in shape, with a base 518*b* substantially perpendicular to head 514*b* at the distal end of wedge 516*b* and an edge 520*b* sloping towards head 514*b* at the proximal end of wedge 516*b*. Wedge 516*b* is intended to drop into holes 476*b* (not shown in FIG. 49) on skid rail 434*b*, and can include a tooth 522*b* which is substantially perpendicular to base 518*b* and limits the range of motion of wedge 516*b* within hole 476*b*.

When wedge 516*b* is in a hole 476*b*, base 518*b* allows moving apparatus 490*b* to push off of hole 476*b*. Arm 504*b* is extended from body 508*b* by injecting fluid through the distal hydraulic fluid port 512*b* and expelling fluid through proximal hydraulic fluid port 512*b*, moving the proximal end of arm 504*b* (and therefore also moving apparatus 490*b* and house 70*b*, not shown in FIG. 49) along skid rail 434*b*. When full extension is reached, fluid flow through hydraulic fluid ports 512*b* is reversed, and arm 504*b* is retracted into sleeve 510*b*, pulling body 508*b* and head 514*b* lengthwise along skid rail 434*b*. Edge 520*b* of wedge 516*b* allows wedge 516*b* to slide out of hole 476*b* and along skid rail 434*b* until the next hole 476*b* is reached.

The present invention thus provides, amongst other things, a novel system and method for manufacturing homes by providing a sub-assembly plant for producing walls and floors and one or more final assembly facilities for assembling full homes from those walls and floors and other inventory.

While the foregoing describes certain specific embodiments of the present invention, it should be understood that variations, combinations and sub-sets of those embodiments are contemplated.

The invention claimed is:

1. A final assembly facility for constructing homes from substantially planar floor and wall sections comprising:
    a crane section having at least one roof assembly area;
    an final-assembly section connected to said crane section;
    a final assembly line having at least one station in said crane section adjacent to said roof assembly area;
    a crane within said crane section for lifting a roof assembled in said roof assembly area onto a house assembled from said planar floor and wall sections;
    said final assembly line further having a plurality of additional stations within said final-assembly section that are in-line with said at least one station, wherein each of said additional stations are provided for further finishing said house.

2. The final assembly facility of claim 1 wherein said additional stations comprise performing one or more of installing HVAC risers; installing gas fireplaces; completing plumbing; completing electrical; insulating walls; testing plumbing; testing electrical; drywall taping; installing railings; painting; installing kitchen fixtures; installing bathroom fixtures; installing mouldings; installing base boards; installing carpets.

3. The final assembly facility of claim 1 wherein said crane section is wider than said final assembly line.

4. The final assembly facility of claim 3 wherein said crane section includes two roof assembly areas.

5. The final assembly facility of claim 4 wherein said roof assembly areas are on either side of said at least one station.

6. The final assembly facility of claim 1 further comprising a plurality of loading bays that are proximal to various ones of said stations.

7. The final assembly facility of claim 1 further comprising a loading zone situated below grade to said final assembly facility, such that an upper surface of a transporter within said loading zone is coplanar with said final assembly facility.

8. The final assembly facility of claim 1 further comprising a rail system for moving houses from station to station.

9. The final assembly facility of claim 8 wherein said rail system comprises a pair of plates that run the length of said final assembly facility and a plurality of shoes that slide along said plates; said system further comprising an intermediate support between said shoes and a house being assembled in said final assembly facility.

\* \* \* \* \*